United States Patent
Yoshizawa et al.

(10) Patent No.: US 11,089,351 B2
(45) Date of Patent: Aug. 10, 2021

(54) DISPLAY APPARATUS AND REMOTE OPERATION CONTROL APPARATUS

(71) Applicant: MAXELL, LTD., Kyoto (JP)

(72) Inventors: Kazuhiko Yoshizawa, Kyoto (JP); Yasunobu Hashimoto, Kyoto (JP); Hiroshi Shimizu, Kyoto (JP); Tomonori Nomura, Kyoto (JP); Kaneyuki Okamoto, Kyoto (JP)

(73) Assignee: MAXELL, LTD., Kyoto (JP)

( * ) Notice: Subject to any disclaimer, the term of this patent is extended or adjusted under 35 U.S.C. 154(b) by 14 days.

(21) Appl. No.: 16/481,080

(22) PCT Filed: Feb. 2, 2017

(86) PCT No.: PCT/JP2017/003711
§ 371 (c)(1),
(2) Date: Jul. 26, 2019

(87) PCT Pub. No.: WO2018/142524
PCT Pub. Date: Aug. 9, 2018

(65) Prior Publication Data
US 2020/0389691 A1 Dec. 10, 2020

(51) Int. Cl.
*H04N 21/4223* (2011.01)
*G06F 3/0487* (2013.01)
(Continued)

(52) U.S. Cl.
CPC ....... *H04N 21/4223* (2013.01); *G06F 3/0487* (2013.01); *G09G 3/20* (2013.01);
(Continued)

(58) Field of Classification Search
CPC ......... H04N 21/4223; H04N 21/42222; G09G 3/20; G09G 2354/00; G09G 2340/0464;
(Continued)

(56) References Cited

U.S. PATENT DOCUMENTS

| 5,594,469 A | 1/1997 | Freeman et al. |
| 2009/0153671 A1* | 6/2009 | Lee ........................ G06F 3/0346 348/207.1 |

(Continued)

FOREIGN PATENT DOCUMENTS

| JP | 08-315154 A | 11/1996 |
| JP | 2004-258837 A | 9/2004 |

(Continued)

OTHER PUBLICATIONS

Noboru Nakamichi, "Remote Touch Pointing for a Large Display", Information Processing Society of Japan Interaction 2013, vol. 2013, No. 1, pp. 762-763.

(Continued)

*Primary Examiner* — Mark W Regn
(74) *Attorney, Agent, or Firm* — Mattingly & Malur, PC

(57) ABSTRACT

A display apparatus includes two cameras and detects a second point and a third point with respect to a first point from photographed video, the first point indicating a camera reference position, the second point indicating a user reference position, the third point indicating a position of a finger of the user; sets a virtual plane space to a fourth point in a space, the fourth point being positioned apart from the second point by a predetermined length in a first direction; determines a predetermined operation on a basis of a degree of entrance of the finger with respect to the virtual plane space; controls an operation of the display apparatus on a basis of operational input information; determines an adjusting operation against the virtual plane space by the user; and changes at least one of a position, a size, or inclination of the virtual plane space in real time.

20 Claims, 43 Drawing Sheets

(51) Int. Cl.
*G09G 3/20* (2006.01)
*H04N 21/422* (2011.01)

(52) U.S. Cl.
CPC . *H04N 21/42222* (2013.01); *G09G 2340/045* (2013.01); *G09G 2340/0464* (2013.01); *G09G 2354/00* (2013.01); *G09G 2370/06* (2013.01)

(58) Field of Classification Search
CPC .......... G09G 2340/045; G09G 2370/06; G06F 3/0487
See application file for complete search history.

(56) References Cited

U.S. PATENT DOCUMENTS

| | | | | |
|---|---|---|---|---|
| 2013/0181897 | A1* | 7/2013 | Izumi | G06F 3/017 |
| | | | | 345/156 |
| 2015/0264299 | A1* | 9/2015 | Leech | G06F 3/013 |
| | | | | 348/78 |

FOREIGN PATENT DOCUMENTS

| | | | |
|---|---|---|---|
| JP | 2013-016060 A | | 1/2013 |
| JP | 2016-457254 | * | 1/2015 |
| JP | 2016-134022 A | | 7/2016 |

OTHER PUBLICATIONS

International Search Report of PCT/JP2017/003711 dated May 16, 2017.

* cited by examiner

DISPLAY SYSTEM

- 1: DISPLAY APPARATUS
- 10: SCREEN
- 31: CAMERA (RIGHT-SIDE CAMERA)
- 32: CAMERA (LEFT-SIDE CAMERA)
- 50: CURSOR
- 100: VIRTUAL PLANE SPACE
- 101: FIRST VIRTUAL PLANE
- 102: SECOND VIRTUAL PLANE
- J0: REFERENCE AXIS
- K0: REFERENCE AXIS
- Q0: POINT (CAMERA REFERENCE POSITION)
- P0: POINT (USER REFERENCE POSITION)
- F0: POINT (FINGER POSITION)
- C0: POINT (VIRTUAL PLANE SPACE REFERENCE POSITION)
- E0: POINT (CURSOR POSITION)

STATE WHEN SPACE IS VIEWED FROM SIDE

C0:(Xc0, Yc0, Zc0)
C1:(Xc1, Yc1, Zc1)
C2:(Xc2, Yc2, Zc2)

FIG. 8
(A) SETTING EXAMPLE
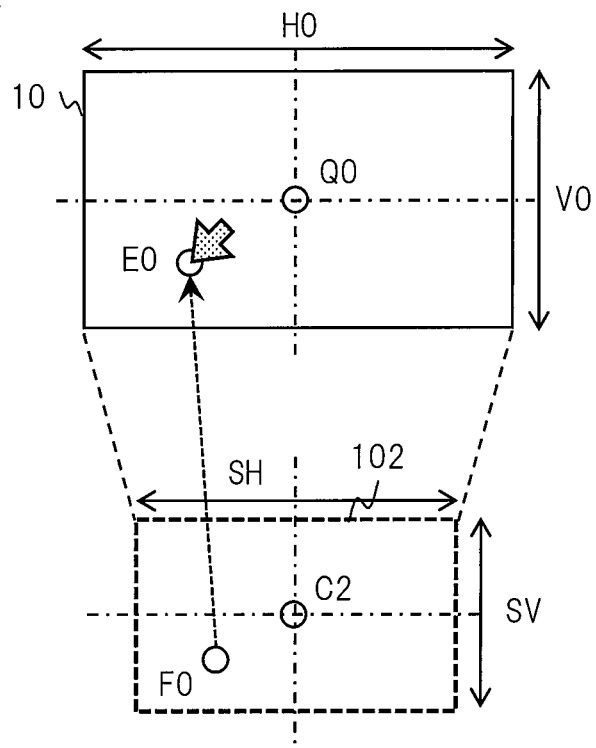
(B) SETTING EXAMPLE
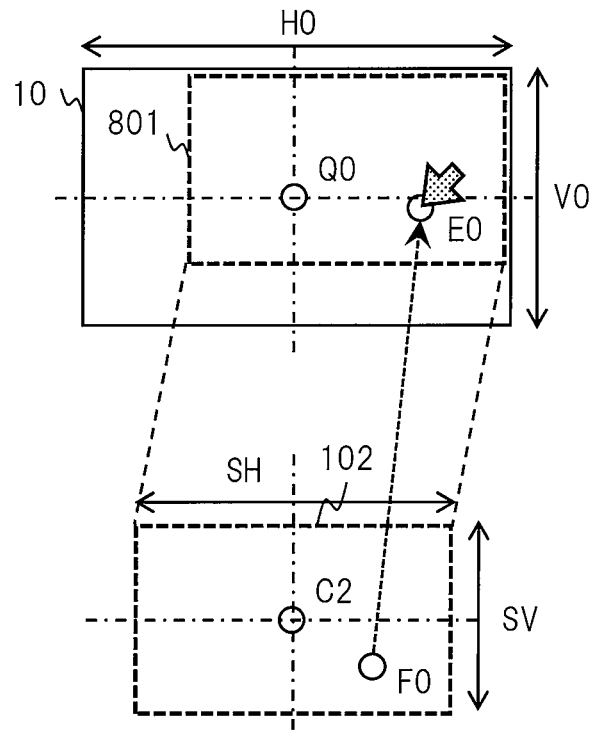

FIG. 9
(A) FIRST SPACE
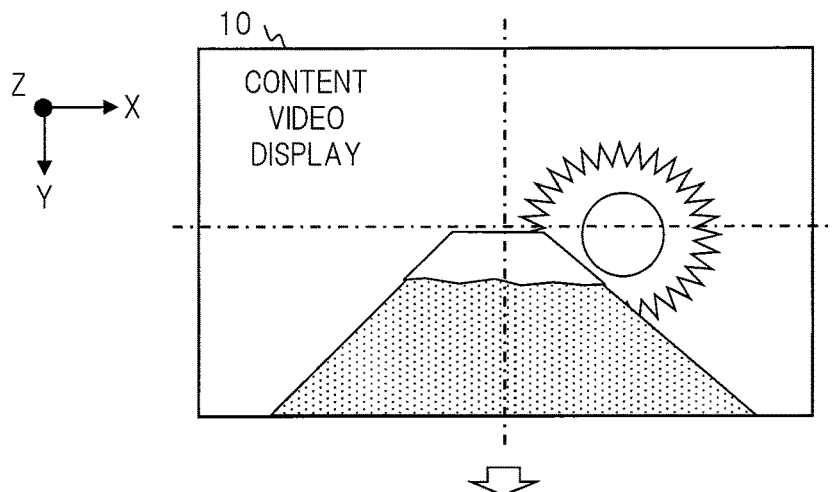
(B) SECOND SPACE (REACH FIRST VIRTUAL PLANE)
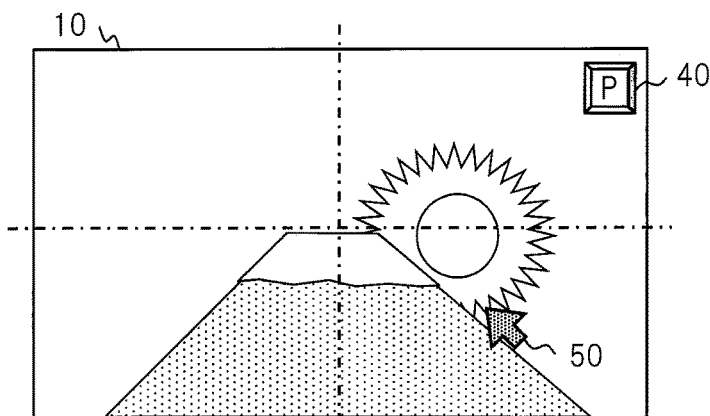
(OPERATION AGAINST ICON 401)
(C) SECOND SPACE
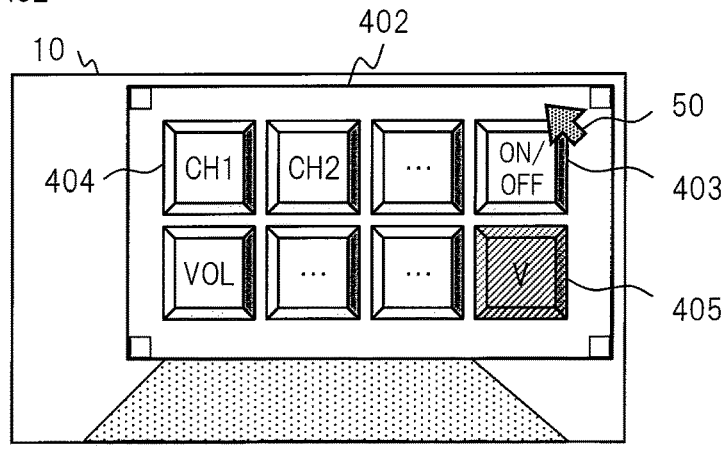
(OPERATION AGAINST MENU BUTTON 405)

FIG. 11
(A) FIRST SPACE (Operation menu is displayed from the beginning.)
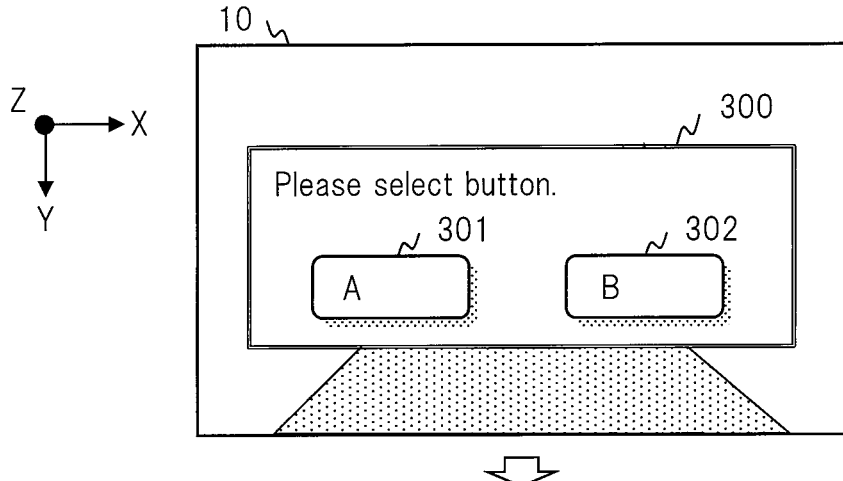
(B) SECOND SPACE (REACH FIRST VIRTUAL PLANE)
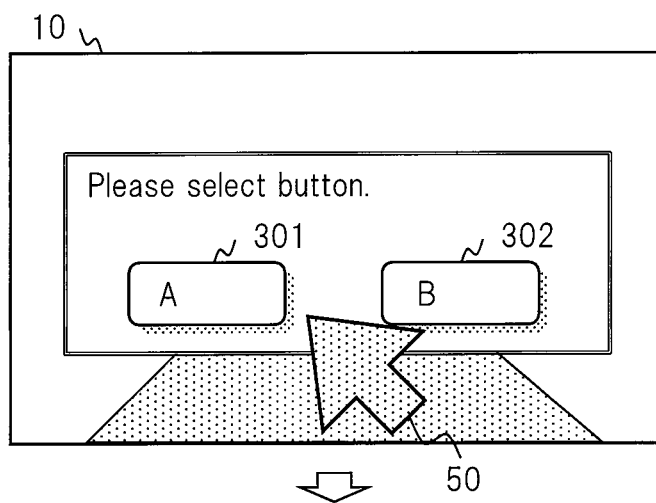
(C) THIRD SPACE (REACH SECOND VIRTUAL PLANE)
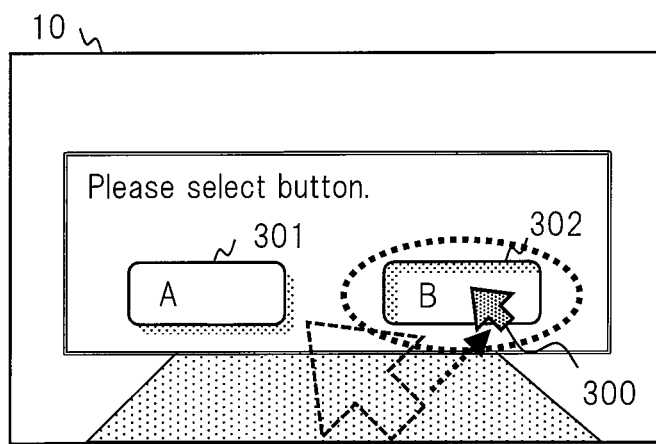
(IN CASE OF TOUCH OPERATION)

FIG. 12
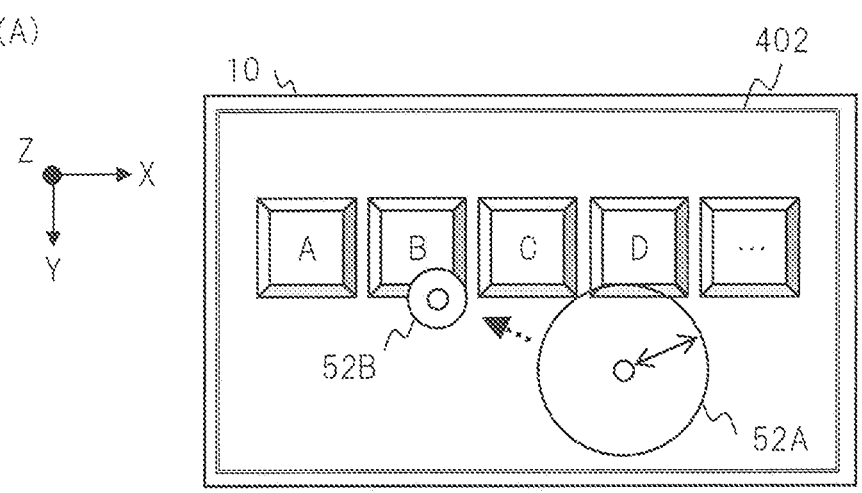
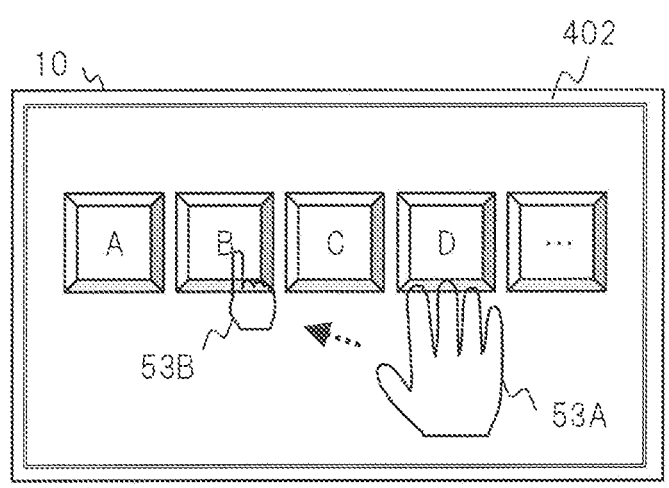

FIG. 13
(A) ONE FINGER
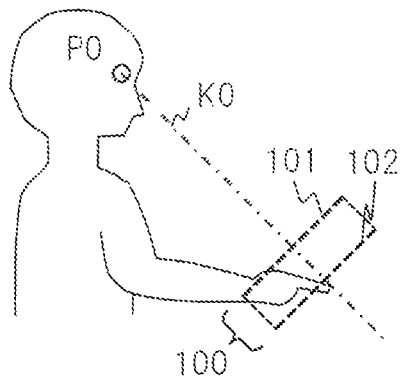
OPERATION EXAMPLE
· TOUCH
· TAP
· SWIPE
· FLICK
(B) PALM
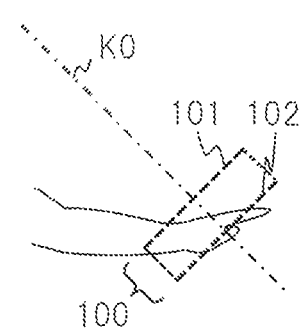
OPERATION EXAMPLE
· TOUCH
· TAP
· SWIPE
· FLICK
(C) PLURAL FINGERS
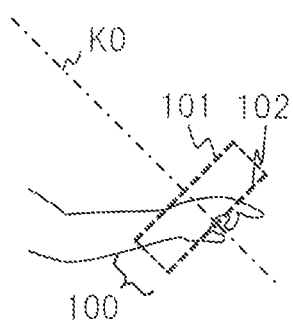
OPERATION EXAMPLE
· PINCH FIG. 15
(A) PINCH OPERATION (1)
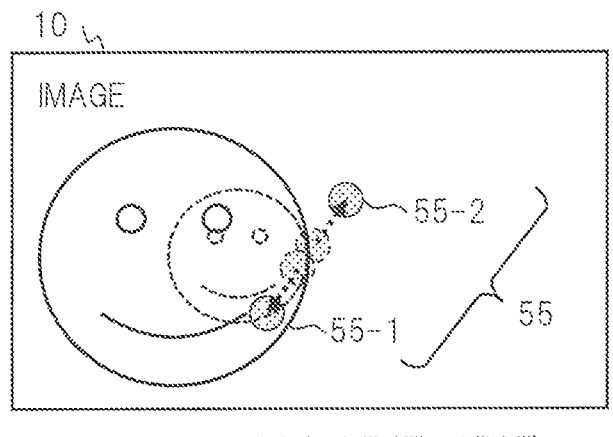
IN CASE OF PINCH OUT (ENLARGE)
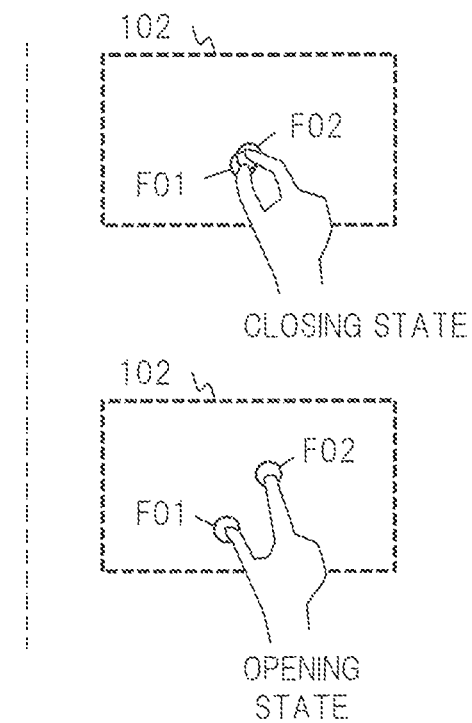
CLOSING STATE
OPENING STATE
(B) PINCH OPERATION (2)
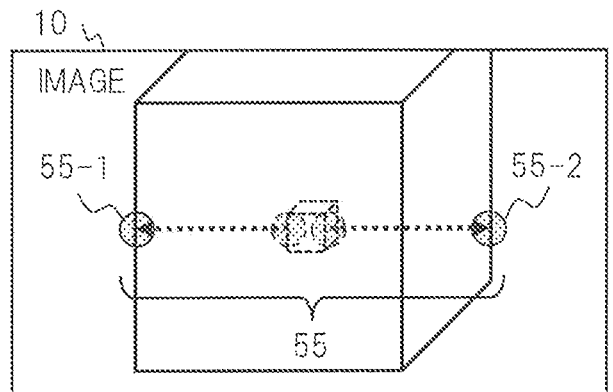
IN CASE OF PINCH OUT (ENLARGE)
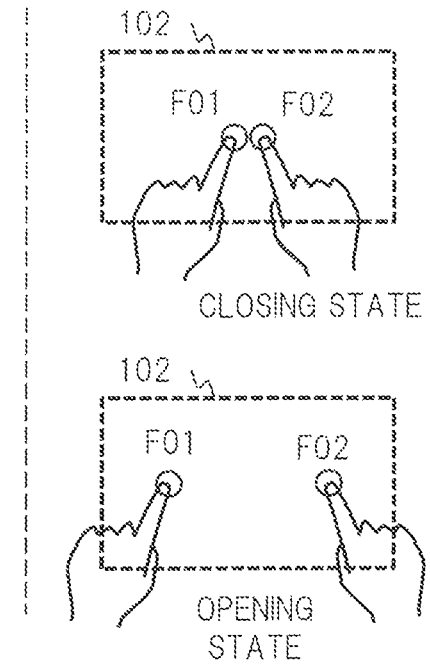
CLOSING STATE
OPENING STATE

FIG. 16
ADJUSTMENT OF VIRTUAL PLANE
(A) ADJUSTING OPERATION
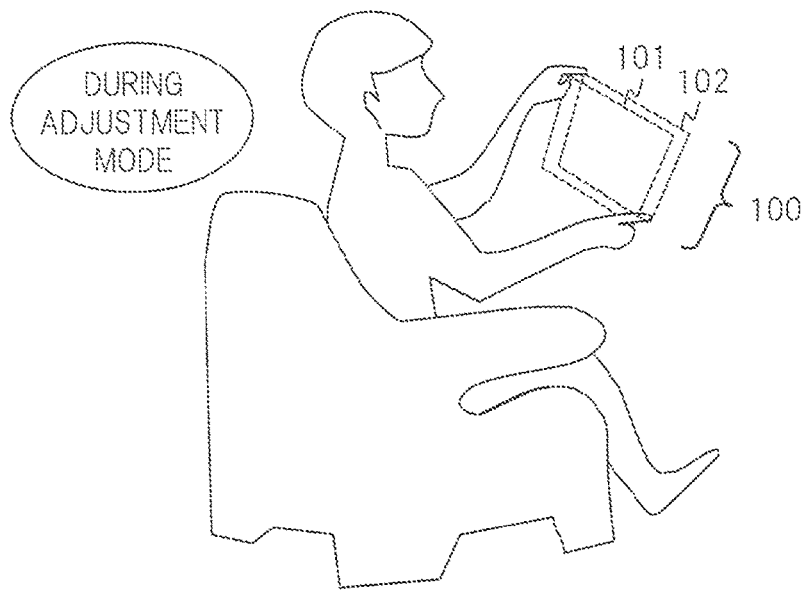
(B) CHANGE (POSITION, SIZE, OR INCLINATION)
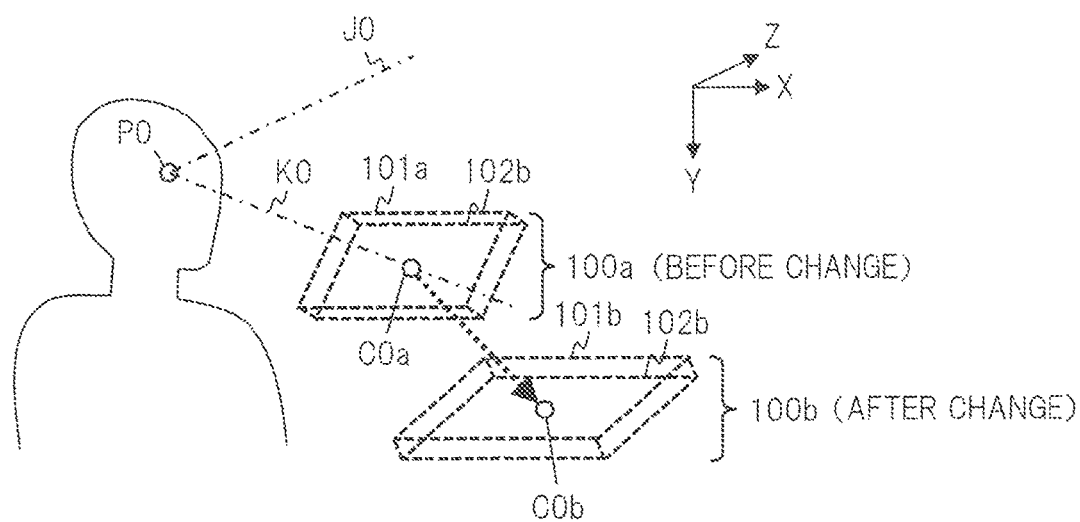

FIG. 21
(A)
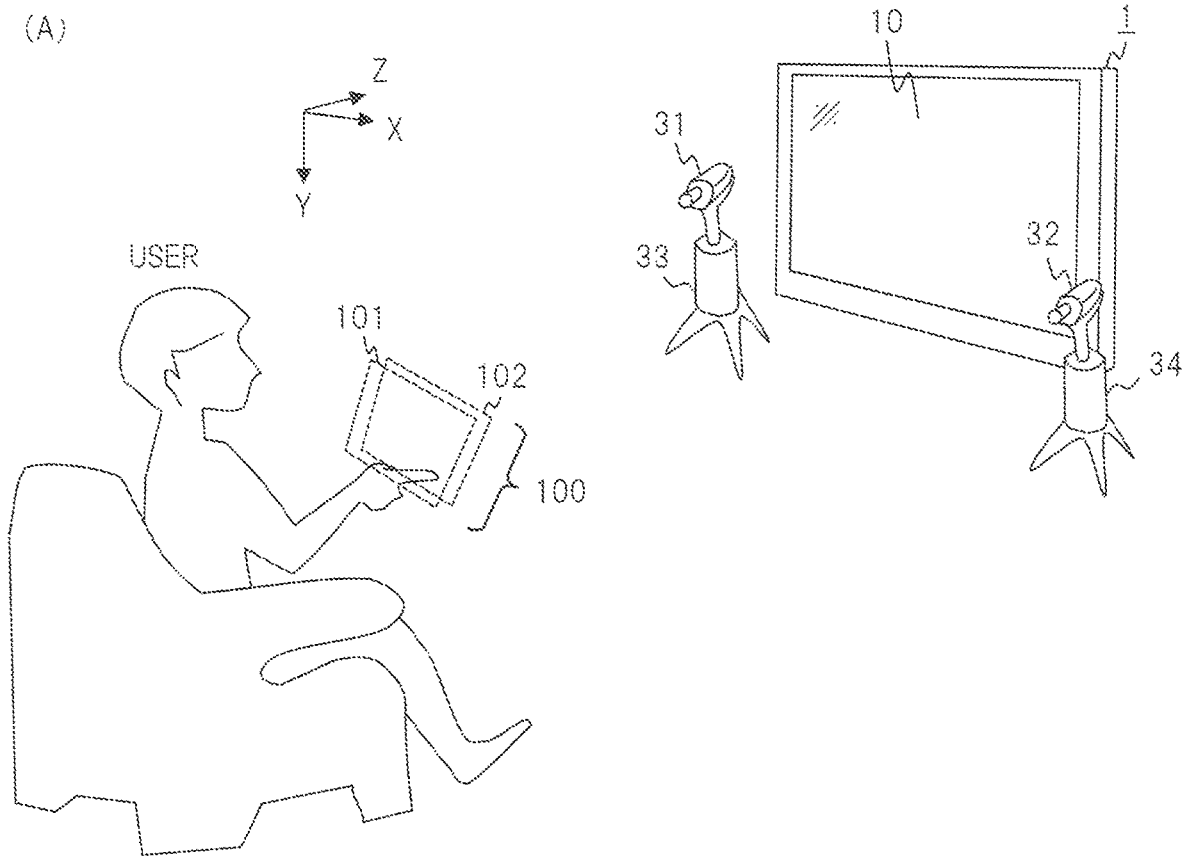
(B)
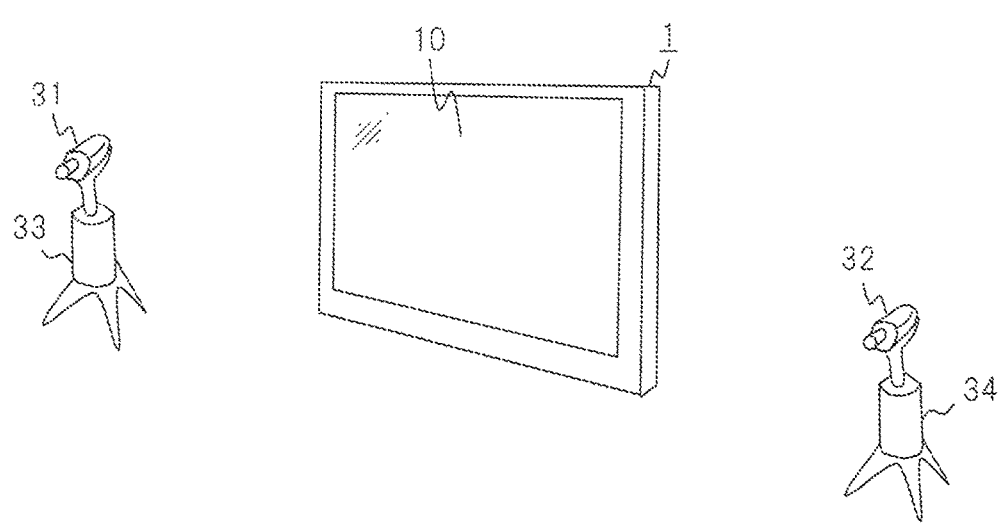

FIG. 22
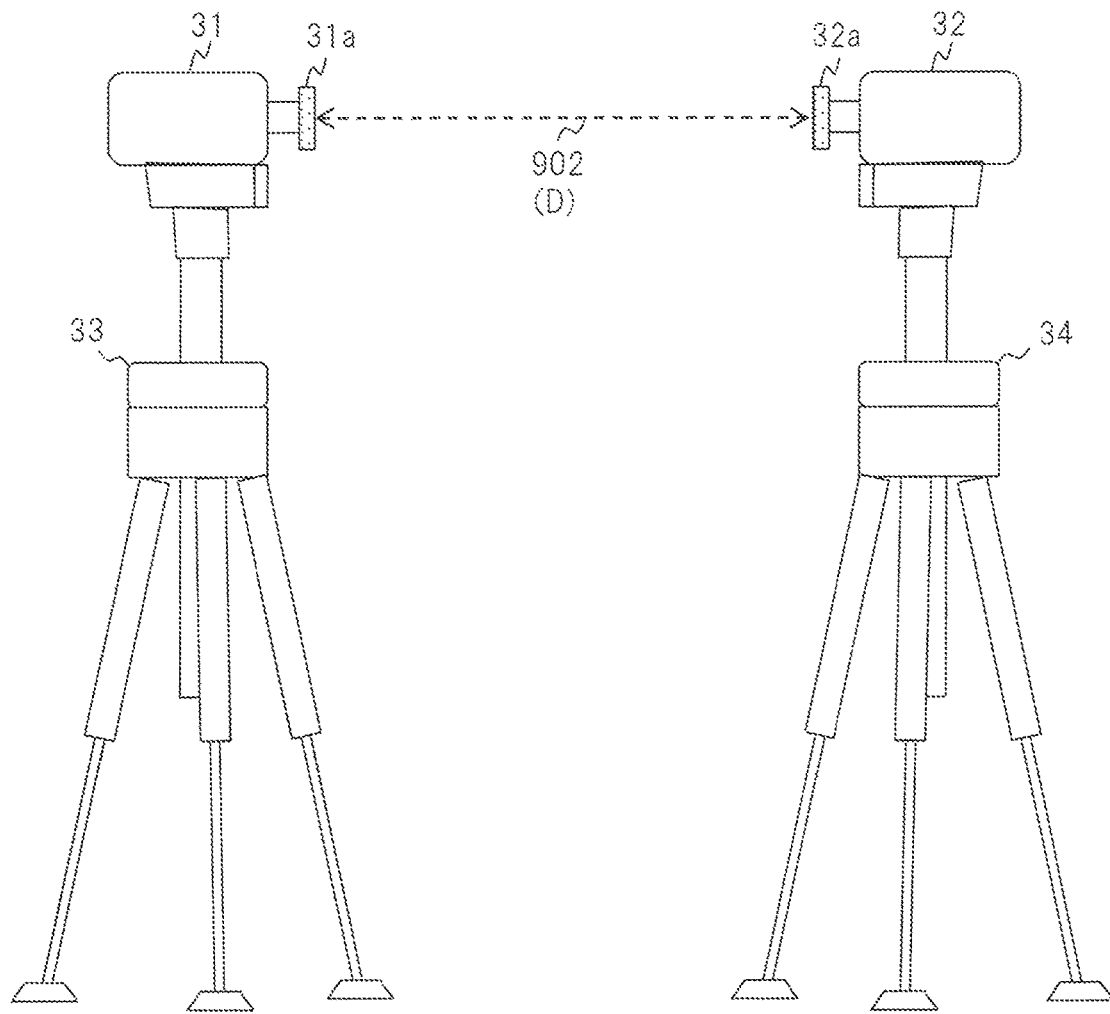
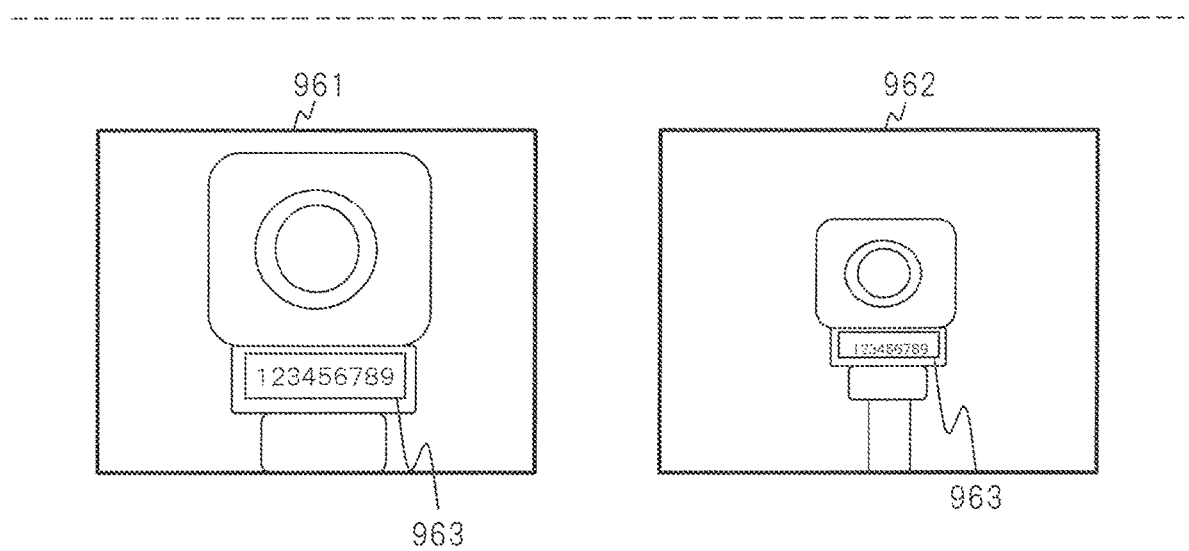

FIG. 23
ADJUSTMENT OF VIRTUAL PLANE
(A) ADJUSTING OPERATION
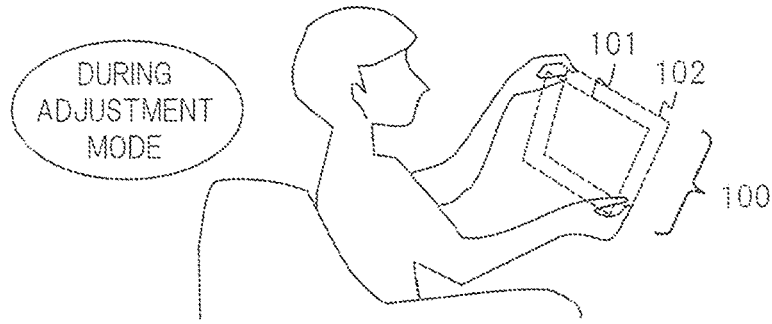
(B)
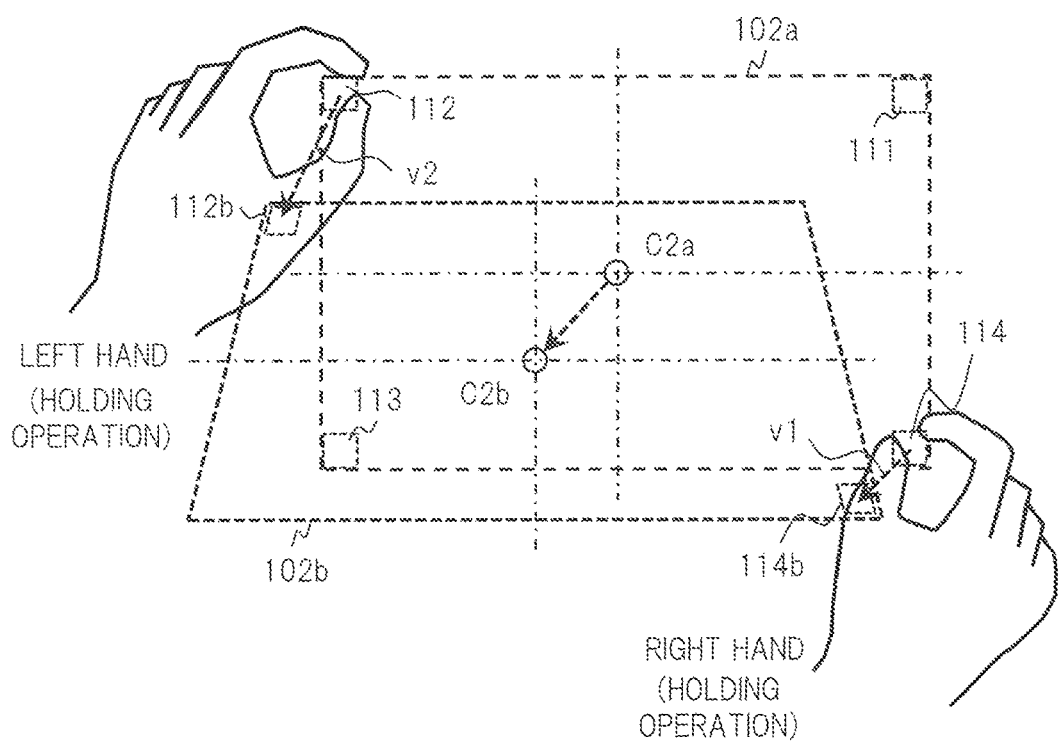
(C)
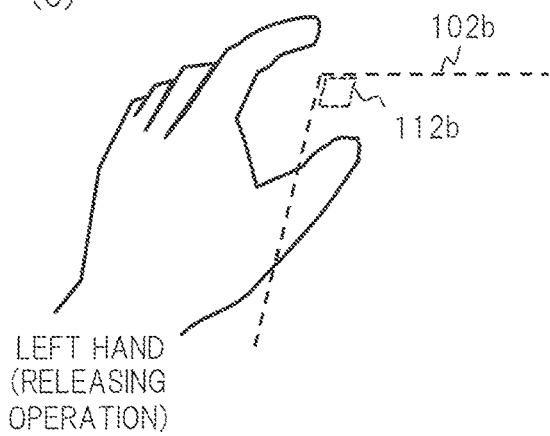

FIG. 25
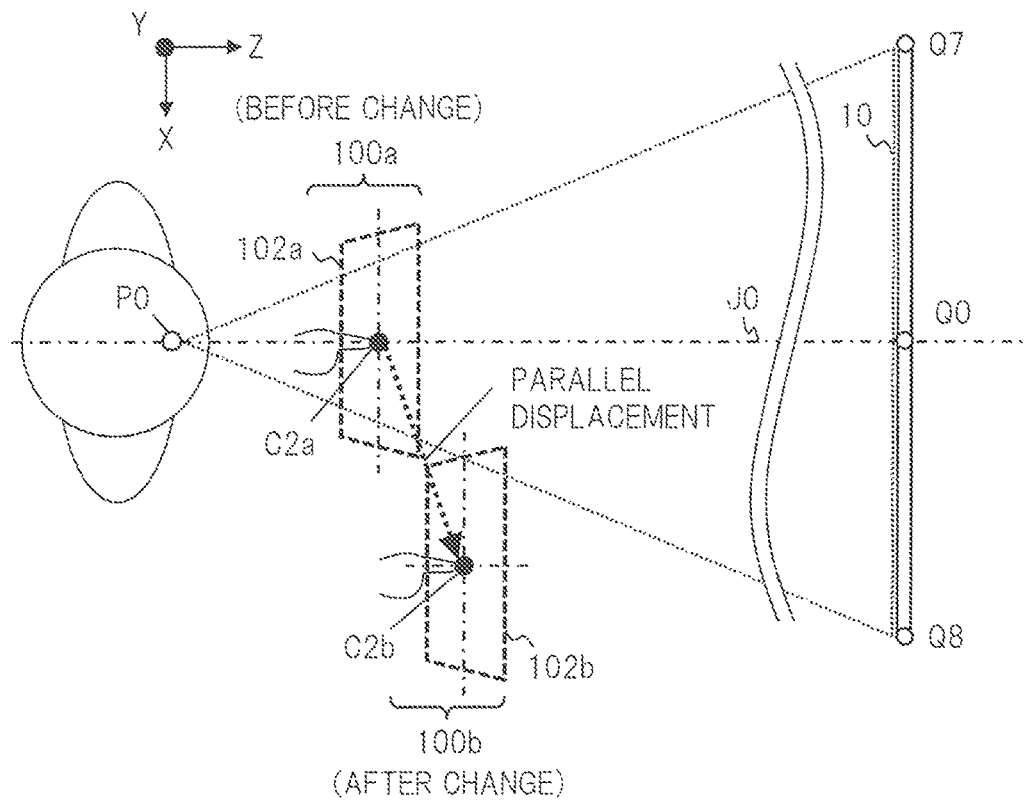
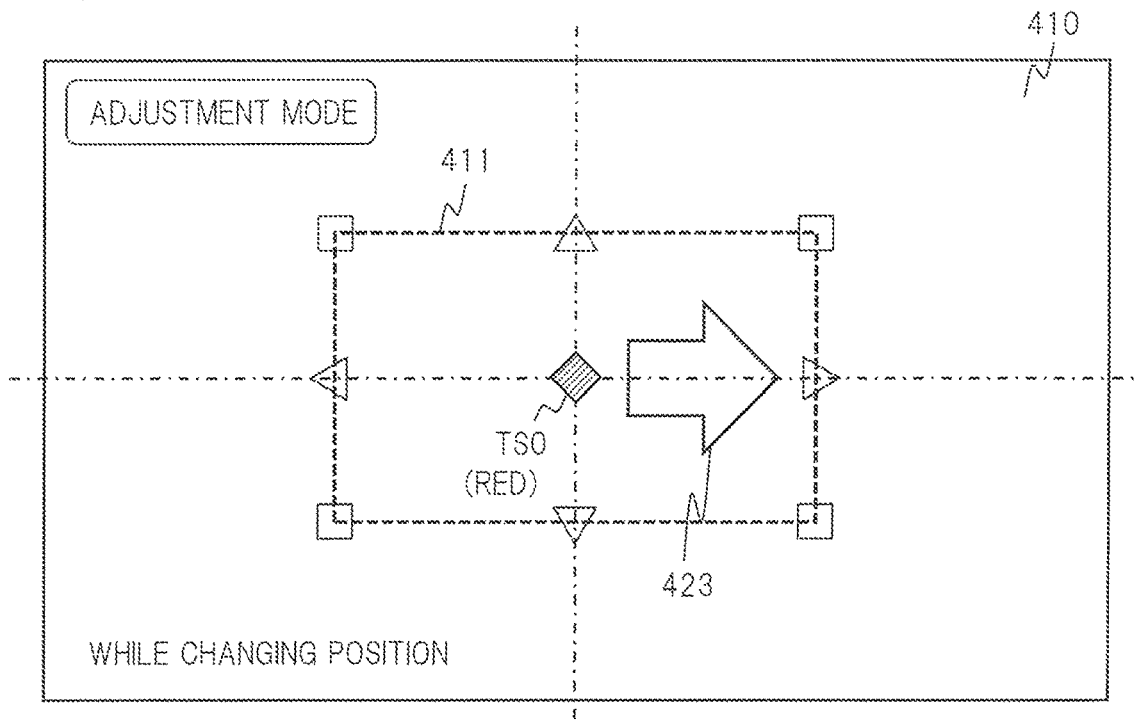

FIG. 26
(A) ADJUSTMENT OF VIRTUAL PLANE - POSITION
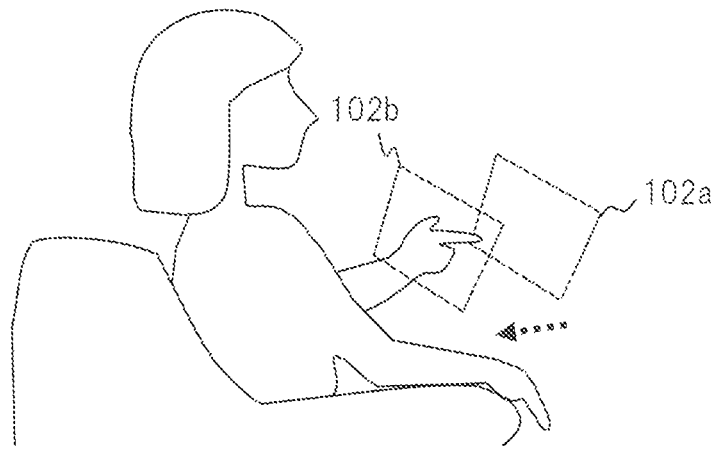
(B)
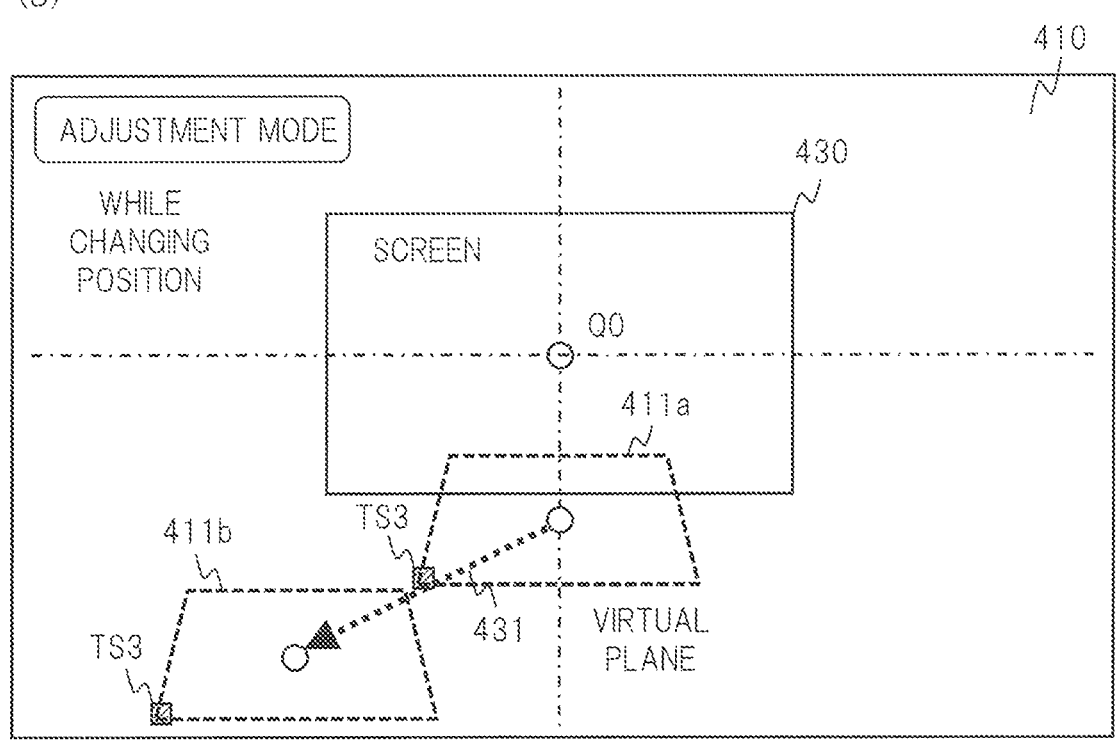

FIG. 27
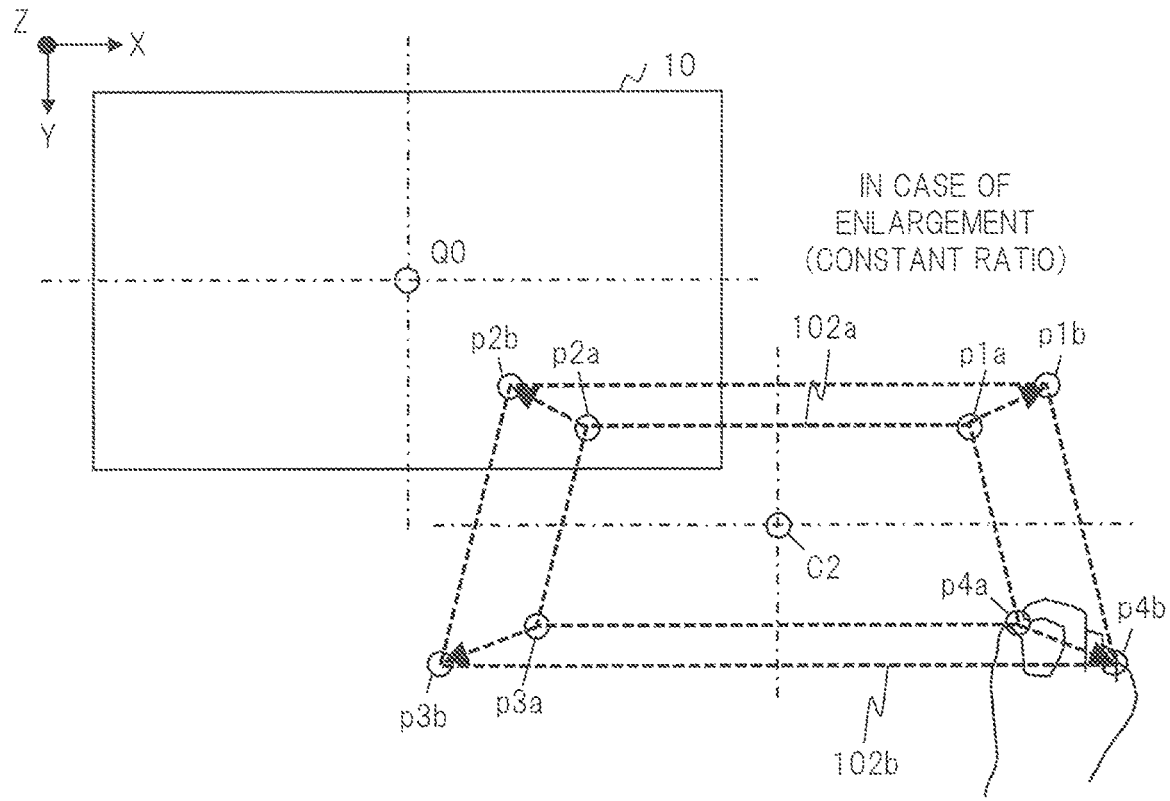
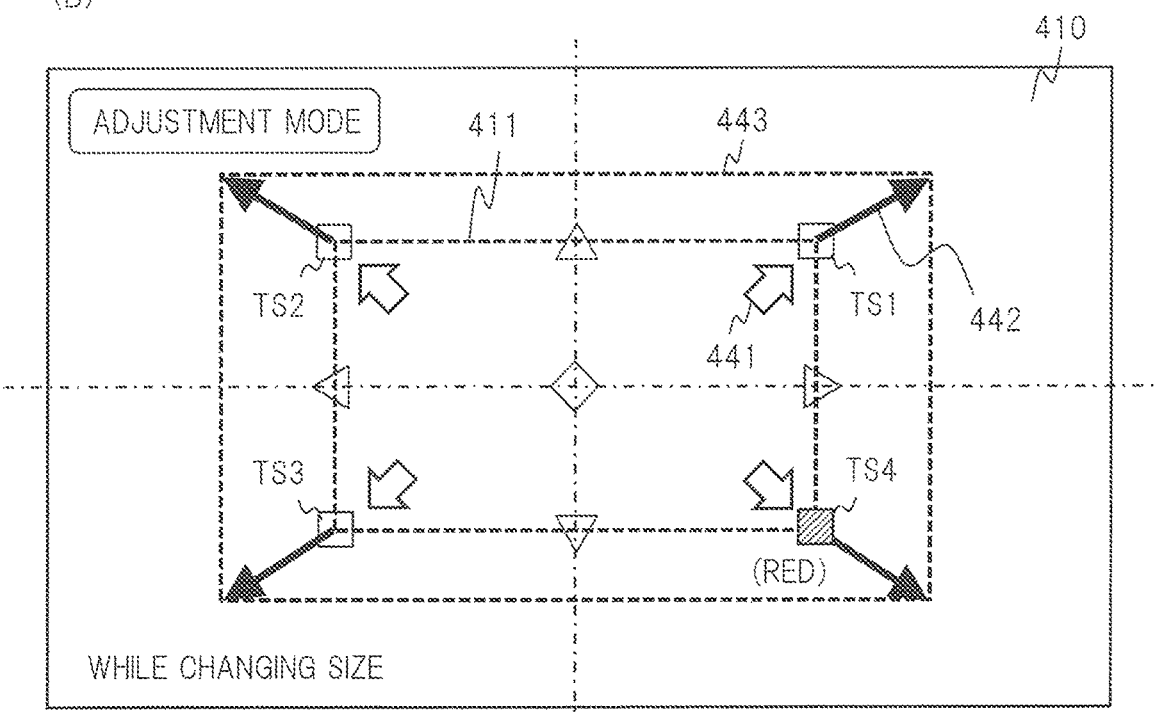

FIG. 29
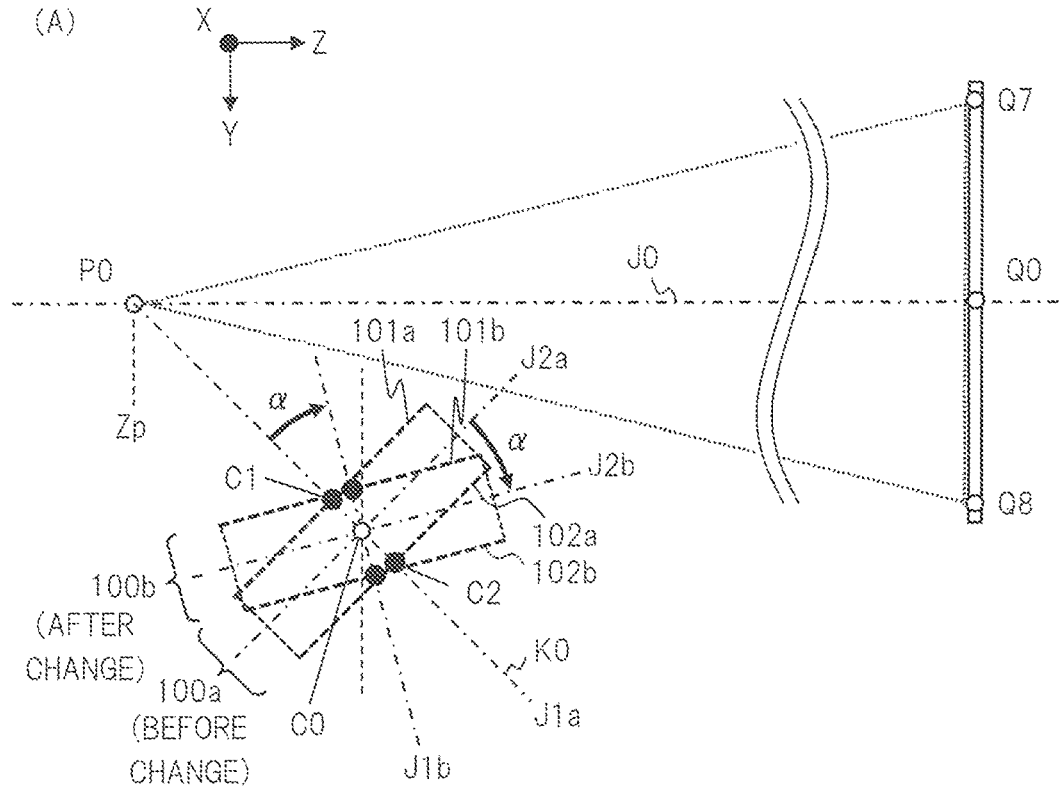
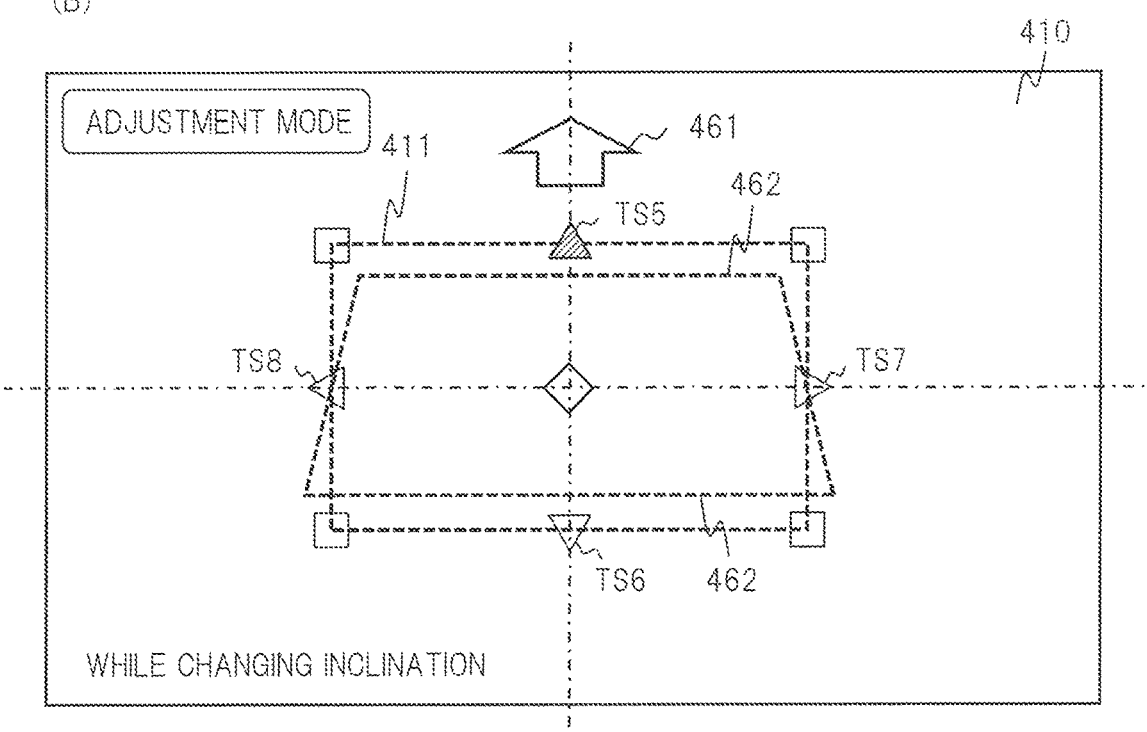

FIG. 30
ADJUSTMENT OF VIRTUAL PLANE - INCLINATION
(A)
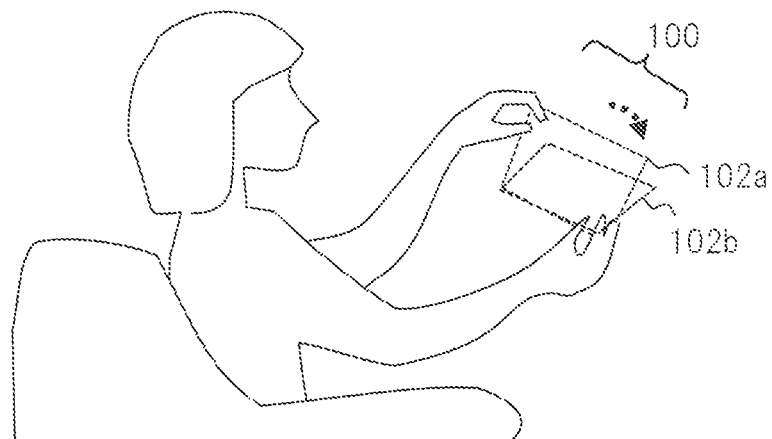
(B)
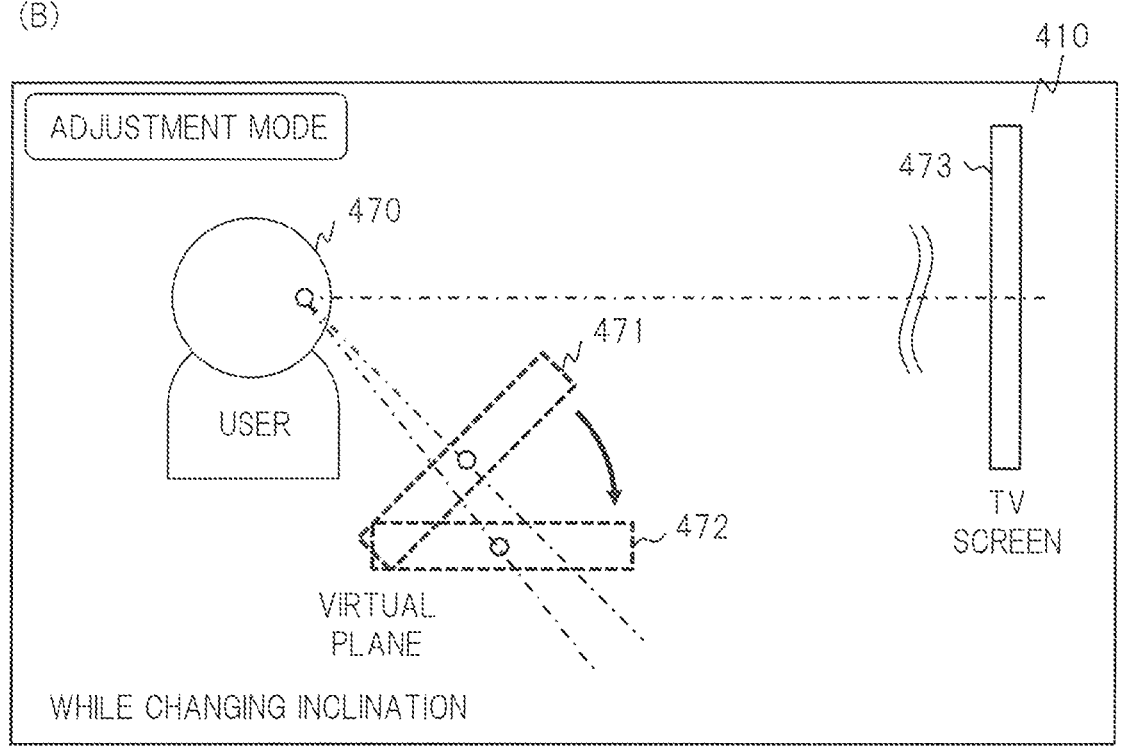

THIRD EMBODIMENT

FOURTH EMBODIMENT

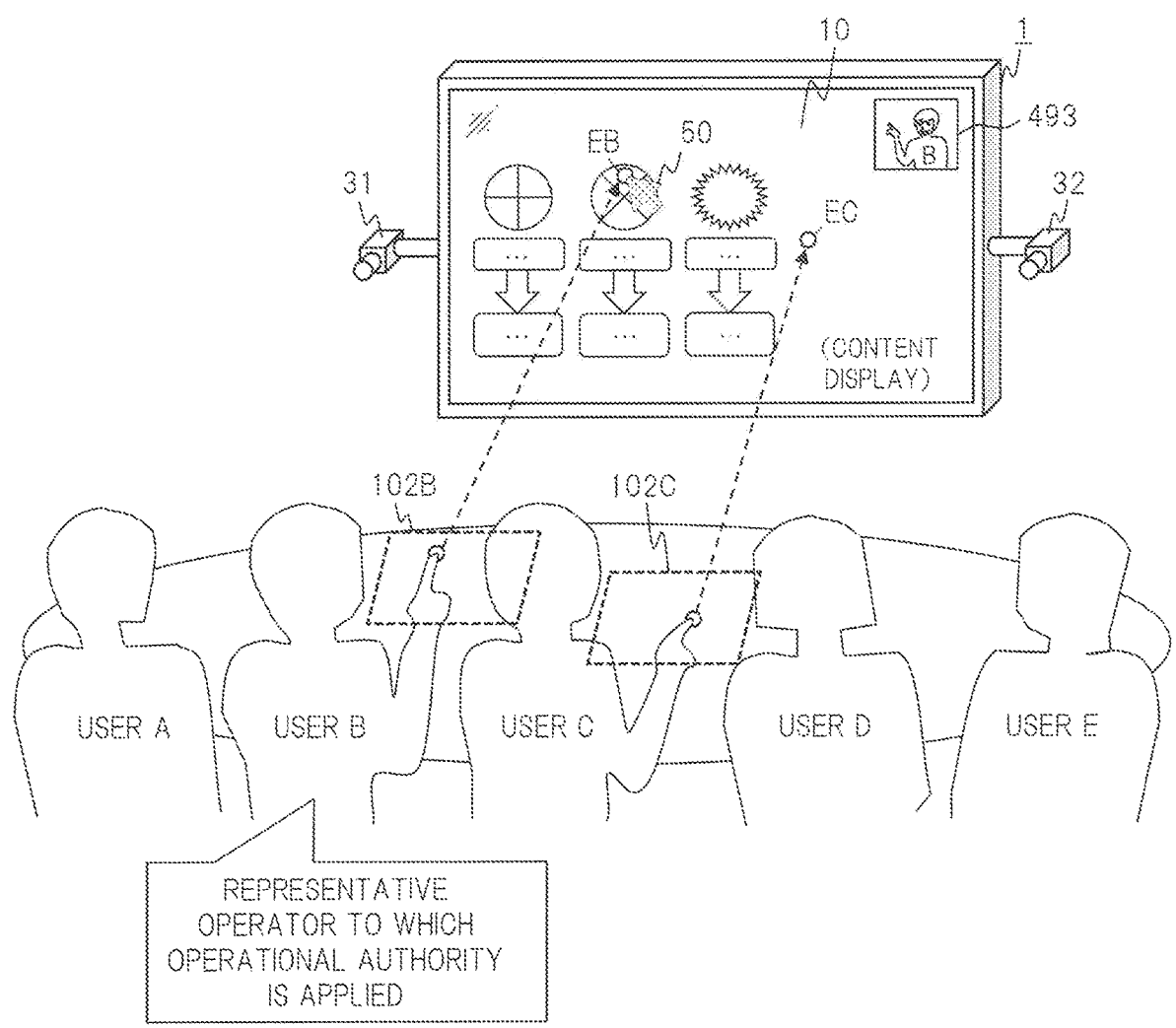

DISPLAY APPARATUS AND REMOTE OPERATION CONTROL APPARATUS

TECHNICAL FIELD

The present invention relates to a technique of an operational input of an electronic device and a control thereof. In particular, the present invention relates to a technique to realize a remote operation against a screen of a display apparatus without any device such as a remote controller. In particular, the present invention relates to an effective technique that can be applied to an electronic device to display video, which includes a man-machine interface (MMI) and/or a graphical user interface (GUI).

BACKGROUND ART

Heretofore, as general operation inputting means in various kinds of electronic devices or systems including a television receiver (television), a projection display apparatus (projector), a PC, a tablet terminal, and a smartphone, an operation panel, a remote controller, a keyboard, a mouse, a touch panel, and the like are widely used. For example, a user can operate an operation such as channel selection of a screen of a television by pressing a button on a remote controller held by a hand of the user. The user can select a desired item from an operation menu displayed on the screen and instruct it. The user can carry out an operational input against a PC by moving a mouse on a mouse pad. The user can carry out a touch input against a screen of a touch panel in a smartphone held by a hand of the user.

In recent years, with improvement of a technique such as a television, a camera, or a semiconductor and enlargement of environmental maintenance, an advanced operational input technique for intuitively and smoothly operating them compared with a conventional remote controller has been developed. An operational input technique to which a high-performance popularized camera has also been developed. For example, a technique to read a predetermined gesture based on a motion of an operator by cameras provided in the vicinity of an electronic device and control the electronic device by using the gesture as a remote operational input has been proposed. Even in such a situation, an operation by a remote controller still has been widely used. As a reason thereof, an easy and stable operation thereof and an inexpensively manufacturable one are major.

As examples of the operational input of the electronic device, in particular, examples of conventional techniques related to a remote operation control using cameras, Japanese Patent Application Publication No. H08-315154 (Patent Document 1) and Japanese Patent Application Publication No. 2004-258837 (Patent Document 2) are cited. Patent Document 1 described the following content as a gesture identifying system. The system detects existence of a predetermined hand gesture and a position thereof in a space by using cameras to generate a gesture signal, and displays a hand icon at a position on a screen corresponding to the position in the space, at which the hand gesture is detected, on the basis of the gesture signal. The system generates a mechanically controlled signal when the hand icon is moved onto a mechanically controlled icon in accordance with a motion of the hand gesture.

Patent Document 2 describes that a cursor operating apparatus detects a spatial position of a fingertip that points to a display screen and allows a remote operation, in which a cursor is moved in the display screen in conjunction with the fingertip, in a non-contact manner in addition to the following contents. Patent Document 2 also describes that the cursor smoothly follows a motion of the fingertip, whereby an apparatus with excellent pointing operability can be provided. Patent Document 2 also describes that the latest movement vector connecting a detected coordinate point on the display screen corresponding to a detected position of a pointing object to a previously displayed coordinate point is calculated, and the displayed coordinate point is corrected on the basis of the latest movement vector and the like.

RELATED ART DOCUMENTS

Patent Documents

Patent document 1: Japanese Patent Application Publication No. H08-315154
Patent document 2: Japanese Patent Application Publication No. 2004-258837

SUMMARY OF THE INVENTION

Problems to be Solved by the Invention

There are problems as follows in an operational inputting technique for a conventional electronic device. As a general problem, there is a case where a hand is full or management for a device becomes complicated in a case where any of a remote controller, a keyboard, or a mouse is used. There is also a case where a touch panel is unfit for a remote operation in a case where the touch panel is used. This is because it is necessary for a user to directly touch the touch panel. There is also a case where a mouse is unfit for a situation that a position of a user changes in a case where the mouse or the like is used. This is because the mouse is used while being arranged at a fixed position.

In the conventional remote operation technique using cameras, as described in Patent Document 1, a plurality of gestures each defined by a predetermined motion of a finger of a user is provided and an operation instruction or the like is associated with each gesture. In such a system, a user positioned apart from a screen carries out a predetermined gesture such as horizontal waving of his or her hand. The system detects the gesture on the basis of analysis of camera images, and gives an operation instruction according to the gesture. In such a technique, the user is required to distinguish and learn a correspondence relationship between each of a plurality of gestures and a corresponding operational input in advance, and the amount of required learning is relatively large in quantity. In order to prevent an unintentional operation, there is a need to be familiarized to an extent. Necessity of such learning is quite disadvantageous compared with easiness and convenience of the remote controller. The conventional technique has problems about usability of a user, and there is room for improvement thereof.

Further, in the technique as described above, a process to always detect a motion of a person and a shape of a finger from the whole camera images finely, a process to particularly distinguish and identify a specific gesture from a plurality of gestures, and a process to associate a command with each gesture are required for a remote operation by the gesture. This requires a large number of processes in the background of a computer, whereby a load becomes high.

It is an object of the present invention to provide an operational input technique of an electronic device, in particular, a technique capable of improving usability of a remote operation control technique using cameras by a user, for example, capable of easily operating the electronic device.

Means for Solving the Problem

A representative embodiment of the present invention illustrates a display apparatus that has a configuration described below.

A display apparatus according to one embodiment is a display apparatus with a function to control an operational input against a screen by a remote operation of a user, the display apparatus including a photographing unit including at least two cameras configured to photograph an area, the area including the user who views the screen. A second point and a third point with respect to a first point is detected by analysis of photographed video of the photographing unit, the first point indicating a reference position of the two cameras, the second point indicating a user reference position associated with a part of a body of the user, the third point indicating a position of a finger of the user. A virtual plane space including at least one virtual plane is set to a fourth point in a space, the fourth point being positioned apart from the second point by a predetermined length in a first direction. A degree of entrance of the finger with respect to the virtual plane space is calculated, the degree of entrance including a distance between the third point and the virtual plane space. A predetermined operation of the finger against the virtual plane space is determined on a basis of the degree of entrance. Operational input information is generated, the operational input information containing a position coordinate of the third point or a position coordinate of a fifth point associated with the third point in the screen, the operational input information further containing operation information that indicates the predetermined operation. An operation including a display control for the screen of the display apparatus is controlled on a basis of the operational input information.

Effects of the Invention

According to the representative embodiment of the present invention, it is possible to improve usability of an operational input of an electronic device by a user, in particular, to easily operate the electronic device with respect to a remote operation control using cameras.

BRIEF DESCRIPTIONS OF THE DRAWINGS

FIG. 8 is a view illustrating a correspondence relationship between the screen and the virtual plane according to the first embodiment;

FIG. 9 is a view illustrating a first display control example of the screen according to the first embodiment;

FIG. 11 is a view illustrating a second display control example of the screen according to the first embodiment;

FIG. 12 is a view illustrating another display control example of the screen according to the first embodiment;

FIG. 13 is a view illustrating an example of a predetermined operation against the virtual plane according to the first embodiment;

FIG. 15 is a view illustrating an example of a pinch operation as the predetermined operation according to the first embodiment;

FIG. 16 is a view illustrating adjustment of the virtual plane according to the first embodiment;

FIG. 21 is a view illustrating a configuration of a display system according to a first modification example of the first embodiment;

FIG. 22 is a view illustrating a distance measuring method between cameras according to the first modification example of the first embodiment;

FIG. 23 is a view illustrating adjustment of a virtual plane according to a second modification example of the first embodiment;

FIG. 25 is a view illustrating a control example of adjustment of a position of the virtual plane according to the third modification example of the first embodiment;

FIG. 26 is a view illustrating another control example of the adjustment of the position of the virtual plane according to the third modification example of the first embodiment;

FIG. 27 is a view illustrating a control example of adjustment of a size of the virtual plane according to the third modification example of the first embodiment;

FIG. 29 is a view illustrating a control example of adjustment of inclination of the virtual plane according to the third modification example of the first embodiment;

FIG. 30 is a view illustrating another control example of the adjustment of the inclination of the virtual plane according to the third modification example of the first embodiment;

FIG. 43 is a view illustrating a configuration and an example of the utility of a display system that includes a display apparatus according to a seventh embodiment of the present invention.

DETAILED DESCRIPTION OF EMBODIMENTS

Figure 1:
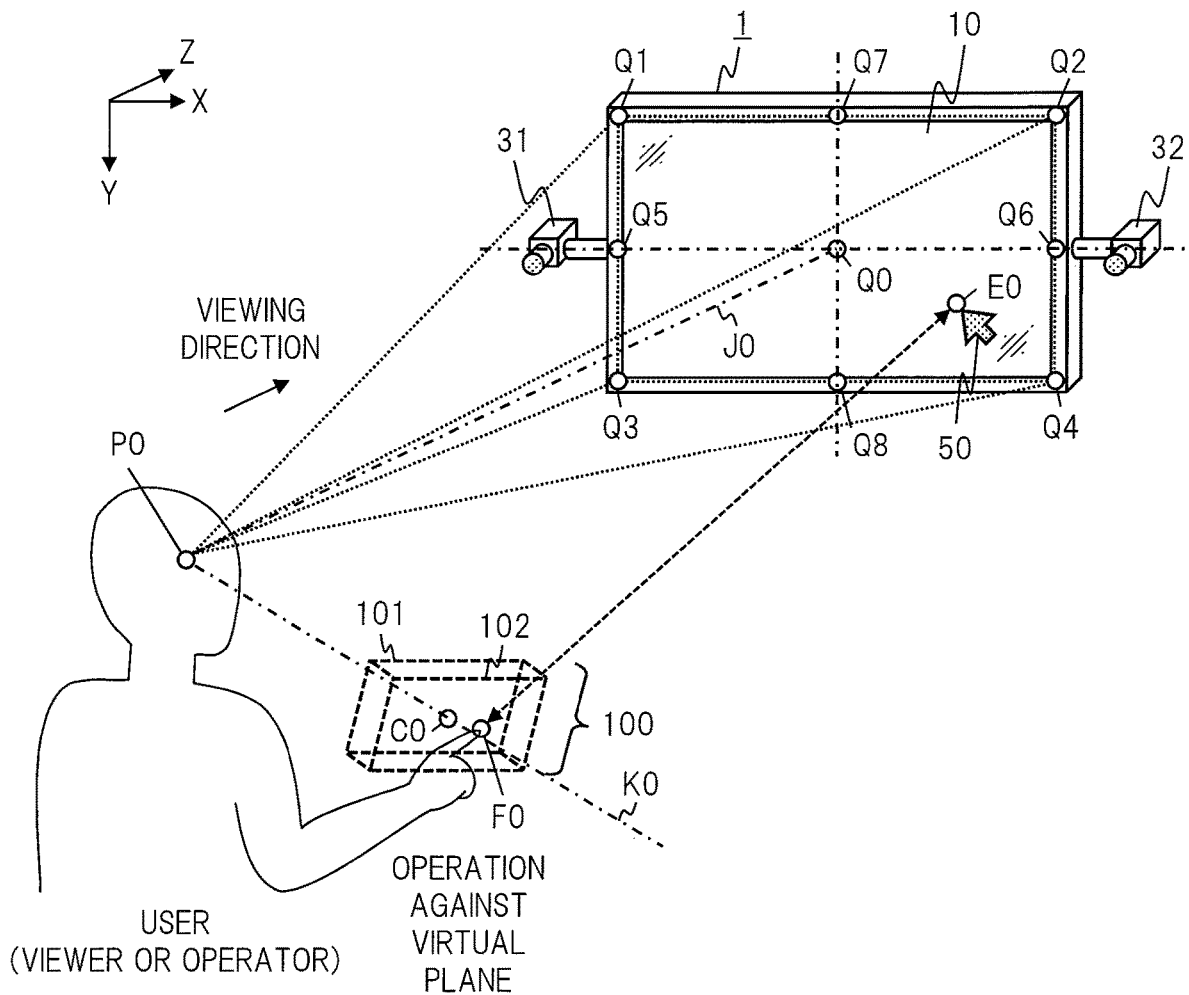
FIG. 1 is a view illustrating a configuration of a display system that includes a display apparatus according to a first embodiment of the present invention.

Hereinafter, embodiments of the present invention will be described in detail with reference to the drawings. Note that in all of the drawings for explaining the embodiments, the same reference numeral is generally assigned to the same unit, and its repeated explanation will be omitted.

First Embodiment

A display apparatus according to a first embodiment of the present invention will be described with reference to FIG. 1 to FIG. 33. The display apparatus according to the first embodiment has a specific remote operation control function. In this function, a virtual plane space near a user is set with respect to a screen. A degree of entrance of a finger of the user with respect to the virtual plane space is detected. A predetermined operation such as touch against the virtual plane is determined in accordance with the detection. The display apparatus is controlled so that an operational input against an operation panel or the like is associated with the predetermined operation.

[Display System (1)]

FIG. 1 illustrates a configuration of a display system that includes the display apparatus according to the first embodiment. FIG. 1 perspectively and schematically illustrates a state where a user is viewing a screen 10 of a display apparatus 1. Note that (X, Y, Z) is used as directions and a coordinate system for explanation in which an X direction is a first direction, a Y direction is a second direction, and a Z direction is a third direction. The X direction and the Y direction are two directions perpendicular to each other, which constitute the screen 10. The X direction is a horizontal direction in the screen 10, and the Y direction is a vertical direction in the screen 10. The Z direction is a direction perpendicular to both the X direction and the Y direction in the screen 10. The user is a viewer who views video on the screen 10 of the display apparatus 1, and is an operator who carries out a remote operation against the screen 10. FIG. 1 illustrates a case where posture of the user when viewing is normal posture in which the user faces the screen 10 and a viewing direction is along the Z direction. FIG. 1 illustrates a case where the screen 10 stands in the vertical direction.

A point indicating a user reference position associated with a part of a body of the user indicates a point P0. In the first embodiment, one point of a head and a face, for example, a middle point between both eyes is set as the point P0 as the user reference position as a representative. The point P0 corresponds to a point of view of the user. In a case where the face or the like can be detected from images of two cameras, the point P0 can be set. Note that the user reference position is not limited to that according to the present embodiment and can be set. For example, the user reference position may be one point of a head area, or may be a center of gravity of a body area or the like.

A point indicating a position of the finger at the time of the remote operation by the user is indicated by a point F0. The point F0 is a point of a fingertip, which becomes the nearest position to the screen 10 in the Z direction, for example. The point F0 is a point of the fingertip that enters the innermost with respect to a virtual plane space 100. FIG. 1 illustrates a state where the point F0 indicating a tip of one finger of a right hand enters the virtual plane space 100 to operate a virtual plane.

The display apparatus 1 is a television receiver, for example. The display apparatus 1 has a function to receive broadcast waves to reproduce and display broadcasting programs, a function to reproduce and display video on a basis of digital input data, and the like. Hardware and software improved from a conventional technique are implemented on the display apparatus 1 in order to realize the remote operation control function. The screen 10 has a rectangular plane in which a central point is a point Q0 and four angular points are points Q1 to Q4. A middle point of a right side is a point Q5; a middle point of a left side is a point Q6; a middle point of an upper side is a point Q7; and a middle point of a lower side is a point Q8.

The display apparatus 1 includes a camera 31 and a camera 32 that are two cameras (that is, a stereo camera). The two cameras are disposed at right and left positions with respect to the screen 10 (on an axis connecting the point Q7 to the point Q8). The camera 31 is a camera positioned at the right side, and is disposed near the point Q5 in the middle of the right side. The camera 32 is a camera positioned at the left side, and is disposed near the point Q6 in the middle of the left side. The two cameras are disposed to face a direction to photograph a predetermined area including the user in front of the screen 10. The cameras 31 and 32 are respectively connected to both left and right sides of a housing of the display apparatus 1 via adjusting and supporting means. A position and a photographing direction of each of the cameras 31 and 32 can be finely adjusted in a predetermined range by the user. A point indicating a camera reference position is a middle point of the two cameras, and corresponds to the point Q0 in the present embodiment. Each of the cameras 31 and 32 is connected to the display apparatus 1 via a wireless communication interface. However, the communication interface is not limited to this. Each of the cameras 31 and 32 may be connected to the display apparatus 1 via a wired communication interface.

Each of the cameras 31 and 32 outputs an image signal of photographed video. A finger or a face of a body of the user is contained in a moving image (video) or a still image, which is a camera image, as a target. The display apparatus 1 has a function to detect a distance of a target object and a position of the target object by distance measurement based on binocular parallax using photographed videos of the two cameras 31 and 32. A known principle can be applied thereto as the distance measurement based on the binocular parallax. The distance of the target object is a distance between the camera reference position (the point Q0) and a finger position (the point F0) or a distance between the camera reference position (the point Q0) and the user reference position (the point P0). Each of the point F0 and the point P0 can be obtained in each point of time as a position coordinate of a coordinate system (X, Y, Z) in a three-dimensional space.

In a case where the user views the screen 10, a space having a schematically quadrangular pyramid shape is assumed in which the four points Q1 to Q4 of the screen 10 constitutes a bottom surface and the point P0 of the user reference position constitutes an apex. A straight line connecting the point P0 to the point Q0 is indicated as a reference axis J0. A direction of the reference axis J0 corresponds to a viewing direction when the user views the point Q0 of the screen 10.

The display apparatus 1 sets the virtual plane space 100 to a predetermined position in a space on the basis of detection of the point P0 of the user reference position. The predetermined position is defined within an area, which the finger can reach, forward from the point P0, that is, in the Z direction toward the screen 10 by a predetermined first direction and a length. For example, the virtual plane space 100 is set to a position on a reference axis K0 away from the point P0 by a predetermined length. The reference axis K0 has an angle in a right oblique downward direction from the point P0 with respect to the reference axis J0. In the present embodiment, in a case where the user has right handedness, the virtual plane space 100 is disposed at a position in the vicinity of the right hand. A point C0 indicates a central point that indicates a reference position for setting the virtual plane space 100. The virtual plane space 100 is a space that does not have a physical substance and is set as the position coordinate of the three-dimensional space by means of calculation by a processor or the like of the display apparatus 1. In the first embodiment, the virtual plane space 100 is configured by two virtual planes, which has a first virtual plane 101 arranged at a front side near the user, and a second virtual plane 102 positioned at a back side. A predetermined thickness is provided between the first virtual plane 101 and the second virtual plane 102. A roughly rectangular or tabular space portion sandwiched by the first virtual plane 101 and the second virtual plane 102 is the virtual plane space 100.

In a setting state of FIG. 1, the virtual plane space 100 is arranged in the right oblique downward direction from the point of view of the user (the point P0). In a field of view when the user views the screen 10 from the point of view thereof, the virtual plane space 100 does not overlap the screen 10. In case of normal viewing, there is no object that obstacles the viewing between the point of view of the user and the screen 10, and no finger is not held up therebetween.

Each of the first virtual plane 101 and the second virtual plane 102, which is the virtual plane, is a virtual plane by which the remote operation against the screen 10 by the user (which may be referred to as a "virtual plane operation" or "predetermined operation") is received. In particular, the first virtual plane 101 and the second virtual plane 102 are parallel planes. The virtual plane is managed so as to be one-to-one associated with the screen 10. A position in the virtual plane space 100 is associated with a position in the screen 10 (see FIG. 3 and FIG. 8, which will be described later). A point E0 is illustrated as an example of the position in the screen 10, which is associated with the point F0 of the finger position in the virtual plane. For example, in a case where the user carries out a predetermined operation so as to point to the vicinity of the lower right of the virtual plane space 100, an operational input is executed so as to point to a position in the vicinity of the lower right of the screen 10 in response to it.

A method of setting the point C0 of the virtual plane space 100 is as follows, for example. The point C0 is set to a position of a tip of a vector on the basis of setting information of the virtual plane space 100. The vector has a predetermined direction and a distance from the point P0 in the space. In other words, this may be as follows. A temporary point is first provided at a position on the reference axis J0 apart from the point P0 by a predetermined length toward a direction from the point P0 to the point Q0. A next temporary point is provided at a position away from the temporary point downward in the vertical direction by a predetermined length. The point C0 is provided at a position away from the next temporary point in the horizontal direction by a predetermined length.

The display apparatus 1 detects a predetermined operation from a state of a positional relationship between the virtual plane space 100 and the point F0 of the finger and the degree of entrance. The display apparatus 1 associates the predetermined operation with a remote operational input against a GUI of the screen 10 or a body of the display apparatus 1. A perpendicular axis passing through the point C0 positioned at the center of the virtual plane space 100 is indicated as the reference axis K0. The display apparatus 1 determines a distance and the degree of entrance (hereinafter, referred to also as a "depth") of the point F0 of the finger with respect to each of the first virtual plane 101 and the second virtual plane 102 in the direction of the reference axis K0.

In a case where the point F0 of the finger reaches the first virtual plane 101 and enters the back of the first virtual plane 101, for example, the display apparatus 1 automatically shifts to a state where the predetermined operation is to be received, and display a cursor 50 on the screen 10 as a pointer image for feedback. This cursor 50 is information for feedback of an operation state, such as existence or the position of the finger of the user on the virtual plane space 100, to the user. The cursor 50 is displayed at a position in the vicinity of the point E0 in the screen 10, which is associated with the point F0 of the finger position in the virtual plane space 100. Feedback display allows the user to easily identify the operation state of the virtual plane space 100.

Moreover, in a case where the point F0 of the finger position reaches the second virtual plane 102 and enters the back of the second virtual plane 102, the display apparatus 1 determines and detects a predetermined operation. The predetermined operation is an operation such as touch, tap, swipe, or pinch against the second virtual plane 102, for example. These predetermined operations are operations equivalent to conventional operations such as physical touch against a touch panel. However, the predetermined operations are operations different from a point that the operations include a motion of entrance in a depth direction in which there is nothing. The display apparatus 1 detects a predetermined operation, and generates operational input information that contains a position coordinate of the point F0 of the detected position of the finger (or a position coordinate of the point E0 associated with the point F0) and operation information indicating the predetermined operation. The display apparatus 1 controls an operation of the display apparatus 1 including a display control of the GUI of the screen 10 by using the operational input information. The user moves the finger on the virtual plane space 100 while viewing content, the operation panel, the cursor 50, and the like displayed on the screen 10, for example. The user carries out a predetermined operation such as touch against an operation button on the operation panel. In a case where the predetermined operation is detected, the display apparatus 1 executes a predetermined correspondence process (for example, channel selection) defined so as to be associated with a touch operation to the operation button.

The display apparatus 1 may detect the position of the finger and the degree of entrance with respect to the virtual plane space 100. This process can be realized by a process with a relatively light load. There is no need for the display apparatus 1 to detect each of a plurality of gestures by the user with high speed and high accuracy unlike the conventional technique. The user is not required to learn the plurality of gestures, and may learn operations such as conventional click of a mouse or touch of the touch panel and predetermined operations similar to their feelings.

[Display System (2)]

Figure 2:
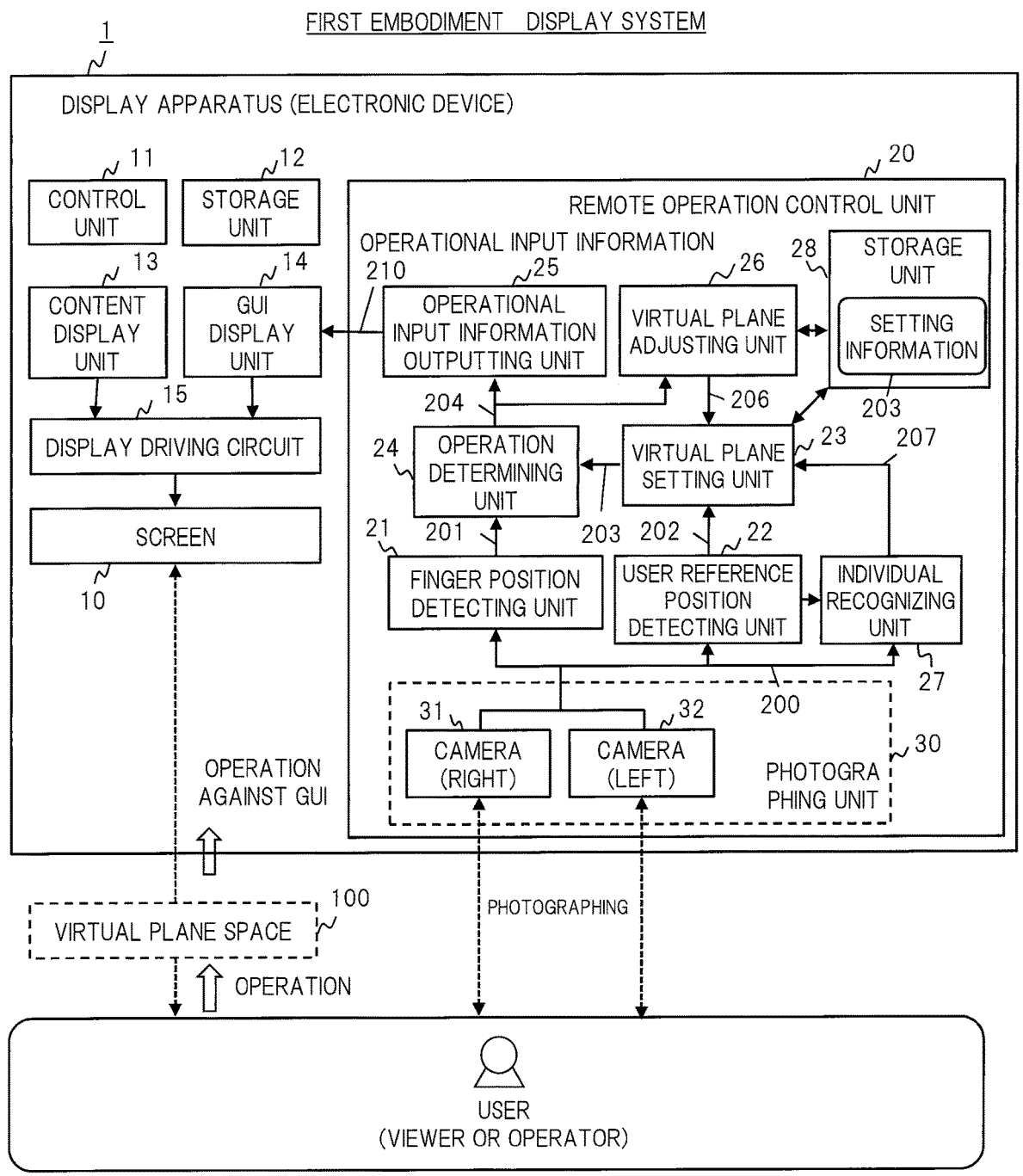
FIG. 2 is a view illustrating a functional block configuration of the display system according to the first embodiment.

FIG. 2 illustrates a functional block configuration of the display apparatus 1 in the display system illustrated in FIG. 1. The display apparatus 1 includes a control unit 11, a storage unit 12, a content display unit 13, a GUI display unit 14, a display driving circuit 15, the screen 10, and a remote operation control unit 20. The remote operation control unit 20 includes a photographing unit 30 having the cameras 31 and 32, a finger position detecting unit 21, a user reference position detecting unit 22, a virtual plane setting unit 23, an operation determining unit 24, an operational input information outputting unit 25, a virtual plane adjusting unit 26, an individual recognizing unit 27, and a storage unit 28.

The control unit 11 controls the whole display apparatus 1. In a case where a remote operation is made, the control unit 11 controls an operation of the display apparatus 1 in accordance with operational input information 210. The storage unit 12 stores information for control and data such as content therein. The content display unit 13 displays video of content on the screen 10 on the basis of content data. The content may be various types such as a broadcasting program, DVD video, or an information package. The display driving circuit 15 generates a video signal on the basis of video data inputted from the content display unit 13 or the GUI display unit 14, and causes the screen 10 to display video.

The GUI display unit 14 is an element that executes a process to control image display of the GUI of the screen 10 and a specific correspondence process based on an operation against an object of the GUI under an OS or an application of the display apparatus 1. In particular, the GUI display unit 14 also has a function to display an operation panel (will be described later) and a menu screen or the like regarding the remote operation control function on the screen 10. The GUI may be displayed so as to be superimposed on the content. The GUI display unit 14 executes the specific correspondence process based on the operational input against the object of the GUI on the basis of the operational input information 210. This makes it possible to control a display state of the GUI. Further, the GUI display unit 14 controls a display state of the cursor 50 and the like on the screen 10 by using the operational input information 210.

The user carries out an operation against the virtual plane space 100 illustrated in FIG. 1. The operation is a remote operation for the GUI of the screen 10. The operation is detected by the remote operation control unit 20, is converted into an operational input against the GUI of the screen 10, and is generated as the operational input information 210. Each of the two cameras 31 and 32 of the photographing unit 30 photographs an area including the face and the finger of the user, and outputs the image signal of photographed video 200. The photographed video 200 is inputted into the finger position detecting unit 21 and the user reference position detecting unit 22. The remote operation control unit 20 detects a motion of the finger of the user in the space by using a calculating process by the processor or the like and the photographed video 200 of the photographing unit 30.

The finger position detecting unit 21 detects the position coordinate of the point F0 of the finger on the basis of an image of the photographed video 200 by an image analyzing process or a process of the distance measurement based on the binocular parallax. The finger position detecting unit 21 outputs information indicating a finger position 201 thus detected. The process of the distance measurement based on the binocular parallax is a process to measure a distance between the camera reference position of the cameras 31 and 32 and the finger position (see FIG. 19, which will be described later).

The user reference position detecting unit 22 detects a position coordinate of the point P0 indicating the user reference position on the basis of the image of the photographed video 200. The user reference position detecting unit 22 outputs information indicating a detected user reference position 202.

The virtual plane setting unit 23 executes a process to set the virtual plane space 100 to a predetermined position near the body of the user on the basis of the camera reference position (the point Q0) and the information indicating the user reference position 202 (the point P0). The virtual plane setting unit 23 outputs setting information 203 indicating the virtual plane space 100 set for each of the individual users, and is also stored in the storage unit 28. The storage unit 28 is configured by a nonvolatile memory or the like, and holds the setting information 203 even in a power OFF state.

The operation determining unit 24 determines and detects a predetermined operation from the degree of entrance of the finger with respect to the virtual plane space 100 on the basis of information on the finger position 201 and the setting information 203. The operation determining unit 24 determines whether the finger enters the back of the first virtual plane 101 or not and whether the finger enters the back of the second virtual plane 102, for example. The operation determining unit 24 determines the predetermined operation with respect to the virtual plane space 100, such as touch, tap, swipe, or pinch, on the basis of the degree of entrance and the like. The operation determining unit 24 outputs the position coordinate of the point F0 of the finger and operation information 204 indicating a predetermined operation.

The predetermined operation is interpreted in the GUI display unit 14 as the operational input against the object of the GUI.

The operational input information outputting unit 25 generates the operational input information 210 with predetermined format on the basis of a finger position coordinate and the operation information 204, and outputs the operational input information 210 to the GUI display unit 14 and the like. The operational input information 210 contains position coordinate information on the point F0 of the finger position in each point of time. In a case where the predetermined operation is detected, the operational input information 210 contains operation information indicating the predetermined operation. The operation information is information indicating a type of the predetermined operation such as touch, tap, swipe, or pinch and presence or absence of the predetermined operation. Further, in a case where there is need to update the display state of the cursor 50 in accordance with the finger position, the operational input information 210 contains display control information for that. The display control information is information for controlling the display state of the cursor 50 on the screen 10, and contains presence or absence of display of the cursor 50, and information on specification of a size, color, a shape type or the like. The operational input information outputting unit 25 controls to change the position or the like of the cursor 50 in the screen 10 in accordance with the finger position in the virtual plane space 100.

Note that in the first embodiment, a remote operation against the operation panel of the screen 10 is available. The display control information regarding the operation panel is contained in the operational input information 210. Further, the operational input information 210 is not limited to information for controlling the GUI display unit 14, and may be any other information. The operational input information 210 may contain a command or the control information of an operation instruction to the OS, the application, or the content of the display apparatus 1. For example, by giving the operational input information 210 from the operational input information outputting unit 25 to the control unit 11, the control unit 11 may execute a control process for the operation of the display apparatus 1 on the basis of the operational input information 210.

Further, the remote operation control unit 20, for example, the operational input information outputting unit 25 automatically executes a managing process and a converting process of a correspondence relationship between the position coordinate of the point F0 of the finger in the virtual plane space 100 and the position coordinate of the point E0 in the screen 10. In that case, position coordinate information on the point E0 in the screen 10 and the like are contained in the operational input information 210. This management and conversion may be executed by the GUI display unit 14 or the like.

The virtual plane adjusting unit 26 executes determination and switching regarding a mode (will be described later) on the basis of the operation information 204, and determines an operation for adjusting the virtual plane space 100 for the individual user (hereinafter, referred to also as an "adjusting operation"). The virtual plane adjusting unit 26 then executes a process to change the position, the size, or the inclination of the virtual plane space 100 for the individual user in real time in accordance with the adjusting operation. The virtual plane adjusting unit 26 outputs adjustment information 206 indicating the adjusted virtual plane space 100 for the individual user. The virtual plane adjusting unit 26 updates the setting information 203 for the individual user in the storage unit 28 in response to the adjustment. Note that it may be a combined form so that a determining process for the adjusting operation and the like is executed by the operation determining unit 24. The virtual plane setting unit 23 updates a setting state of the virtual plane space 100 on the basis of the adjustment information 206.

The display apparatus 1 also has a function to set initial states of the position, the size, or the inclination of the virtual plane space 100 for every user in advance. The display apparatus 1 provides a user setting screen to guide a utilizing method of the virtual plane space 100. The display apparatus 1 first provides a default virtual plane space 100 to cause the user to adjust the position, the size, or the inclination. Then, the user can adjust his or her own virtual plane space 100 to a desired easy-to-use state by using an adjustment function as needed.

The individual recognizing unit 27 executes a process to identify an individual user on the basis of an input of the photographed video 200. Note that, in a case where the face or the like is detected by the user reference position detecting unit 22, the individual recognizing unit 27 may use the information indicating the user reference position 202. For example, the individual recognizing unit 27 detects a face portion in an image on the basis of known image processing, and extracts facial feature information. The individual recognizing unit 27 compares and collates the extracted facial feature information with facial image data of the individual user registered in the storage unit 28 in advance, and determines the individual user. The individual recognizing unit 27 outputs recognition result information 207 based on personal recognition. The virtual plane setting unit 23 reads out the setting information 203 for the virtual plane set for the individual user on the basis of the recognition result information 207, and outputs it. Note that, in a case where the setting information 203 for the individual user is not registered, default setting information is readout from the storage unit 28 and used. The individual recognizing unit 27 can be applied to a system other than the method of identifying a personal user from a facial image. For example, it may be applied to a method of using a user ID inputted by the user or various kinds of biometric authentication methods.

A method of registering the facial image data for the individual user is as follows. The user selects an item "facial image registration" from the user setting screen on the screen 10 of the display apparatus 1. The display apparatus 1 enters a facial image register mode in response to the selection, displays a message for facial image registration to the user, and causes the user to become a state where the face of the user is turned to the cameras 31 and 32. The display apparatus 1 photographs the face in that state, registers the facial image data and the like as information on the individual user, and stores them in the storage unit 28. Note that such registration may be omitted and the camera image at normal use may be utilized.

As a modification example, it may be a form in which the operation determining unit 24 is integrated into the GUI display unit 14. In that case, the remote operation control unit 20 at least outputs the operational input information 210 that contains a position coordinate of the point F0 of the finger in each point of time.

[Display System (3)]

In the display system according to the first embodiment, the virtual plane operation that is the predetermined operation is mainly realized only by a detecting process of the point F0 of the finger position. In the first embodiment, the point P0 of the user reference position, such as the face, is first detected, and the virtual plane space 100 is automatically set to a relative position with respect to the point P0 (a relative system of FIG. 7, which will be described later). Then, the point F0 of the finger position in the virtual plane space 100 is detected, and a touch operation or the like that is the predetermined operation is determined and detected.

In the first embodiment, the adjusting operation, which is the operation for adjusting the virtual plane space 100, is provided in addition to a normal virtual plane operation, and both operations are determined and detected so as to be distinguished from each other. The position, the size, or the inclination of the virtual plane is changed in real time in response to detection of the adjusting operation.

In the first embodiment, an adjustment mode is explicitly provided to the user in addition to a normal mode. The normal virtual plane operation can be utilized in the normal mode. Adjustment of a virtual plane can be utilized in the adjustment mode. The normal mode and the adjustment mode are switched in a time-division manner. In the normal mode, a predetermined normal operation is received, but any adjusting operation is not received. In the adjustment mode, an adjusting operation is received. The display apparatus 1 switches from the normal mode to the adjustment mode in response to detection of a predetermined mode switching operation (an adjustment mode switching operation), for example. The display apparatus 1 switches from the adjustment mode to the normal mode in response to detection of a predetermined mode switching operation (a normal mode switching operation). When the adjusting operation by the user is detected during the adjustment mode, image information indicating an adjusting operation state is displayed on the screen 10 as feedback.

In the first embodiment, an operation of one finger and the like can be carried out as the predetermined normal operation, and an operation of one finger and the like can similarly be carried out as the adjusting operation.

[Relationship Between Screen and Virtual Plane in Field of View]

Figure 3:
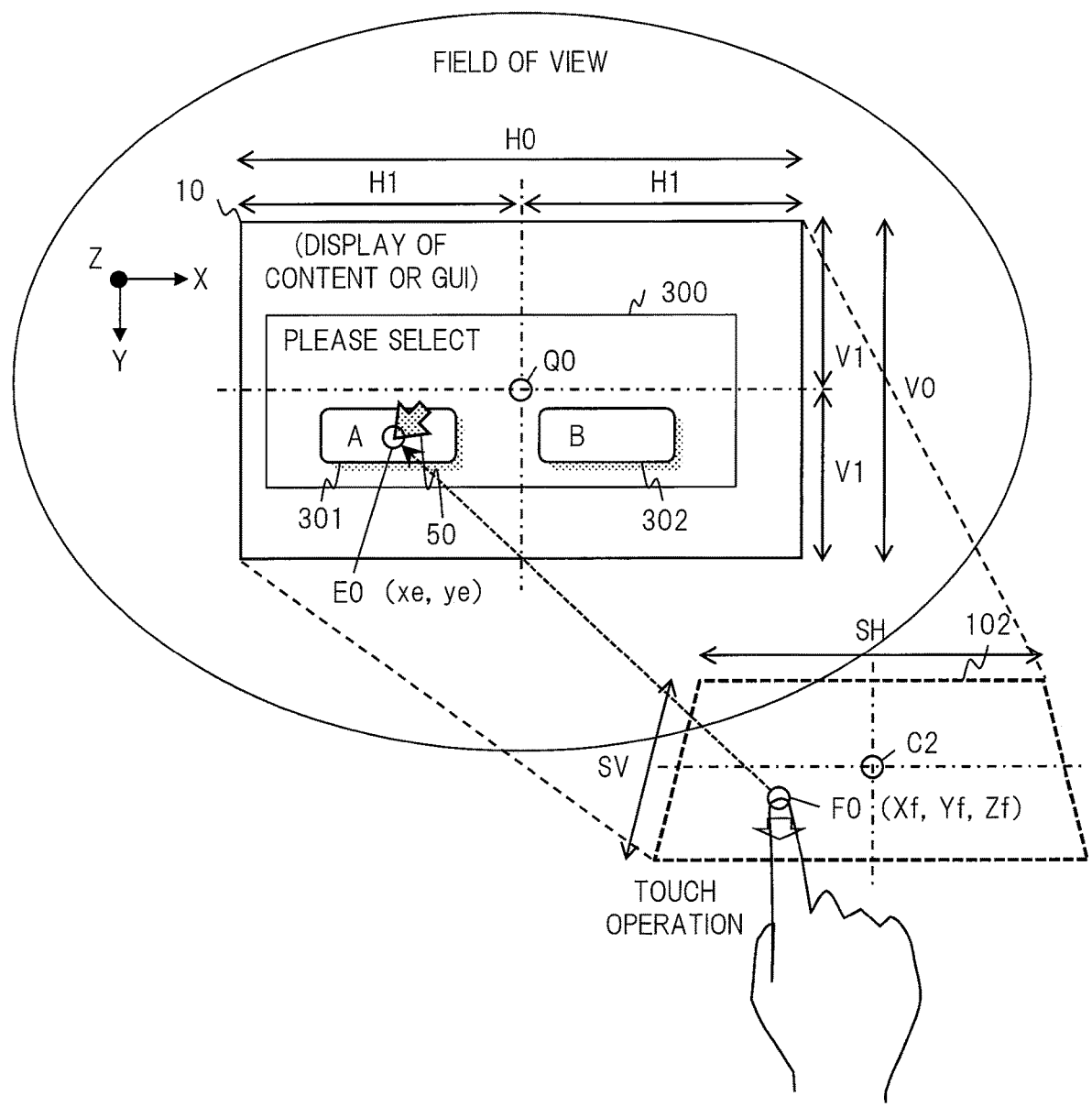
FIG. 3 is a view illustrating a relationship between a screen and a virtual plane in a field of view of a user according to the first embodiment.

FIG. 3 schematically illustrates a relationship between the screen 10 in a field of view of the user and the virtual plane space 100, in particular, the second virtual plane 102. A size of the screen 10 in a lateral direction (the X direction) is indicated by H0, and a half size of H0 is indicated by H1. A size thereof in a vertical direction (the Y direction) is indicated by V0, and a half size of V0 is indicated by V1. In the field of view, the point C0, which is the center of the virtual plane space 100, is located at a position out of the point Q0, which is the center of the screen 10. A central point of the first virtual plane 101 is indicated by a point C1, and a central point of the second virtual plane 102 is indicated by a point C2. In the example illustrated in FIG. 3, content video (which illustration is omitted) and an operation menu 300 of the GUI are displayed on the screen 10. Choice buttons 301 and 302 are included in the operation menu 300, for example. In the present embodiment, a state where the user carries out a touch operation against the point F0 located at a lower left area of the second virtual plane 102. A position coordinate of the point F0 is indicated by (Xf, Yf, Zf). A touch operation against the point E0 on the choice button 301 located at a lower left area in the screen 10 is carried out in response to the touch operation. A position coordinate of the point E0 is indicated by (xe, ye). The cursor 50 is displayed at the position of the point E0 corresponding to the point F0.

In a setting state of FIG. 3, the virtual plane space 100 is arranged at a position in the vicinity of a lower right position of the point Q0 on the screen 10. An area of the virtual plane space 100 does not overlap an area of the screen 10 in the field of view of the user. The virtual plane space 100 can be arranged so as not to overlap the screen 10 in the field of view of the user like the present embodiment. The arrangement is not limited to this. The virtual plane space 100 can be arranged so that a part thereof overlaps the area of the screen 10 in the field of view of the user. In a case where they do not overlap with each other like the present embodiment, there is an advantage that the user easily views a display state of the screen 10. This is because the finger does not lie between the point of view of the user and the screen 10. Further, in the present embodiment, since the virtual plane space 100 is arranged in the vicinity of the right hand of the user, there is an advantage that the user can operate the virtual plane space 100 without raising the finger of the right hand too much. The user can arrange the virtual plane at a position where the user easily operates the virtual plane by means of the setting or the adjustment.

[State When Space is Viewed from Side]

Figure 4:
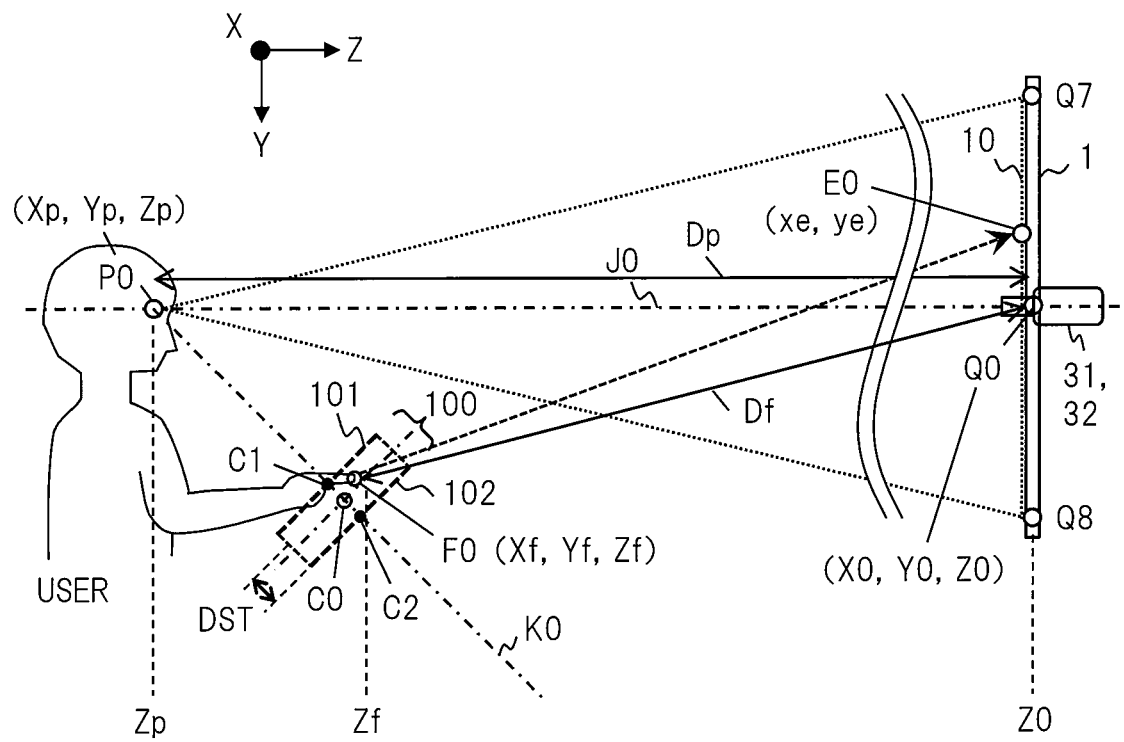
FIG. 4 is a view illustrating a state when a space is viewed from the side according to the first embodiment.

FIG. 4 illustrates a state in a Y-Z plane of the space illustrated in FIG. 1 when viewed from the side. A position coordinate of the point Q0 of the camera reference position is indicated by (X0, Y0, Z0). A position coordinate of the point P0 of the user reference position is indicated by (Xp, Yp, Zp). A position coordinate of the point F0 of the finger is indicated by (Xf, Yf, Zf). A position coordinate of the point C0, which is the center of the virtual plane space 100, is indicated by (Xc0, Yc0, Zc0). A position coordinate of the point C1, which is the center of the first virtual plane 101, is indicated by (Xc1, Yc1, Zc1). A position coordinate of the point C2, which is the center of the second virtual plane 102, is indicated by (Xc2, Yc2, Zc2). A position coordinate of the point E0 in the screen 10, which corresponds to the point F0, is indicated by (xe, ye).

As a measurable distance, there are a distance Dp between the point Q0 and the point P0, and a distance Df between the point Q0 and the point F0. Further, a distance between the point F0 of the finger and the second virtual plane 102 is indicated by a distance DST. The distance DST is a value that may have a positive value or a negative value. In the present embodiment, the point F0 of the finger is positioned in an area of an upper half side of the virtual plane space 100. In correspondence with it, the point E0 to be pointed is positioned in an area of an upper half side of the screen 10.

[State When Space is Viewed from Above]

Figure 5:
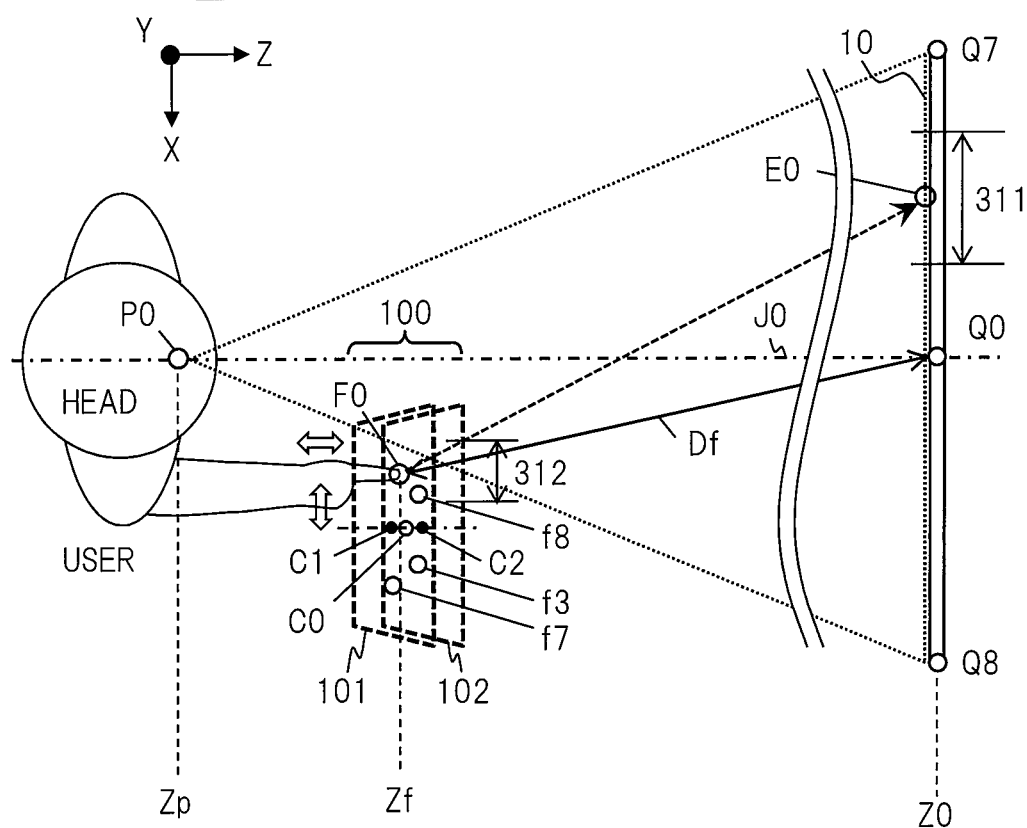
FIG. 5 is a view illustrating the state when the space is viewed from the above according to the first embodiment.

FIG. 5 illustrates a state of an X-Z plane when the space of FIG. 1 is viewed from the above. In the state of FIG. 5, the first virtual plane 101 and the second virtual plane 102 in the virtual plane space 100 are respectively set to the positions (the points C1 and C2), which are located at a right side of the reference axis J0 when viewed from the point P0 of the user. As a size of the virtual plane space 100, a size of the first virtual plane 101 is the same as a size of the second virtual plane 102. The user freely moves the finger in a desired in-plane direction (a direction parallel to the second virtual plane 102) in the virtual plane space 100. For example, in a case where the user wants to operate the point E0 such as an operation button in an area 311 located at a left side of the screen 10, in correspondence with it, the user moves the finger in an area 312 corresponding to the left side of the virtual plane space 100 so that the point F0 of the finger comes to the area 312.

[Virtual Plane Space]

Figure 6:
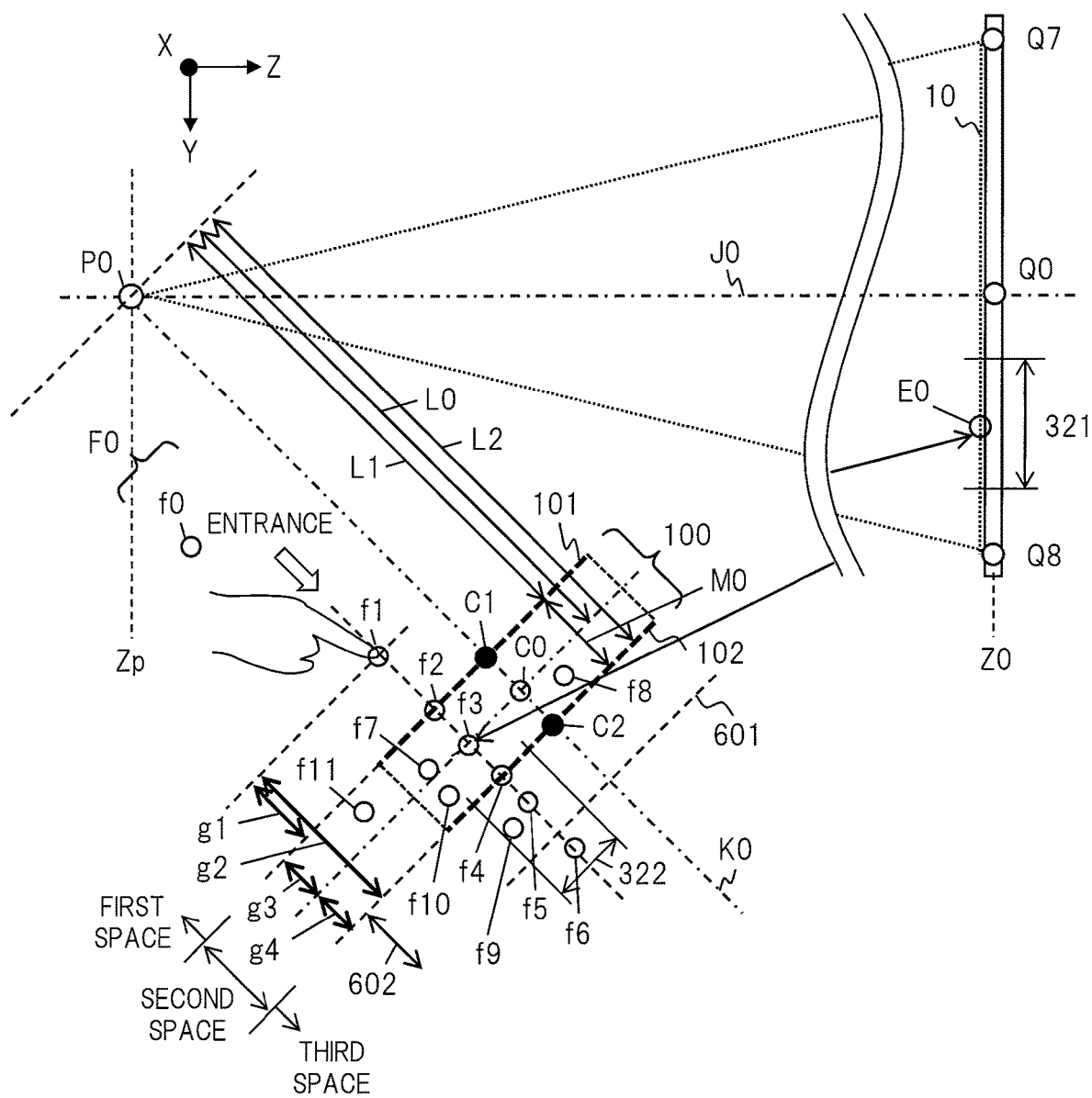
FIG. 6 is a view illustrating a state when a virtual plane space and the like are viewed from the side according to the first embodiment.

FIG. 6 illustrates an explanatory drawing about a positional relationship of the finger with respect to the virtual plane space 100 and the degree of entrance. FIG. 6 illustrates an enlarged vicinity of the virtual plane space 100 in a state when the space is viewed from the side in the similar manner to FIG. 4. For the purpose of explanation, a spatial part from the point P0 to the first virtual plane 101 in the space denotes a first space, a spatial part between the first virtual plane 101 and the second virtual plane 102 denotes a second space, and a spatial part in back of the second virtual plane 102 denotes a third space. On the reference axis K0 in the first direction, the point C0 is provided at a position apart from the point P0 by a length L0, the point C1 is provided at a position apart from the point P0 by a length L1, and the point C2 is provided at a position apart from the point P0 by a length L2.

A thickness of the virtual plane space 100 in a depth direction is indicated by a thickness M0. The thickness M0 is a distance between the point C1 and the point C2, and is a difference between the length L1 and the length L2. The thickness M0 is set to about 3 to 5 cm by default, for example. The thickness M0 allows detection of the degree of entrance of the finger with respect to the virtual plane in the depth direction. The thickness M0 can be set to a thickness, by which the individual user easily operates the virtual plane space 100, by the user setting.

Examples of a locus of the point F0 of the finger position are indicated by points f0 to f5. FIG. 6 illustrates a case where the finger enters a back side in a direction of the reference axis K0. FIG. 6 illustrates a case where a touch operation is carried out in an area 322 located at a lower side of the virtual plane space 100 in correspondence with a case where an operation button in an area 321 at a lower side of the screen 10 is pressed. The finger position is first located at the point F0 in the first space outside the virtual plane space 100. The user causes the finger to approach the virtual plane space 100 to come to a point f1. The point f1 is in front of the first virtual plane 101. Subsequently, the finger reaches the first virtual plane 101 from the point f1 to become a point f2. Subsequently, the finger enters the back of the first virtual plane 101 from the point f2 to become a point f3. Subsequently, the finger reaches the second virtual plane 102 from the point f3 to become a point f4. Subsequently, the finger enters the back of the second virtual plane 102 from the point f4 to become a point f5. Moreover, in a case where the finger enters the further back from the point f5, the position of the finger becomes a point f6.

The display apparatus 1 grasps a distance between the point F0 of the finger and each of the virtual planes. For example, at the time of the point f1, a distance from the first virtual plane 101 is a distance g1, and a distance from the second virtual plane 102 is a distance g2. For example, at the time of the point f3, a distance from the first virtual plane 101 is a distance g3, and a distance from the second virtual plane 102 is a distance g4.

Further, there is a control plane 601 parallel to the second virtual plane 102 at a position in back of the second virtual plane 102 and apart from the point C2 by a predetermined distance. An area 602 between the second virtual plane 102 and the plane 601 is used to determine the predetermined operation. In a case where the point F0 of the finger is positioned within the area 602 to the plane 601, an operation such as touch becomes effective. In a case where the point F0 of the finger enters the back of the plane 601, the operation becomes ineffective. Note that it may be recognized that such a plane 601 is set as a third virtual plane. Namely, it may be recognized that the virtual plane space 100 is configured by two or more layers of the virtual planes mainly including the second virtual plane 102. The minimum control can be realized even in a case where the plane 601 is not utilized.

In a case of a touch operation against the second virtual plane 102, for example, the finger position changes in order of the points f3, f4, and f5. In a case where the finger position stays at the point f4 or the point f5, it is determined as a touch operation. In a case of a tap operation, for example, the finger position changes in order of the points f3, f4, f5, f4, and f3. In a case where the finger position returns to a position like the point f3 within a predetermined time after the finger position became the point f4 or the point f5, it is determined as the tap operation. Similarly, a double tap operation and the like can be determined.

The finger position can freely move even in an in-plane direction of the virtual plane. For example, the finger position can move from the point f3 to a point f7 or a point f8. FIG. 5 also illustrates the corresponding points. In a case of a swipe operation, for example, the finger position changes in order of the points f3, f4, f5, f9, and f10. The user causes the finger to enter the area 602 in back of the second virtual plane 102; moves the finger in a desired in-plane direction; and then, causes the finger to return to the front of the second virtual plane 102. Similarly, a flick operation and the like can be determined.

The inclination of the virtual plane space 100 can be expressed by one axis passing through the central point of the virtual plane (an axis parallel to the plane or an axis perpendicular to the plane) and an angle thereof. In the example of FIG. 6, as the inclination of the virtual plane on the Y-Z plane, an angle between an axis perpendicular to the virtual plane (that is, the reference axis K0) and in the vertical direction (that is, the Y direction) is 45°.

The position, the size, or the inclination of the virtual plane can be changed by the user setting and the adjustment function. It is thought that the position, the size, or the inclination of the virtual plane under which it is easy to operate the virtual plane space 100 is not limited to a constant depending upon each of the individual users, but is different. In view of this point, in the first embodiment, the position, the size, or the inclination of the virtual plane can easily be adjusted for each of the individual users by the adjustment function. The user can carry out fine adjustment of the position or the like of the virtual plane while utilizing the remote operation using the virtual plane. This makes it possible to improve usability thereof.

[Virtual Plane Setting—Relative System]

Figure 7:
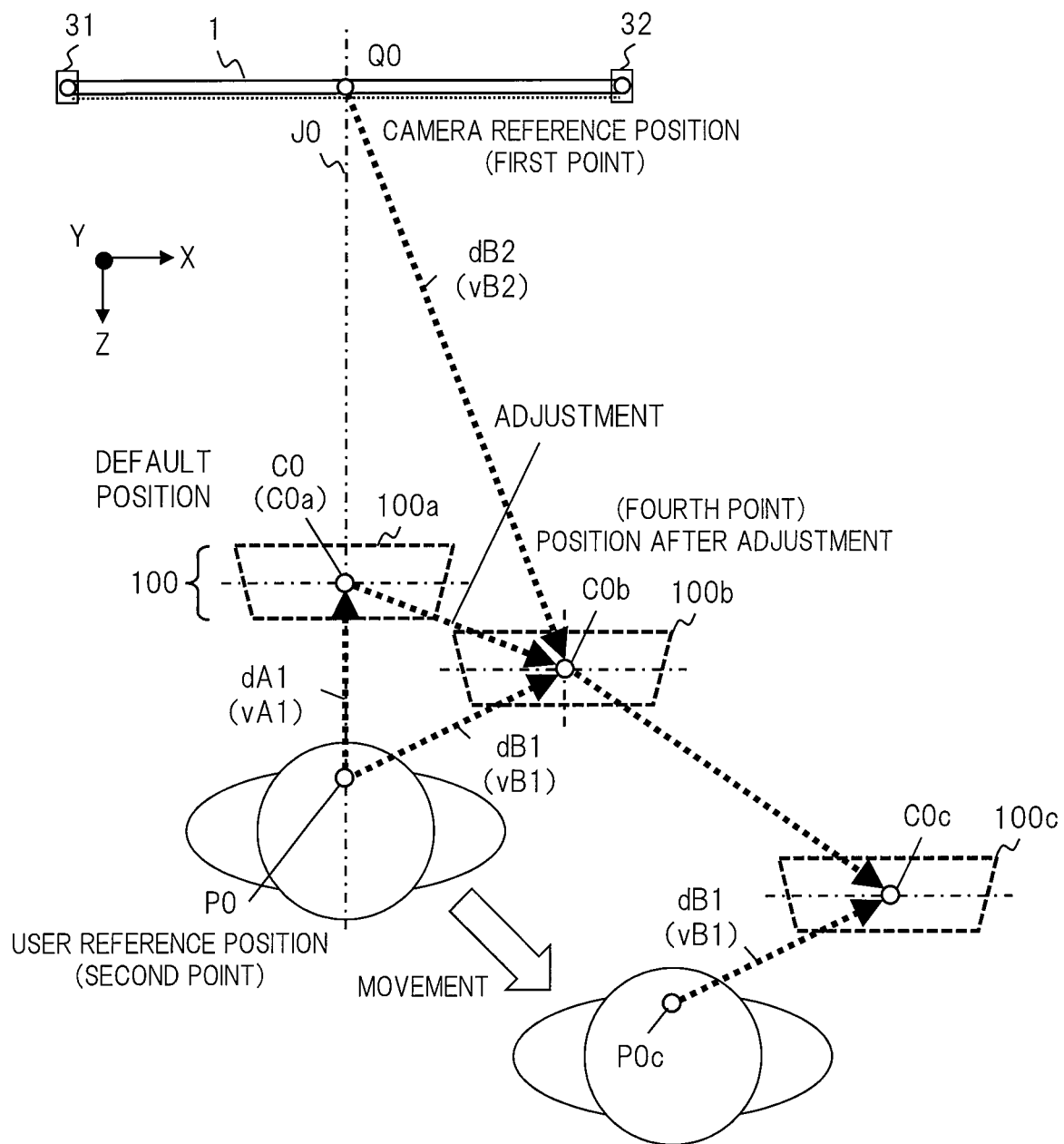
FIG. 7 is a view illustrating a relative system for setting the virtual plane according to the first embodiment.
Figure 10:
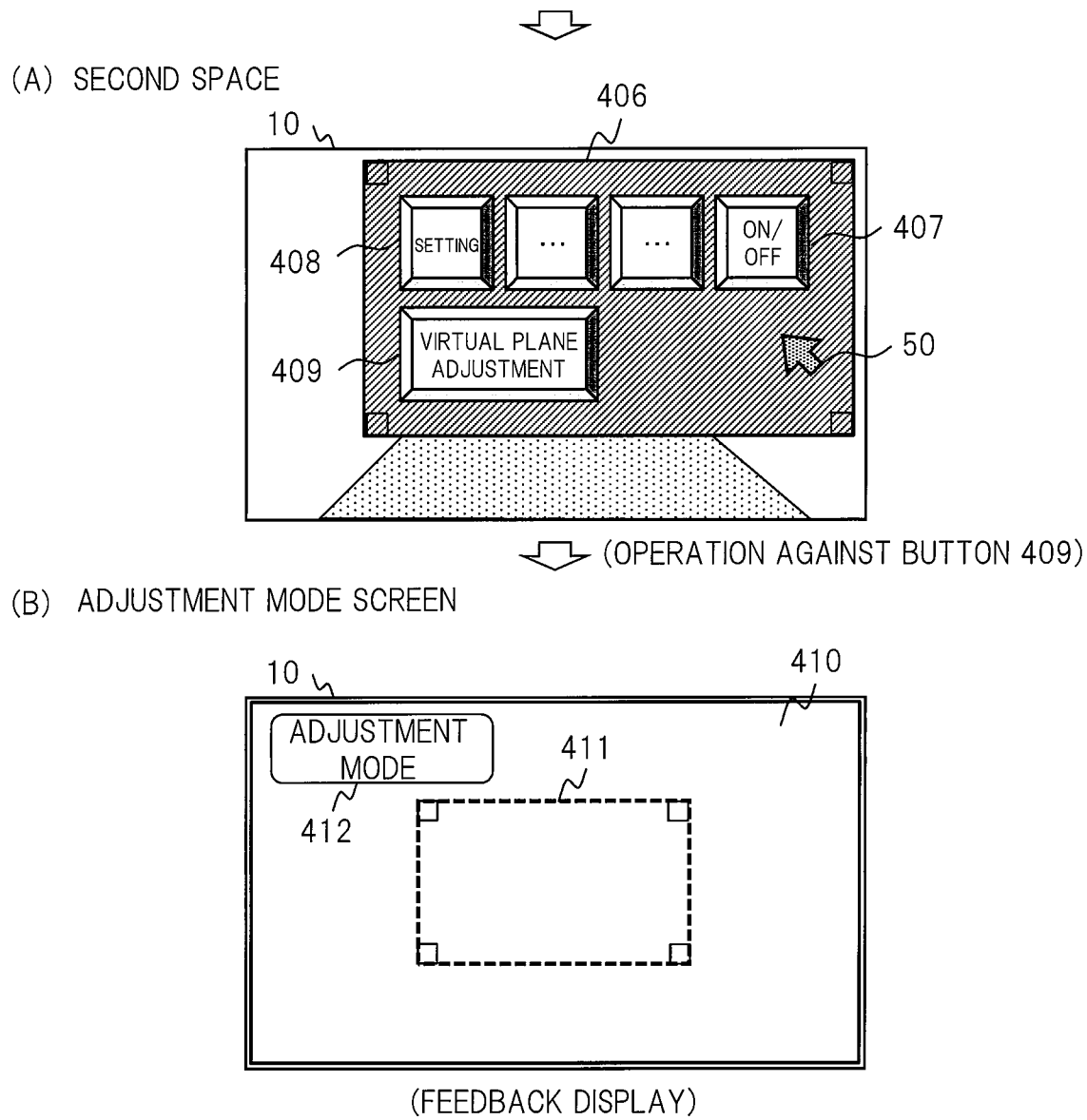
FIG. 10 is a view illustrating the continuation of the first display control example according to the first embodiment.

FIG. 7 illustrates a relative system as a setting system of the virtual plane space 100 according to the first embodiment. FIG. 7 illustrates a space by the X-Z plane when viewed from the above, and indicates the virtual plane space 100 by omitting it by one piece of plane. In view of usability, in the relative system, the virtual plane space 100 is set to a position that is determined by a relative distance and a vector from the user reference position. Details thereof are as follows. The point P0 of the user reference position is first detected on the basis of the camera images. Next, the default virtual plane space 100 is set to the point C0. The point C0 is located at a position that is determined by a vector vA1 with a predetermined direction and a predetermined distance dA1 in a forward direction from the point P0 (the Z direction) within an area where the finger can reach. For example, a point C0a is set as a default position. The point C0a is located at a position apart from the point P0 of the face by the predetermined distance dA1 on the reference axis J0 in a forward obliquely downward direction. Further, a default size and default inclination are applied thereto together with the default position. The default virtual plane space 100 is illustrated as a virtual plane space 100a before change. When the user first uses the display apparatus 1, the default virtual plane space 100 is set. Setting information for the default virtual plane space 100 is stored in the display apparatus 1 in advance.

Moreover, adjustment by the individual user is allowed from the default virtual plane space 100 described above. The user changes the virtual plane space 100a into a desired suitable position, size, or inclination by the adjusting operation. A state after change is indicated by a virtual plane space 100b, and the center thereof is indicated by a point C0b. For example, the virtual plane space 100 is moved to a position at a right side (the point C0b) from the center (the point C0a). The virtual plane space 100b after change is set as the virtual plane space 100 for the individual user, and the setting information 203 is updated. A vector vB1 having a direction from the point P0 to the point C0b (corresponding to the reference axis K0 described above) and a distance dB1 is illustrated. Further, a vector vB2 having a direction from the point Q0 to the point C0b and a distance dB2 is illustrated. The setting information 203 contains the vector vB1, for example, and also contains the length L0 and the thickness M0, or the lengths L1 and L2 of FIG. 6. Further, the setting information 203 contains information on the size (SV, SH) and the inclination. At the time of next usage, the setting information 203 according to the individual user is read out on the basis of the personal recognition, and the virtual plane space 100b of the same state as the previous time is reproduced.

Note that the user operates the user setting screen, whereby the adjusted setting state of the virtual plane space 100 can easily be caused to return to a default setting state. Note that as a modification example, plural kinds of default virtual plane spaces 100 may be prepared in advance, and the user can select and set one of them via the user setting screen.

Figure 20:
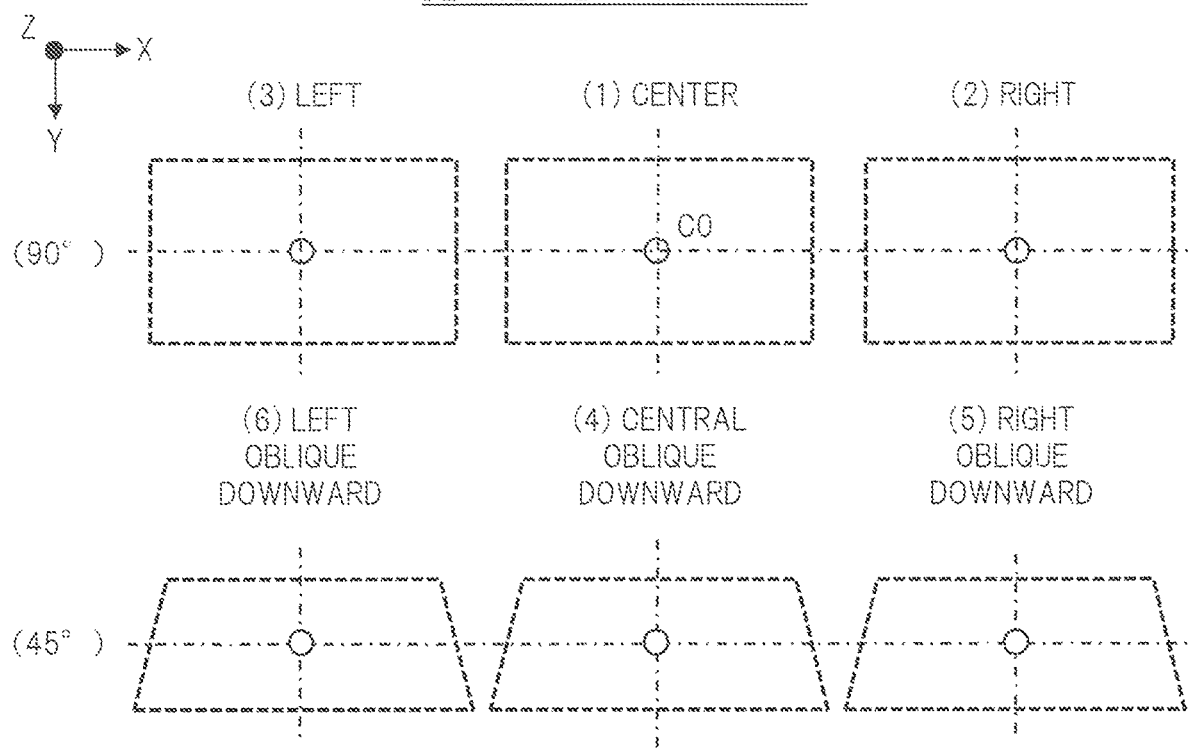
FIG. 20 is a view illustrating a setting example of a default virtual plane space according to the first embodiment.

FIG. 20 illustrates presentation examples of the plural kinds of default virtual plane spaces 100 by an X-Y plane. As examples of default positions of the point C0, (1) to (6) are illustrated. (1) is a case of a central position in a forward direction (the Z direction) from the point P0 by a predetermined distance. (2) is a case of right, and is a right-side position of (1). (3) is a case of left, and is a left-side position of (1). Inclination of the virtual plane of each of (1) to (3) is 90° with respect to a horizontal plane, for example. (4) is a case of central obliquely downward (corresponding to the point C0a illustrated in FIG. 7), and is a position below (1). (5) is a case of right obliquely downward, and is a right-side position of (4). (6) is a case of left obliquely downward, and is a left-side position of (4). Inclination of the virtual plane of each of (4) to (6) is 45° with respect to the horizontal plane, for example. Similarly, one set can be selected from plural sets of positions, sizes, and inclinations. Further, numerical values of the position, the size, and the inclination of the virtual plane may be displayed on the user setting screen, and the user can set them by the numerical values.

In the relative system illustrated in FIG. 7, in a case where the user moves a viewing position, the point P0 of the user reference position moves. Therefore, the position and the like of the virtual plane space 100 is updated in accordance with the point P0 so as to automatically follow the user while maintaining a relative relationship among the vector vB1 and the like. For example, a case where the user reference position moves from the point P0 to a point P0c is illustrated. A virtual plane space 100c is set to a point C0c of the same position of the vector vB1 from the point P0c on the basis of detection of the point P0c.

The default virtual plane space 100 is set by assuming an average user. As a modification example, the display apparatus 1 may determine classification of whether the user is an adult or a child from camera images, and set a virtual plane with a type according to the classification. For example, in a case of child, the virtual plane space 100 in which a distance from the point P0 to the point C0 is shorter than that for the adult is set.

[Correspondence Relationship of Size and the Like Between Screen and Virtual Plane]

FIG. 8 illustrates a correspondence relationship of a size and the like between the screen 10 and the virtual plane space 100. (A) of FIG. 8 illustrates a default setting example. In this state, an area of the virtual plane is one-to-one associated with an area of the whole screen 10. Namely, the position of the point F0 in the second virtual plane 102 is associated with the position of the point B0 in the screen 10. All of the points in the screen 10 can be covered by moving the point F0. Further, an aspect ratio of the second virtual plane 102 (SH:SV) is set to the same ratio (H0:V0) as that of the screen 10. The size of the second virtual plane 102 is set to a size smaller than the screen 10 (SH<H0, SV<V0). In a case where the size of the virtual plane is set to be relatively large, it is possible to carry out a finer operation against the screen 10. In a case where the size of the virtual plane is set to be relatively small, it is possible to relatively shorten a distance by which the finger is moved on the virtual plane.

(B) of FIG. 8 illustrates another setting example. The correspondence relationship can be set by the user setting function or implement. In the present embodiment, it is set so that the second virtual plane 102 is not associated with the whole screen 10, but is one-to-one associated with a partial area 801 in the screen 10. The second virtual plane 102 is set by the same size and the same ratio as those of the partial area 801, for example. The partial area 801 may be an area in which an operation panel (will be described later) is arranged, for example. In a case of this setting, the partial area 801 can be operated by the virtual plane operation, and an unnecessary operation against an area other than the partial area 801 can make impossible.

Note that an aspect ratio of the virtual plane can also be set to a different ratio from that of the screen 10 or the partial area 801. The size of the virtual plane can also be set to the same size as that of the screen 10. The inclination of the virtual plane is set to different inclination from the inclination of the screen 10 as illustrated in FIG. 4, for example. However, the inclination of the virtual plane can also be set to the same inclination as that of the screen 10.

[Display Control (1)]

A display control example of the screen 10 based on a positional relationship between a finger and the virtual plane space 100 will be described with reference to FIG. 6 and FIG. 9. In the first embodiment, the operation panel and the menu screen of the remote operation control function are displayed on the screen 10, whereby a virtual plane operation against them is available. First, the display apparatus 1 is in a starting state, and the finger of the user is in a state where the finger is located at the point F0 in the first space. At this state, content video is displayed on the screen 10 like an example of (A) of FIG. 9. In a case where the user wants to carry out an operation such as tuning (or channel selection) while viewing video of the screen 10, for example, the user stretches out the finger ahead as illustrated in FIG. 6 in order to display the operation panel, and moves the finger to the back on the reference axis K0, whereby the finger is caused to approach the first virtual plane 101.

The finger reaches the first virtual plane 101 (for example, the point f2), and enters the second space in back of the first virtual plane 101 (for example, the point f3). The display apparatus 1 shifts to a state where a remote operation is automatically received in accordance with its operation. In this state, like (B) of FIG. 9, the cursor 50 is displayed on the screen 10 at a position corresponding to the finger position at that time. Further, an icon 401 regarding the operation panel is displayed at a predetermined position (for example, an upper right corner) of the screen 10. When the finger enters the second space from the first space through the first virtual plane 101, the display state of the cursor 50 is control in accordance with a distance between the finger position and the first virtual plane 101 or the second virtual plane 102. In the present embodiment, when the finger reaches the first virtual plane 101 and the distance g1 becomes zero, the cursor 50 is displayed.

The user can move the cursor 50 in the screen 10 at a desired position by moving the finger in the second space freely. A size or color of the cursor 50 is controlled in accordance with a distance between the finger position and the second virtual plane 102 in the second space. The display apparatus 1 reduces a size of the cursor 50 and changes the color into darker color as the distance g4 is reduced and the depth becomes larger, for example. As an information mount of feedback display of the screen 10 is increased in this manner, the user can easily identify an operation state of the virtual plane. The user can operate the virtual plane space 100 without having to view the finger in the virtual plane space 100.

Further, in the present embodiment, a display state of the operation panel is automatically controlled in accordance with the finger position. The icon 401 corresponds to a switch for turning display of the operation panel ON/OFF. In a case where the user wants to display the operation panel, the user moves the finger so as to move the cursor 50 on the icon 401. The user causes the finger to further move to the back in the second space, whereby the finger reaches the second virtual plane 102 (for example, the point f4) and enters the third space in back of the second virtual plane 102 (for example, the point f5). The user causes the finger to enter the second virtual plane 102 so as to push to the back from a state where the cursor 50 is positioned on the icon 401, for example.

The display apparatus 1 detects, as a touch operation, a motion that the finger reaches the second virtual plane 102, and a motion that the finger enters the area 602 in the third space. Like (C) of FIG. 9, an operation panel 402 is displayed on the screen 10 in accordance with a touch operation of the icon 401. In the present embodiment, a case where the operation panel 402 is superimposed on the content video in the screen 10 and displayed in a partial area is illustrated.

Note that it can also be controlled so that the operation panel 402 and a menu screen (will be described later) are displayed immediately at the time when the finger reaches the first virtual plane 101. Further, it can also be controlled so that the operation panel 402 and the like are displayed in advance at the time of starting of the display apparatus 1, at the time of predetermined determination, or at the time when the user inputs an instruction at an arbitrary time point. Further, it can also be controlled so that the operation panel 402 is not displayed automatically in a case where the finger goes out from the virtual plane space 100, for example, or in a case where the finger returns to the first space in front of the first virtual plane 101.

In a case where the finger is located in the area 602 in front of the plane 601 in the third space, a predetermined operation is effective. The user can freely move the finger in the area 602. The predetermined operation according to a motion of the finger is detected. For example, in a case where the user causes the finger position to stay in the second virtual plane 102 or the area 602, it is detected as a touch operation (in other words, a long press operation, or a hold operation). Moreover, in a case where the user causes the finger to return to the second space from a state in the second virtual plane 102 or the area 602, it is detected as a tap operation (in other words, a click operation). In a case where the user moves the finger in the in-plane direction in the second virtual plane 102 or the area 602, it is detected as the swipe operation (in other words, a drag operation). In a case where the user quickly moves the finger in the in-plane direction in the second virtual plane 102 or the area 602 and causes the finger to return to the second space, it is detected as the flick operation. Further, in a case where the user causes two fingers to approach with or separate from each other in the second virtual plane 102 or the area 602, an opening and closing motion is detected as a pinch operation.

As an applied control example, the areas 602 with a different distance may be applied in accordance with the object of the GUI and the predetermined operation. For example, a first touch operation may be determined by using the area 602 of a first distance, and a second touch operation may be determined by using a second distance larger than the first distance. For example, a touch operation against a first object may be determined by using the first distance, and a touch operation of a second object may be determined by using the second distance. Further, information on the distance DST between the finger and the second virtual plane 102 may be used so as to be contained in the operational input information 210 in accordance with the object of the GUI or the predetermined operation. For example, in a case of a touch operation against a volume changing button, volume is changed up and down in accordance with the distance DST. Further, the display apparatus 1 may count a time of a state where the finger is located in the area 602, and determine the touch operation or the like in a case where this state continues for a predetermined time or longer.

When the finger enters the third space from the second space through the second virtual plane 102, or when the finger returns to the second space from the third space, the display state of the cursor 50 is also controlled in accordance with the distance DST between the finger and the second virtual plane 102. For example, in a state where the finger reaches the second virtual plane 102 and the distance g4 becomes zero, the size of the cursor 50 becomes the minimum and red. Further, at that time, effect display indicating contact to the second virtual plane 102, flashing display of the cursor 50, or the like may be executed on the screen 10. The display apparatus 1 remains to display the cursor 50 with the smallest size in a state where the finger position is located in the third space, for example. The display apparatus 1 changes a position of the cursor 50 in accordance with the motion of the finger in the area 602.

In a case where the finger position returns to the first space from the second space through the first virtual plane 101, the display apparatus 1 turns OFF (that is, does not display) the cursor 50 or the operation panel 402, for example. Further, in a case where the finger position goes out of the virtual plane space 100 from the second space in the in-plane direction (for example, transition from the point f3 to a point f11), the display apparatus 1 may turn the cursor 50 and the like OFF. Further, in a case where the finger position goes to the back of the plane 601 in the third space (for example, transition from the point f5 to the point f6), the display apparatus 1 may turn the cursor 50 and the like OFF.

Note that the user may cause the finger to be pulled out from the second space toward the first space side through the first virtual plane 101, and may cause the finger to enter the back of the first virtual plane 101 from a location different from the pulled-out location again. In that case, some display control methods can be applied thereto. For example, there are the following. (1) The cursor 50 of the screen 10 is turned OFF for the moment when the finger is pulled out. The cursor 50 is displayed at a position that the finger enters again when the finger enters it again. (2) The cursor 50 of the screen 10 is turned OFF for the moment when the finger is pulled out. The cursor 50 is again displayed at the same position as that when the finger is pulled out when the finger enters it again. (3) The cursor 50 of the screen 10 is maintained while being displayed at the pulled-out position when the finger is pulled out. When the finger enters it again, the cursor 50 is moved again.

Further, in a case where the finger position enters the third space from the second space through the second virtual plane 102, the display apparatus 1 may execute the following control. In a case where the finger position at that time is located on the object such as the operation button, the display apparatus 1 remains to display the cursor 50. In a case where the finger position is located on a background area where there is not the operation button and the like, the display apparatus 1 may turn the cursor 50 OFF. In a case where the finger position returns to the second space, the display apparatus 1 turns the cursor 50 ON again. Further, in a case where the finger position becomes the back of the plane 601 of the area 602, the display apparatus 1 may turn the cursor 50 and the like OFF. Alternatively, the display apparatus 1 may remain to display the cursor 50 in a state when the finger goes out from the plane 601.

Returning to explanation of (C) of FIG. 9, display of the operation panel 402 is controlled by a known function included in the body of the display apparatus 1. This operation panel 402 is another one different from the operation panel and the remote controller of hardware, and corresponds to a software remote controller screen. The operation panel 402 may be displayed on the whole screen 10. A display position or a display size of the operation panel 402 itself can be changed. For example, the display size can be changed by an operation of any angular point of the operation panel 402. An operation button for instructing various kinds of operations of the display apparatus 1 and the like are arranged in the operation panel 402 so as to correspond to buttons of an existing remote controller. A unique object that is not provided on the existing remote controller may be arranged in the operation panel 402. A button 403 for switching ON/OFF of the operation panel 402 and various kinds of operation buttons 404 are arranged on the operation panel 402. Specifically, in a case of television, the operation buttons 404 include selection buttons of ground wave, CS, and BS, channel selection buttons (respective channels, up, and down), a volume changing button, an input switching button, a setting button, and the others.

All of the buttons may be arranged in the operation panel 402, and buttons that the user frequently uses may be arranged. The operation panel 402 may be a form in which it is divided into a plurality of pages. For example, the channel selection button and the like for basic operations are arranged on a first page, and buttons for auxiliary operations (for example, brightness setting button and the like) are arranged on a second page. In that case, a page switching button is provided on the operation panel 402.

For example, the user moves the finger so as to match the cursor 50 to the operation button 404 for desired channel selection in the operation panel 402, and carries out the touch operation or the like. The display apparatus 1 detects this operation, associates the operation with a channel selecting instruction, and executes a channel selection operation corresponding to the channel selecting instruction. The other various kinds of operation buttons 404 can be operated similarly.

Moreover, a menu screen regarding the remote operation control function can be displayed on the screen 10. This menu screen includes an item for executing adjustment of the virtual plane space 100. In the present embodiment, a menu button 405 for turning the menu screen ON/OFF is provided in the operation panel 402 as one button. In a case where the user wants to adjust the virtual plane, the user operates this menu button 405 similarly. In that case, as illustrated in (A) of FIG. 10, a menu screen 406 is displayed. In the present embodiment, a case where display is switched from the operation panel 402 to the menu screen 406 is illustrated. The display apparatus 1 also has a function to execute a display control of the menu screen 406, and a program for realizing the function is implemented in advance. A button 407 for turning the menu screen ON/OFF, a button 408 for user setting related to the remote operation control function, a button 409 for adjustment of the virtual plane, and the like are arranged in the menu screen 406. In a case where the button 408 is operated, the user setting screen is displayed (which illustration is omitted).

Note that each button of the menu screen 406 is integrated and arranged in the operation panel 402. Display of the menu screen 406 may be controlled independently from the operation panel 402. The menu screen 406 may be displayed in response to an operation of a predetermined icon displayed in the screen 10. The display of the menu screen 406 may be omitted, and an adjustment mode screen (will be described later) is displayed directly in response to a specific operation.

In a case where the user wants to carry out adjustment of the virtual plane, the user similarly carries out the touch operation or the like so as to match the cursor 50 to the adjustment button 409. As illustrated in (B) of FIG. 10, the display apparatus 1 switches from the normal mode to the adjustment mode in accordance with detection of this operation, and displays an adjustment mode screen 410 on the screen 10. In the present embodiment, a case where the adjustment mode screen 410 is displayed on the whole screen 10 is illustrated. Feedback display for supporting or assisting adjustment of the virtual plane space 100 by the user is executed on the adjustment mode screen 410. Image information indicating a state of the adjusting operation is displayed on the adjustment mode screen 410. As a display example, a virtual plane frame image 411 and the like are displayed on the adjustment mode screen 410. Since the adjusting operation state is transmitted to the user by the feedback display more surely, the user easily carries out the adjusting operation, and usability is improved. In the adjustment mode, the user carries out the adjusting operation of the second virtual plane 102 via the finger, whereby it is possible to change the position, the size, or the inclination of the virtual plane space 100 (see FIG. 16 and the like, which will be described later). The adjustment mode is terminated in response to the predetermined operation (for example, the mode switching operation) by the user from the adjustment mode screen 410 to switch into the normal mode, for example, and the screen returns to the original menu screen 406.

[Display Control (2)]

FIG. 11 illustrates another display control example. (A) of FIG. 11 illustrates a case where the operation menu 300 of the GUI is displayed on the screen 10 in advance by the function of the display apparatus 1 when the finger is located in the first space. (B) of FIG. 11 illustrates a state where the cursor 50 is displayed when the finger reaches the first virtual plane 101. This cursor 50 is an arrow-shaped cursor. A state of (B) is a case where the fingertip is relatively far from the second virtual plane 102. The cursor 50 is displayed with a relatively large size as a size according to the distance DST at that time. In this state, the cursor 50 is displayed with yellow, for example. Since the cursor 50 is still large in this state, it is difficult for the user to carry out a selecting operation of a small object. The cursor 50 on the screen 10 moves in synchronization with the motion of the finger in the second space. The user can identify the operation state by the motion of the cursor 50.

Moreover, (C) of FIG. 11 illustrates a state when the finger reaches the second virtual plane 102. A state of (C) is a case where the fingertip is relatively near the second virtual plane 102. The cursor 50 is displayed with a relatively small size as a size according to the distance DST (the distance g4) at that time. In this state, the cursor 50 is changed into red and displayed, for example. In this state, since the cursor 50 becomes small, it becomes easy to carry out the selecting operation of the small object. In this state, the finger position corresponds to the above of a choice button 302. For this reason, this operation becomes a touch operation against the choice button 302. The GUI display unit 14 executes a predetermined process corresponding to the touch operation of the choice button 302, for example, to execute a selecting and determining process for "choice B", and executes selecting and determining effect display on the screen 10.

FIG. 12 illustrates a display control example of another pointer image as a modification example. The pointer image is not limited to the arrow-shaped cursor, can be any of various kinds, and user setting is also available. (A) of FIG. 12 illustrates an example in which cursors 52A and 52B of a double circular shape is displayed on the operation panel 402 as the pointer image. An inner circle of the double circle has a fixed radius, and an outer circle has a variable radius. The radius of the outer circle can be changed in accordance with the distance between the finger position and the second virtual plane 102. Ina state where the finger position is far from the second virtual plane 102, the cursor 52A is displayed with a relatively large size. In a state where the finger position is near the second virtual plane 102, the cursor 52B is displayed with a relatively small size. In a case where the finger reaches the second virtual plane 102, the radius of the outer circle may become the same as the radius of the inner circle.

(B) of FIG. 12 illustrates an example in which cursors 53A and 53B each having a hand shape are displayed as the pointer images. A size and a shape type of the hand shape cursor can be changed in accordance with the distance between the finger position and the second virtual plane 102. In a state where the finger position is far from the second virtual plane 102, the cursor 53A with a first shape type (for example, a palm shape) is displayed with a large size. In a state where the finger position is near the second virtual plane 102, the cursor 53B of a second shape type (for example, one finger shape) is displayed with a small size.

As described above, by visual feedback including the display control of the cursor 50 based on the distance DST, the user can identify the position and the depth of the finger with respect to the virtual plane space 100 and a remote operation state more intelligibly, whereby usability is improved.

[Predetermined Operation]

FIG. 13 illustrates an example of a predetermined operation that can be detected according to the first embodiment. FIG. 13 illustrates an example of an operation in which the finger reaches and enters the second virtual plane 102 in a state when the virtual plane space 100 is viewed from the side. (A) of FIG. 13 illustrates an operation of one finger. As predetermined operations by the operation of the one finger, various kinds of operations such as touch, tap, swipe, or flick are available. (B) of FIG. 13 illustrates an operation of the whole palm. As examples of predetermined operations by the palm, various kinds of operations such as touch are available similarly. (C) of FIG. 13 illustrates an operation by plural fingers of one hand. As an example of a predetermined operation by the plural fingers, operations such as pinch are available. The user can use these various kinds of operations properly. The remote operation control unit 20 distinguishes and detects these various kinds of operations. Note that as a modification example, the display apparatus 1 may be implemented so that only some operations of various kinds of operations can be detected.

In the first embodiment, at the normal mode, for example, an operation of the one finger in the virtual plane space 100 is detected, and one cursor 50 corresponding to the operation of the one finger is displayed on the screen 10 as illustrated in examples of FIG. 9 and FIG. 11. This is a method of detecting one finger that first enters the virtual plane space 100 or a tip position of one finger whose degree of entrance is the largest as the point F0, and displaying the cursor 50 at the corresponding position. The similar control is available even in a case of the operation of the palm against the virtual plane space 100. As a modification example, the virtual plane operation in a state where the user has an object such as a pointer by the hand is available similarly (will be described later).

Figure 14:
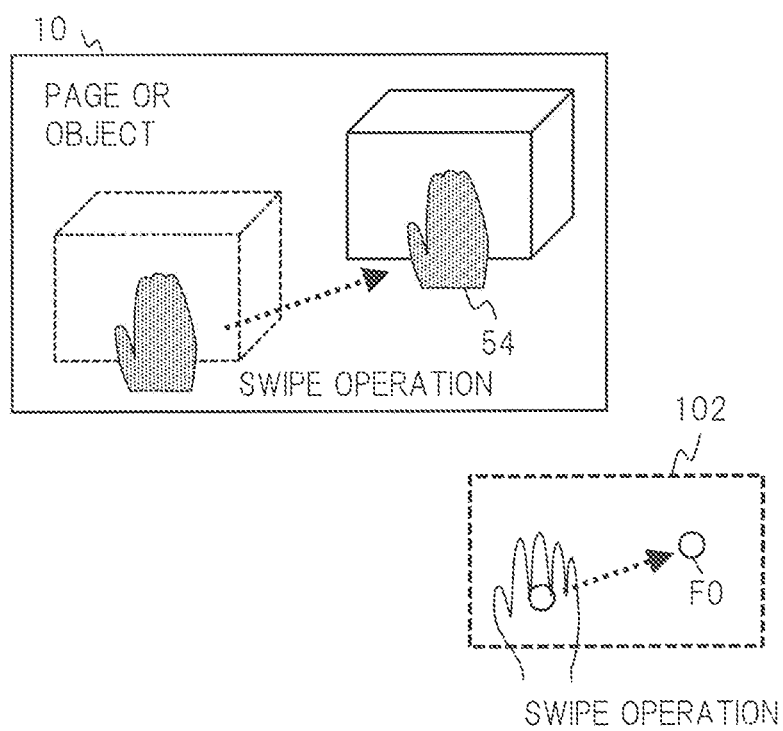
FIG. 14 is a view illustrating an example of a swipe operation as the predetermined operation according to the first embodiment.

FIG. 14 illustrates a case where a page and an object of the screen 10 are moved in the swipe operation as an example of the operation of the palm as illustrated in (B) of FIG. 13. A state of the swipe operation against the second virtual plane 102 and movement of the point F0 of the finger position at that time is illustrated. Further, a case where a cursor 54 with a palm cross-sectional shape is displayed on the screen 10 as the pointer image is illustrated. The display apparatus 1 schematically calculates a cross-sectional area of the finger passing through the second virtual plane 102, and displays the cursor 54 corresponding to the cross-sectional area. A shape of the cursor 54 may be schematic, or may be changed into a hand shape cursor as illustrated in (B) of FIG. 12. In a case where the operation of the palm is received, there is no need to finely detect each finger of five fingers that enter the back of the second virtual plane 102, and one position representative of the whole palm area may be set to the point F0.

FIG. 15 illustrates a case of a pinch operation as an example of the operation by the plural fingers as illustrated in (C) of FIG. 13. (A) of FIG. 15 illustrates a first method of the pinch operation. This method is similar to a pinch operation of a conventional touch panel, and is an opening and closing operation to cause two points to approach or separate by two fingers (for example, a thumb and a forefinger) of one hand. A right side illustrates a closing state and an opening state of two fingers in the second virtual plane 102. A point F01 of a first finger and a point F02 of a second finger are illustrated. A left side illustrates a case where an image of the screen 10 is enlarged with a pinch operation, in particular, a pinch-out operation from a closing state to an opening state. Scale-down by a pinch-in operation is also available similarly. In a case of pinch out, the user carries out a motion to enlarge two fingers in the in-plane direction so as to correspond to portions of an image to be enlarged in a state where two fingertips are caused to reach the back of the second virtual plane 102. The display apparatus 1 detects the motion as the pinch out. An enlarging process of the image is executed in accordance with the amount of enlargement of the two fingers. In a case where the pinch operation is stopped, the user causes the fingers to return to the front of the second virtual plane 102.

During the pinch operation, a cursor 55 is displayed on the screen 10 as the pointer image. In the present embodiment, the cursor 55 is composed of two cursors 55-1 and 55-2 that are respectively displayed at positions corresponding to the points F01 and F02 of the two fingers. Each of the cursors 55-1 and 55-2 is a round shape, for example. The display apparatus 1 detects the points F01 and F02 of the respective positions of the two fingers that enter the second virtual plane 102, and determines and detects a pinch operation from each of the positions. For example, the display apparatus 1 compares a distance between the two points with a threshold value. In a case where the distance is sufficiently small, the display apparatus 1 may presume the pinch operation (in particular, the closing state). The display apparatus 1 displays the specific cursor 55 in response to detection of the pinch operation. By using the cursor 55 with different type from that of the normal cursor 50, the user can easily identify the operation state.

(B) of FIG. 15 similarly illustrates a second method of the pinch operation. This method is an operation to approach two points by one finger of each of both hands. During this pinch operation, the cursor 55 is similarly displayed on the screen 10. One cursor 55-1 corresponds to a position of the point F01 of one hand, the other cursor 55-2 corresponds to a position of the point F02 of the other hand. In a case of the second method, it is possible to move the two points in the pinch operation more freely, and this makes it possible to relatively widen the distance between the two points. The two cursors 55-1 and 55-2 may be two arrow-shaped cursors or the like.

[Adjustment of Virtual Plane Space]

FIG. 16 illustrates adjustment of the virtual plane space 100 by using the adjustment function according to the first embodiment. An adjustment method according to the first embodiment is a method capable of changing a position, a size, or inclination of the virtual plane space 100 at the same time by an adjusting operation against two points of the virtual plane space 100 during the adjustment mode. (A) of FIG. 16 illustrates a state where the user carries out an adjusting operation against two diagonal points of the virtual plane space 100 by the fingers during the adjustment mode. (B) of FIG. 16 illustrates states before and after change in a case where the position, the size, or the inclination of the virtual plane space 100 is changed by the adjusting operation. The state before change is illustrated by a first virtual plane 101a and a second virtual plane 102a of a virtual plane space 100a. The state after change is illustrated by a first virtual plane 101b and a second virtual plane 102b of a virtual plane space 100b. The point C0 that is the center of the virtual plane space 100 is a point C0a before change, and a point C0b after change.

The virtual plane space 100a before change indicates a default setting state, for example, and is the same as the virtual plane space 100a illustrated in FIG. 7. A size and a ratio of the virtual plane space 100a are set to those in (A) of FIG. 8. Inclination of the virtual plane space 100a is 45° expressed as an angle between the virtual plane (or a perpendicular axis passing through the point C0a) and the vertical direction. A case where the position of the virtual plane space 100 is changed into a lower right position, the size thereof is enlarged, and the inclination is changed so as to incline toward the back side by the adjustment is illustrated. The virtual plane space 100b after change becomes a position near the right hand of the user, whereby it becomes easy to operate the virtual plane space 100b by the right hand. The size of the virtual plane space 100b is enlarged, whereby it becomes easy to carry out a fine operation. The inclination of the virtual plane space 100b approaches the horizontal plane, whereby it becomes easy to carry out the operation to cause the finger to enter the virtual plane space 100b in the vertical direction. It is limited to the present embodiment. Various kinds of adjustment such as adjustment to move the virtual plane space 100 upward from an original position and approach the inclination to the vertical direction are available.

[Virtual Plane Adjusting Operation]

Figure 17:
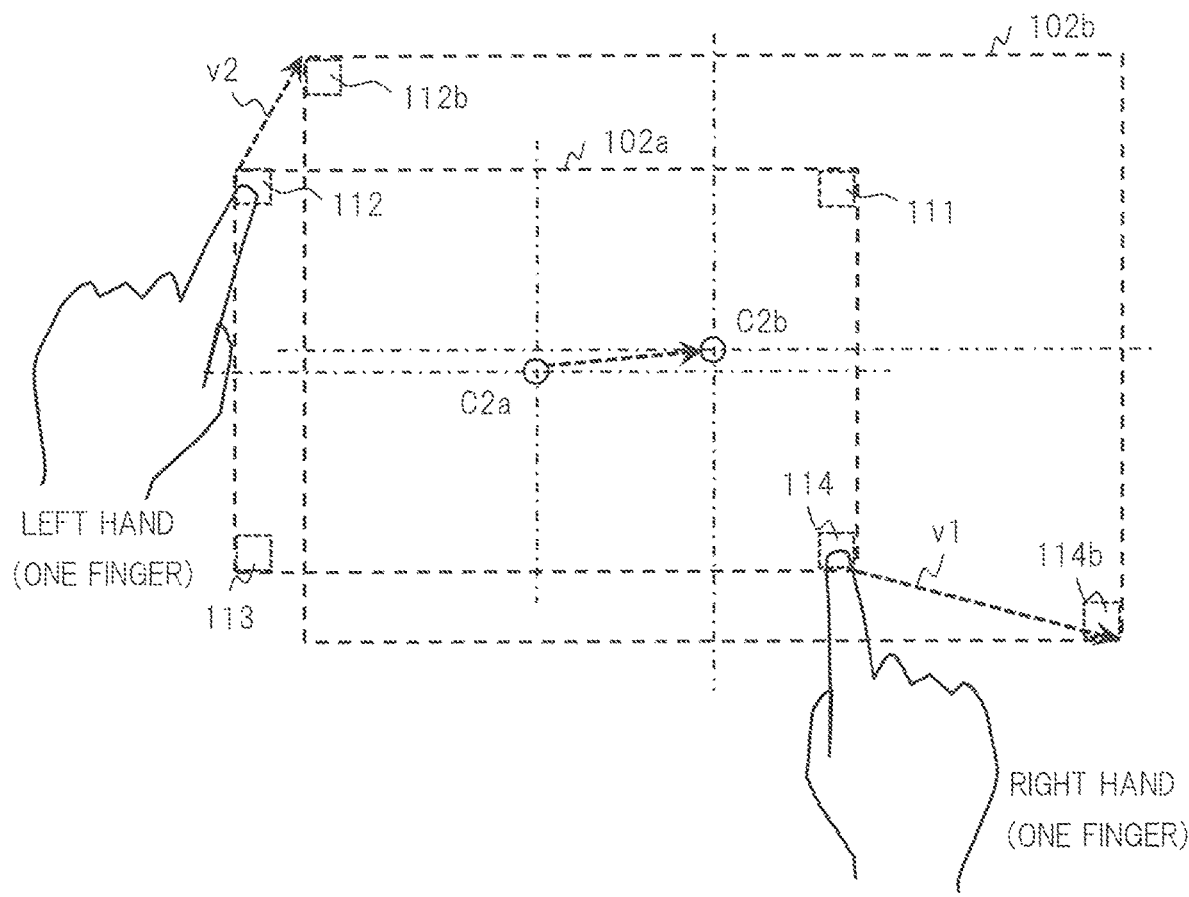
FIG. 17 is a view illustrating an operation for adjustment of a position, a size, or inclination of the virtual plane according to the first embodiment.

FIG. 17 illustrates details of the adjusting operation of the virtual plane space 100, which corresponds to the state illustrated in FIG. 16. FIG. 17 illustrates a case where the user faces the virtual plane space 100, in particular, the second virtual plane 102 in a direction of the reference axis K0 from the point of view of the user. The user carries out the adjusting operation against two points of the second virtual plane 102, for example, two diagonal angular points by one finger of each of the both hands. This operation by one finger is an operation to point to a position of a target point by an arbitrary finger (for example, the forefinger). In the first embodiment, this adjusting operation by the one finger is a similar operation to an operation by one finger at a normal time, and is distinguished by a difference of the mode. In the present embodiment, an operation to point to an upper left angular point 112 by one finger of a left hand, and an operation to point to a lower right angular point 114 by one finger of the right hand are illustrated. The display apparatus 1 detects an adjusting operation to cause the two fingers to approach positions of the two angular points on the virtual plane. The two points at the time of the adjusting operation may be the other angular points (angular points 111 and 113).

Further, in particular, the adjusting operation by one finger is an operation to maintain a state to point to an angular point of a certain position for a fixed time or longer. The display apparatus 1 determines and detects this adjusting operation by one finger on the basis of the finger position detection and time determination. It is possible to reduce false detection by adding the time determination.

The user moves the two fingers of the right and left hands in a desired direction while maintaining a state to point to the two angular points of the second virtual plane 102a by the respective fingers. Vectors v1 and v2 indicate movement of each fingertip at that time. In a case where the user wants to further enlarge the size of the virtual plane, the user moves in a direction to enlarge an interval between the two angular points in response to his or her intention. In a case where the user wants to make the size smaller, the use moves in a direction to narrow the interval. In a case where the user changes the position of the virtual plane, the user moves the two angular points in a desired direction. The middle of the two diagonal angular points becomes the point C2 that is the center of the second virtual plane 102. In a case where the user wants to change the inclination of the virtual plane, the user moves the two angular points to change a positional relationship between depth directions of the two angular points.

In the present embodiment, the angular points 112 and 114 are moved to angular points 112b and 114b. A rectangle having a line connecting the angular points 112b and 114b as a diagonal line becomes the second virtual plane 102b. In the present embodiment, the position is moved without changing the inclination while enlarging the size. Thus, the user can change the position, the size, or the inclination of the virtual plane to a desired state in real time at the same time by the adjusting operation once. This change is available within a range to capture the finger from the cameras.

In a case where the user determines a state of the virtual plane after change, the user carries out a predetermined virtual plane determining operation. This determining operation is an operation to release the operation by one finger, and is an operation to maintain the same state for a fixed time or longer and leave the finger. The user places the fingertips at the angular points 112b and 114b for the fixed time or longer, and then separates the fingertips so as to return to the front of the first virtual plane 101. The display apparatus 1 detects the determining operation on the basis of the time determination and the like. The state of the virtual plane after change is determined by the virtual plane determining operation to update the setting information 203. Then, the user can carry out a do-over of the adjustment similarly.

Then, in a case where the user terminates the adjustment, the user carries out a predetermined mode switching operation. The mode switching operation may be a touch operation against a mode switching button (not illustrated in the drawings) displayed on the adjustment mode screen 410 illustrated in (B) of FIG. 10, for example, or a specific mode switching operation against the virtual plane space 100 may be provided separately. Further, the virtual plane determining operation may be set to be the same as the mode switching operation, and the adjustment mode may be terminated at the same time as the virtual plane determining operation. The display apparatus 1 terminates the adjustment mode in response to the mode switching operation to return to the normal mode. For example, it returns to the state illustrated in (A) of FIG. 10.

[Adjustment Mode—Feedback Display]

Figure 18:
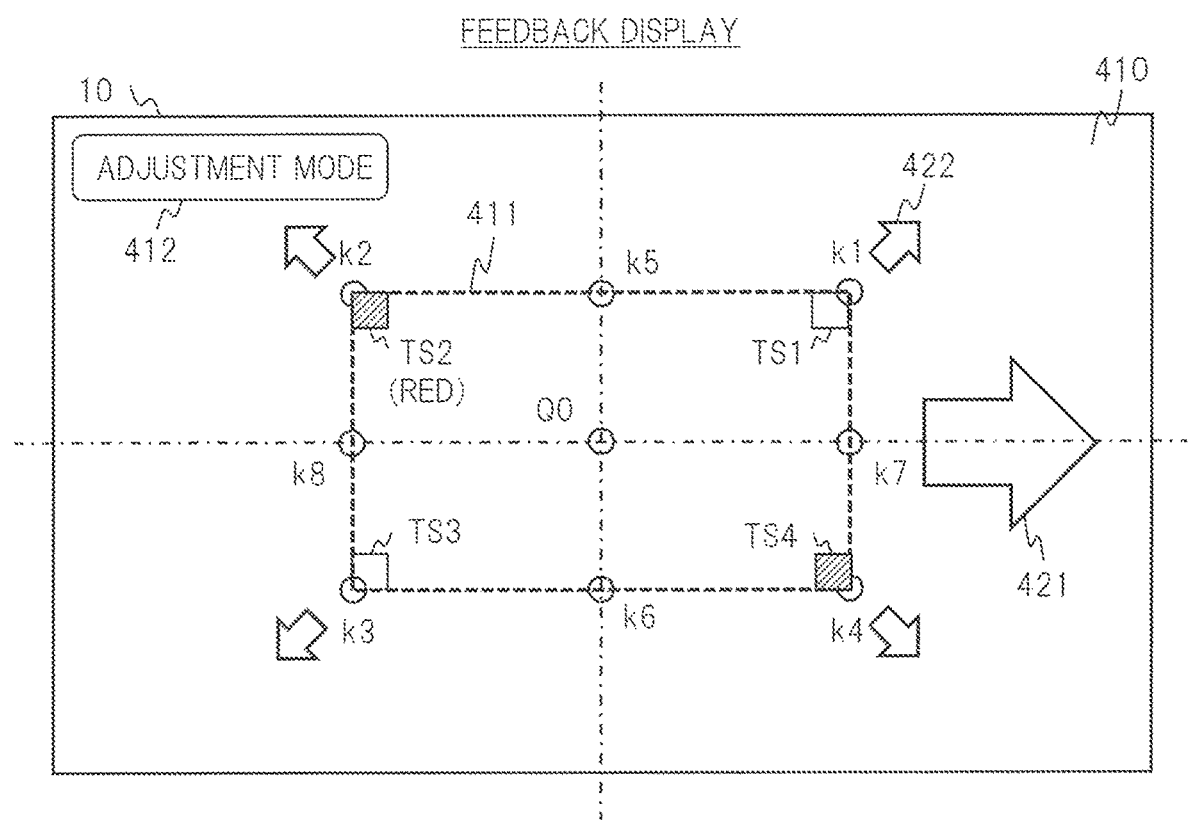
FIG. 18 is a view illustrating a display example of the screen when the position, the size, or the inclination of the virtual plane are adjusted according to the first embodiment.

FIG. 18 illustrates a feedback display example on the adjustment mode screen 410 at the time of the adjustment mode, which corresponds to the example of the adjusting operation illustrated in FIG. 17. The display apparatus 1 displays image information for feedback of the adjusting operation state of the virtual plane by the user on the screen 10 on the basis of the display control information of the operational input information 210. In the present embodiment, an image 412 indicating the "adjustment mode" is displayed at one location in the adjustment mode screen 410. A rectangle indicated by a broken line is displayed at a position according to the point Q0, which is the center of the adjustment mode screen 410, as the virtual plane frame image 411. In the rectangle, adjusting terminals TS1 to TS4 are displayed at positions of four angular points (points k1 to k4). Each of the terminals TS1 to TS4 is a small square, for example, but it is not limited to this. It may be an arbitrary figure.

When the user carries out the operation by one finger to point to the angular points 112 and 114 of the second virtual plane 102 as illustrated in FIG. 17, color of each of the terminals TS2 and TS4 corresponding to the rectangle of the adjustment mode screen 410 is changed and highlighted. For example, the color of the terminal is changed from blue into red. This makes it possible for the user to more surely identify a state to touch the angular points of the invisible virtual plane. Moreover, when the position of the virtual plane is changed with the adjusting operation, an arrow image 421 (in the present embodiment, an arrow in a right direction) is displayed in accordance with a position changing direction. Further, when the size of the virtual plane is changed, arrow images 422 (in the present embodiment, four arrows indicating enlargement) are displayed in accordance with an enlarging or reducing direction. Further, although it is not illustrated in FIG. 18, an arrow image according an inclination changing direction is displayed when the inclination of the virtual plane is changed.

The feedback display described above allows the user to easily identify the adjusting operation state and a process executing state of the display apparatus 1, whereby the user can carry out the adjusting operation more surely and easily. The user can carry out the adjusting operation without viewing the finger on the virtual plane space 100. The feedback display such as the virtual plane frame image 411 may be arbitrary so long as the adjusting operation state is schematically transmitted to the user. Display precisely corresponding to the position and the like of the virtual plane space 100 (for example, change in a display position of the rectangle itself) is not required. The feedback display described above may be supplemental display for only a part in the screen 10, and may be transparent display on the state of the original screen 10, for example.

[Finger Position Detection (Distance Measurement Based on Binocular Parallax)]

Figure 19:
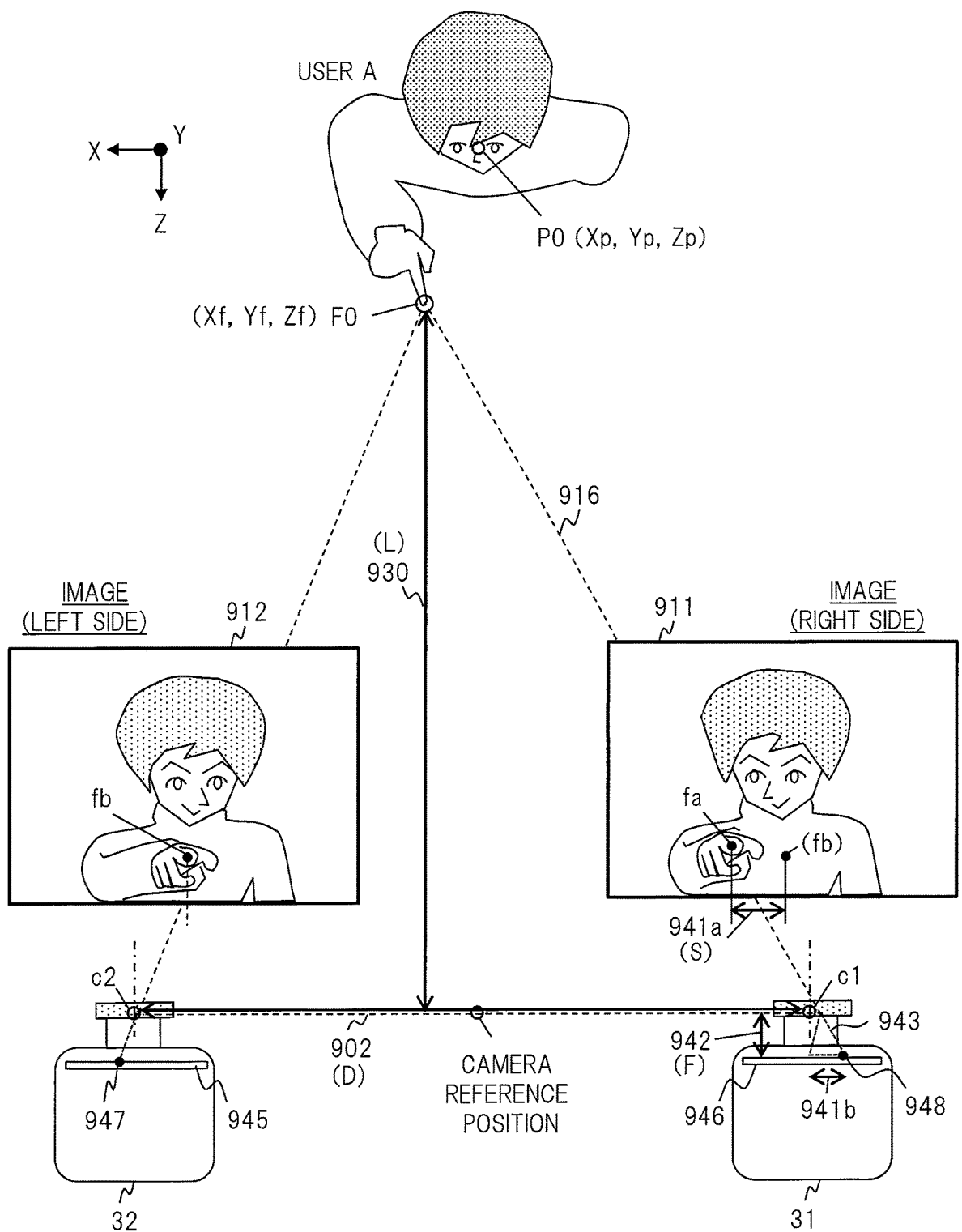
FIG. 19 is a view illustrating distance measurement based on binocular parallax according to the first embodiment.

FIG. 19 illustrates an explanatory drawing of the distance measurement based on the binocular parallax regarding detection of the point F0 of the finger position by the finger position detecting unit 21 as a supplement. Its principle and an example will be described briefly. FIG. 19 illustrates the X-Z plane when viewed from the above. A body portion including a face and a hand of a user A is provided as an object of the cameras 31 and 32. A length 902 between lenses of the right and left cameras 31 and 32 is set to a distance D. Positions of the lenses of the cameras 31 and 32 are indicated by the points c1 and c2. A middle point of the length 902 corresponds to the camera reference position. An image 911 indicates a photographing image from the right-side camera 31, and an image 912 indicates a photographing image from the left-side camera 32. A head, the face, arms, fingers, an upper body and the like of the user A are contained in the images 911 and 912. In particular, they are images when the user A operates a virtual plane by a forefinger of a right hand.

A length 930 is a length between the object and the point F0 of the finger in the Z direction, and is called as a distance L. An area 916 is a triangular area configured by the point F0 and the pair of cameras 31 and 32 (the points C1 and C2 of the lenses). The triangular area has the length 902 as a base and the length 930 as a height. Each of parallaxes 941a and 941b is a parallax of a fingertip position in the image 911. Points of the fingertips in the image 911 and the image 912 are indicated by a point fa and a point fb. A difference between the point fa and a point corresponding to the point fb in the image 911 is indicated by the parallax 941a. A focal distance 942 is a focal distance of the lens of the camera 31, and is called as a distance F. An area 943 is a triangular area that has the parallax 941b of the image 911 of the camera 31 as a base and the focal distance 942 as a height.

The camera 32 includes an imaging element 945, and the camera 31 includes an imaging element 946. An image corresponding to the image 912 is formed in the imaging element 945. An image corresponding to the image 911 is formed in the imaging element 946. A position 947 corresponds to a fingertip position (the point fb) of the object on the imaging element 945. A position 948 corresponds to a fingertip position (the point fa) of the object on the imaging element 946.

Thus, a difference occurs between the images 911 and 912 obtained by photographing the same object by the two cameras 31 and 32. The finger position detecting unit 21 counts the difference by using pixels constituting the images 911 and 912 as units, thereby measuring a length indicating the difference as a parallax. A distance 930 from the finger (the point F0) can be measured from this parallax (for example, the parallaxes 941a and 941b) and the focal distance (for example, the focal distance 942) on the basis of a known principle. Namely, a position coordinate of the point F0 can be calculated.

The fingertip position is the position 947 in the image formed on the imaging element 945 by the left-side camera 32. On the other hand, the fingertip position is the position 948 in the image formed on the imaging element 946 by the right-side camera 31. The positions 947 and 948 are different from each other. This corresponds to a situation that the differences of the fingertip positions (the points fa and fb) are generated as the parallaxes 941a and 941b as visual performance of the image, for example, by forming the same object from a different angle like the images 911 and 912.

Under an optical property, there is a similarity relation between the large triangular area 916 and the small triangular area 943. The parallax 941a or the parallax 941b is set to a distance S. A relationship of L:D=F:S is established among the length 902 between the lenses of the cameras 31 and 32 (the distance D), the length 930 to the object (the distance L), the focal distance 942 (the distance F), and the parallax 941a or the parallax 941b (the distance S). The length 930 (the distance L) is expressed by L=D×F/S from this relationship. As an example, by substituting D=2 m, F=2 cm, and S=2 mm, L=20 m is obtained.

In addition to the distance measurement of the point F0 as described above, distance measurement of the point P0 as the user reference position can be executed similarly. In a case where the distance between the cameras 31 and 32 (for example, the length 902) is known and the cameras 31 and 32 are located at fixed positions, absolute distance measurement can be executed by the method described above.

[Effects and The Like]

As described above, according to the display apparatus 1 of the first embodiment, it is possible to improve usability of the user with respect to the remote operation control using the cameras, for example, it is possible to easily operate the display apparatus 1. It is possible for the user to easily carry out the operational input of the display apparatus 1 by means of the motion to cause the finger to enter the virtual plane in front of the user. According to the first embodiment, the user is not required for learning of an operating method together with a plurality of gestures, and the amount of learning can be reduced. The user is not required to learn a complicated gesture. The user is not required to use a remote controller or the like, and can easily carry out the operational input of the television or the like empty-handed.

According to the first embodiment, in order to realize the remote operation, there is no need to execute a large number of background processes such as a process to always grasp a motion of a person in the camera images, or a process to determine one from the plurality of gestures. In the first embodiment, the remote operation can be realized by the processes enough to grasp the position of the finger and the degree of entrance with respect to the virtual plane space 100 set to the position near the user.

According to the first embodiment, the virtual plane operation is an operation similar to an operation of an existing mouse, or an operation of a touch input onto touch panel of a smartphone or the like. For that reason, the user easily learns the virtual plane operation. The user can instruct the operation of the display apparatus 1 by a simple virtual plane operation against the operation panel 402 or the like of the screen 10.

According to the first embodiment, the virtual plane space 100 can be set near the user with a desired position, a desired size, or desired inclination so that the user easily operates the virtual plane space 100. The user can freely adjust the position and the like of the virtual plane space 100 by the adjustment function at any time and immediately. For that reason, it is possible to improve usability of the user with respect to the remote operation. Since the feedback display is made on the screen 10 at the time of the adjustment, the user can easily carry out the adjusting operation, whereby easy adjustment is available. For example, in accordance with a position and posture by which the screen 10 is viewed, the user can arrange the virtual plane at a position near his or her handedness without overlapping the screen 10 in the field of view.

Further, in the first embodiment, since the adjustment mode is explicitly provided, the user can easily recognize whether the display apparatus 1 is under the normal use or under adjustment of the virtual plane. The display apparatus 1 easily distinguishes the normal operation and the adjusting operation and detects anyone.

Modification Example

The following examples are cited as modification examples of a display apparatus 1 according to the first embodiment.

As a modification example, with respect to the mode switching described above, the following method is available in addition to the method using the adjustment button 409 and the like. During the normal mode, a user point to current positions of two diagonal points of a virtual plane space 100 by fingers and maintain this state for a fixed time or longer. For example, as well as FIG. 17, this operation is an operation by one finger of each of both hands. This operation is set to a mode switching operation for switching into an adjustment mode. The display apparatus 1 determines and detects the mode switching operation. In a case where the display apparatus 1 detects the operation, the display apparatus 1 switches into the adjustment mode, and displays an adjustment mode screen 410. Note that when the mode switching operation described above is determined, a relatively long time (for example, three seconds) may be used as a threshold value in time determination. This makes it easy to distinguish it from a normal operation.

As a modification example, the virtual plane space 100 may be constituted by a single virtual plane. Display control and detection of a predetermined operation are similarly executed in accordance with a distance between a finger position and the single virtual plane. For example, in a case where the finger position is located in front of the single virtual plane, a cursor 50 may be displayed on the screen 10.

As a modification example, in a case where entrance of two or more fingers of both hands into one virtual plane space 100 is detected at the same time, a method of displaying the individual cursors 50 at positions respectively corresponding to the finger positions in the screen 10 may be executed. Namely, the two or more cursors 50 can be displayed on the screen 10 at the same time. Predetermined operations corresponding to the two or more cursors 50 are independently treated. For example, two touch operations against two positions in the screen 10 can be carried out in parallel at the same time. However, a calculation amount is increased to that extent. Further, in a case where an independent control of the two fingers and the two cursors is executed by this method according to the modification example, for example, it is necessary to distinguish and detect the operation of the two fingers from the pinch operation described above.

Modification Example (1)

Arrangement positions of cameras 31 and 32 are not limited to the configuration illustrated in FIG. 1. For example, the arrangement positions may be an upper right point Q1 and an upper left point Q2 on a screen 10, or may be a lower right point Q3 and a lower left point Q4. Further, in that case, predetermined correction calculation may be applied in order to match a camera reference position with a point Q0 that is the center of the screen 10.

(A) of FIG. 21 illustrates a display system according to a first modification example. In the first modification example, the cameras 31 and 32 whose positions can be moved are disposed in the vicinity of both right and left sides of a display apparatus 1. In the present embodiment, a user views video on the screen 10 in a state where the user sits in a chair in the vicinity of a front surface of the screen 10. The cameras 31 and 32 are connected to a body of the display apparatus 1 via a wireless communication interface, for example. The cameras 31 and 32 are respectively mounted on camera stands 33 and 34 such as tripod stands. The camera stands 33 and 34 can be moved by the user, and an arrangement position and a photographing direction of each of the cameras 31 and 32 including a height thereof can be changed. Namely, the camera reference position of the cameras 31 and 32 can be adjusted within a wide range.

(B) of FIG. 21 illustrates another arrangement example of the cameras 31 and 32. Thus, an arrangement interval between the cameras 31 and 32 can be enlarged. Further, for example, the cameras 31 and 32 can be disposed so as to approach the user from the screen 10.

In the first modification example, positions of the cameras 31 and 32 can be changed. In this case, a distance between the cameras (the length 902 illustrated in FIG. 19) is measured by the following method, and setting of the camera reference position can be made. Simply, it may be a method of first providing a user setting screen and the like, and causing the user to input and set the positions and the distances of the cameras 31 and 32. It is possible to calculate the camera reference position from their setting values. Further, the method may be a method of emitting a signal such as light or a sound wave from one camera, measuring a time when the signal is observed by the other camera, calculating a distance from the time, and automatically setting it. However, in the method, there is need to measure an extremely short time with high accuracy. On the other hand, in a method described below, it is possible to easily measure the distance between the cameras by using camera images.

FIG. 22 illustrates an explanatory drawing of a method of measuring the distance between the cameras according to the first modification example. The cameras 31 and 32 respectively provided on the camera stands 33 and 34, such as the tripod stands, are illustrated at an upper side of FIG. 22. A direction of each of lenses 31a and 32a of the cameras 31 and 32 provided on the camera stands 33 and 34 can be changed. In the present embodiment, the cameras 31 and 32 are disposed so that the lenses 31a and 32a face to each other. An example of imaging screens 961 and 962 of the cameras 31 and 32 is illustrated at a lower side of FIG. 22. The lens of the other camera and a plate 963 therebelow are taken on the imaging screen 961. A camera serial number is described on the plate 963, for example.

The display apparatus 1 stores, as a reference, in advance an image photographed by predetermined zoom magnification (for example, one time) in a state where the distance between the cameras 31 and 32 is set to a length of 2 m, for example. The imaging screen 961 corresponds to this reference image. The image similarly photographed in an actual arrangement state of the cameras 31 and 32 corresponds to the imaging screen 962. In that case, the display apparatus 1 enlarges the image so as to zoom the imaging screen 962. For example, in a case where image content of the imaging screen 962 (the lens and the plate 963) becomes the similar size to image content of the imaging screen 961 at the time of zooming two times, 2 m×2 times=4 m is an absolute distance between the cameras 31 and 32. The camera reference position is obtained from this distance and the positions of the cameras 31 and 32.

The display apparatus 1 may execute such distance measurement between the cameras 31 and 32 at the time of an initial operation, for example, when a power source of the cameras 31 and 32 is turned ON to allow photographing, and may set the camera reference position. A motor may be provided in each of the camera stands 33 and 34, the cameras 31 and 32 may be searched automatically at the time of the initial operation, and the cameras 31 and 32 may photograph each other in a state of an appropriate angle by which the lens face to each other. Further, in a case where the number of the plate 963 can be identified from the image of the imaging screen, it is possible to identify the other camera. Even in a case where a plurality of cameras is installed, it is possible to identify the respective cameras from identification of the number.

Modification Example (2)

FIG. 23 illustrates adjustment of a virtual plane space 100 using an adjustment function according to a second modification example. (A) of FIG. 23 illustrates a state of an adjusting operation of the virtual plane space 100 during an adjustment mode. In particular, (A) of FIG. 23 illustrates a case where two diagonal angular points of a virtual plane are operated. (B) of FIG. 23 illustrates details of the adjusting operation of (A). (B) of FIG. 23 illustrates a second virtual plane 102a before change and a second virtual plane 102b after change. A central point of the second virtual plane 102 before change is a point C2a, and the central point after change is a point C2b. In particular, (B) of FIG. 23 illustrates a case where a position is moved while changing inclination.

In the second modification example, a specific holding operation is provided as the adjusting operation. The display apparatus 1 determines and detects this holding operation on the basis of detection of a finger position as the other adjusting operation than a normal operation of one finger. This holding operation is an operation to approach or contact two fingers (for example, a thumb and a forefinger) of a hand at a position of a target point to make a loop. In the present embodiment, (B) of FIG. 23 illustrates a holding operation of an upper left angular point 112 by a left hand and a holding operation of a lower right angular point 114 by a right hand. Note that the display apparatus 1 may determine a holding operation by detecting a shape of the fingers, for example, an area like the loop on the basis of camera images when the holding operation is determined.

A user moves each of the two angular points of the second virtual plane 102a in a desired direction while maintaining a state where the two angular points are picked up by the holding operation. Vectors v1 and v2 of movement of the fingers at that time are illustrated. In the present embodiment, the angular points 112 and 114 on the second virtual plane 102a become angular points 112b and 114b of the second virtual plane 102b. Thus, as well as the first embodiment, it is possible to change the position, the size, or the inclination of the virtual plane in real time at the same time.

The user carries out a predetermined virtual plane determining operation in a state of the virtual plane after change. This determining operation is an operation to release the holding operation, for example, is an operation to open the two fingers at the position of the angular point. (C) of FIG. 23 illustrates an example of a releasing operation by the left hand. The operation is an operation to separate the two fingers from the angular point 112b and return to a front of the second virtual plane 102b. The display apparatus 1 determines and detects the determining operation that is the releasing operation. As well as the above, time determination may be added to the holding operation and the determining operation described above as an operation to maintain the same state for a predetermined time or longer.

In the first embodiment, a determining process of a specific holding operation is not required, and the user is not required to learn the holding operation. In the first embodiment, there may be accuracy with which a position of one finger of the hand or a palm can be detected. On the other hand, in the second modification example, the determining process of the holding operation is required in addition to the normal operation of one finger. However, it is easy to distinguish and detect these operations. In the second modification example, there is accuracy to an extent by which the positions of the two fingers of the hand can be detected. The user is required to learn the holding operation, but it is distinguished from the normal operation. Therefore, there is understandability.

The holding operation described above is an operation to nip an angular point by two fingers, or an operation to almost match the positions of the two fingers with the angular point. It is not limited to this. The holding operation described above may be an operation to encircle the target point by the loop formed by the two fingers. In a case where the position of the target point almost matches the position of the loop, it may be determined as the encircling operation. Note that the holding operation described above (or encircling operation) is distinguished as a different operation from the pinch operation that is one of the normal operations described above (in other words, the opening and closing operation).

Modification Example (3)

Figure 24:
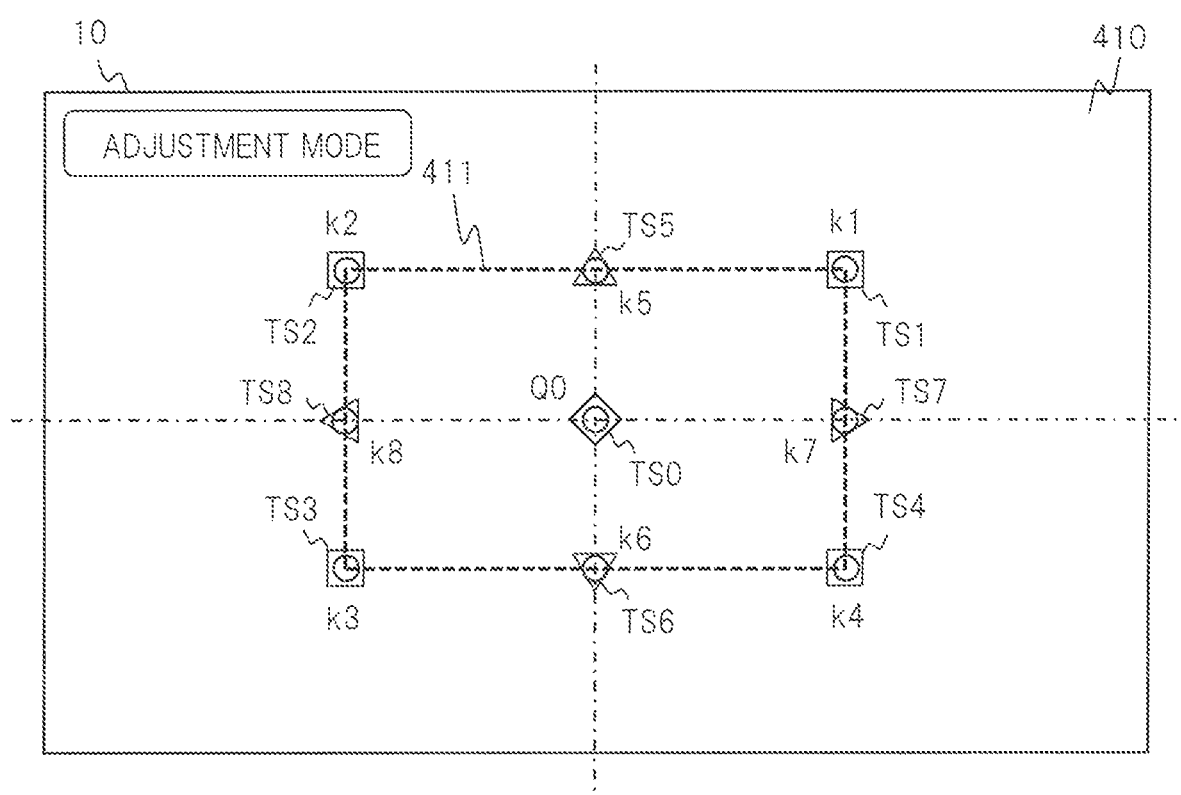
FIG. 24 is a view illustrating a display example of a screen when a virtual plane is adjusted according to a third modification example of the first embodiment.

FIG. 24 illustrates a feedback display example of an adjustment mode screen 410 during the adjustment mode as an adjustment method according to a third modification example. In the third modification example, as the adjustment method, a position, a size, and inclination of a virtual plane are not adjusted at the same time, but each of them can be adjusted separately. A rectangle indicated by a broken line is displayed at the center of the adjustment mode screen 410 as a virtual plane frame image 411. A position adjusting terminal (that is, terminal for adjusting a position) TS0, for example, a small rhomboid is displayed at a position of the center of the rectangle. Further, size adjusting terminals (that is, terminal for adjusting a size) TS1 to TS4, for example, small squares are respectively displayed at four rectangular angular points (points k1 to k4). Further, inclination adjusting terminals (that is, terminal for adjusting inclination) TS5 to TS8, for example, small triangles are respectively displayed at rectangular middle points (points k5 to k8) of four sides.

In a case where a user changes only the position of the virtual plane, the user carries out a motion to move it as a position adjusting operation by an operation against a central point of the virtual plane corresponding to the terminal TS0, for example, by a holding operation. This makes it possible to change the position (a point C0) of the virtual plane space 100 into a desired position as a whole. During this change of the positions, the size and the inclination are maintained to original ones. FIG. 25 and the like illustrate details thereof.

In a case where the user changes only the size and a ratio, the user carries out a motion to move it as a size adjusting operation by an operation of points corresponding to the terminals TS1 to TS4, for example, by a holding operation against two diagonal terminals. This makes it possible to change the size and the ratio of the virtual plane. During this change of the size, the position and the inclination are maintained to original ones. FIG. 27 and the like illustrate details thereof. Note that it may be a method of maintaining the ratio constantly during the change of the size, or may be a method in which the ratio can be changed freely. Further, it may be a form in which one can be selected from the operation of the former method and the operation of the latter method in accordance with the terminals and the operation thereof, or user setting.

In a case where the user changes only the inclination, the user carries out a motion to move to the front or the back as an inclination adjusting operation by an operation against points corresponding to the terminals TS5 to TS8, for example, by a holding operation against a middle point of a side. This makes it possible to change the inclination of the virtual plane (a direction of an axis passing through the point C0). During this change of the inclination, the position and the size are maintained to original ones. FIG. 29 and the like illustrate details thereof.

Each of the position adjusting terminal TS0 the size adjusting terminals TS1 to TS4, and the inclination adjusting terminals TS5 to TS8 is a holding terminal to receive the holding operation (as well as FIG. 23). However, it is not limited to this, and it may be a terminal to receive an operation of one finger or the like.

[Virtual Plane Adjustment—Position (1)]

(A) of FIG. 25 illustrates a state of adjustment of the position of the virtual plane by the X-Z plane when viewed from the above. In particular, (A) of FIG. 25 illustrates a case of parallel displacement from the second virtual plane 102a of the virtual plane space 100a before change to the second virtual plane 102b of the virtual plane space 100b after change. (A) of FIG. 25 is a case where the second virtual plane 102a before change is located at the point C2a obliquely downward from the point P0 to the reference axis J0 as default. (A) of FIG. 25 is a case of moving to the point C2b, which is the position at the right side, from there. The user operates the point C2 corresponding to the terminal TS0 by one finger or the holding operation to move to a desired position. As a result, the position of the virtual plane space 100 is changed as a whole while maintaining the original size and the original inclination.

(B) of FIG. 25 illustrates a feedback display example with (A). A message "while changing position" is displayed on the adjustment mode screen 410. The terminal TS0 of the virtual plane frame image 411 is set to red during the operation. Further, in accordance with movement to the right, an arrow image 423 indicating the movement is schematically displayed.

The following may be available as the other feedback display. As illustrated in (A) of FIG. 25, a schematic diagram indicating a state when the space (including a user reference position, the screen 10, and the virtual plane space 100) is viewed from the above may be displayed on the screen 10. Similarly, it may be a schematic diagram of a state when the space is viewed from the side. The schematic diagram may cause a positional relationship of the virtual plane and the state during change to be schematically transmitted to the user, and may be arbitrary display.

[Virtual Plane Adjustment—Position (2)]

(A) of FIG. 26 illustrates another control example of adjustment of the position of the virtual plane. In the present embodiment, a state where a user with left handedness carries out an adjusting operation against the second virtual plane 102 of the virtual plane space 100 by a left hand is illustrated. (A) of FIG. 26 illustrates a case where the position is parallelly displaced from the second virtual plane 102a before change (for example, a default setting state) to the second virtual plane 102b after change. The virtual plane is set to a position of a left side of the user himself or herself, and it is generally easy for the user with the left handedness to use the virtual plane. The user carries out an operation to point to one angular point of the second virtual plane 102 by one finger as the adjusting operation. The display apparatus 1 detects the adjusting operation as the position adjusting operation. This operation may be the holding operation described above. The user moves the finger on the angular point in a desired direction. For example, the finger is moved from an original position to a suitable lower left position. The display apparatus 1 moves the position (the point C0) of the whole virtual plane space 100 in accordance with the position of the finger.

(B) of FIG. 26 illustrates a feedback display example at the time of (A). This is a case where a schematic diagram in a direction when the screen 10 is viewed from a point of view of the user is displayed. A screen frame image 430 is displayed at the center of the adjustment mode screen 410. Further, a virtual plane frame image 411a before change and a virtual plane frame image 411b after change are displayed with respect to the screen frame image 430 so that the positional relationship is schematically transmitted. Further, an arrow vector image 431 indicating position movement is displayed. The operated terminal, for example, the lower left terminal TS3 is set to red.

As another control example, a movable direction may be associated with the plurality of terminals so that the movable direction is restricted in accordance with the terminal to be operated (the corresponding angular point) among the plurality of terminals. For example, in a case where the lower left terminal TS3 is operated, movement in a lower left direction is allowed. In a case where the terminal TS8 in the middle of a left side is operated, movement in a left direction is allowed.

[Virtual Plane Adjustment—Size (1)]

(A) of FIG. 27 illustrates a state of adjustment of the size of the virtual plane by the X-Y plane when the screen 10 and the second virtual plane 102 are viewed from the point of view of the user. In particular, (A) of FIG. 27 illustrates a case where the size is enlarged at a fixed ratio from the second virtual plane 102a of the virtual plane space 100a before change to the second virtual plane 102b of the virtual plane space 100b after change. The central point of the second virtual plane 102 before or after change is not changed as the point C2. Four angular points of the second virtual plane 102a becomes points p1b to p4b after change from points p1a to p4a before change. As default, an aspect ratio (SH, SV) of the virtual plane is the same as an aspect ratio of the screen 10. In the present embodiment, during adjustment of the size, the ratio is constantly maintained. The adjusting operation is an operation to hold arbitrary one angular point of the points corresponding to the terminals TS1 to TS4. This operation may be an operation by one finger. For example, the user moves a lower right angular point (the point p4a) in a direction to enlarge the size by the holding operation by the right hand. With this operation, the size of the virtual plane space 100 is enlarged while maintaining the original position, the original ratio, and the original inclination. Reduction of the size is similarly allowed. Further, a method of changing the size by a variable ratio is similarly allowed.

(B) of FIG. 27 illustrates a feedback display example with (A). A message "while changing size" is displayed on the adjustment mode screen 410. The terminal TS4 corresponding to the point in the virtual plane frame image 411, against which the holding operation is carried out, is set to red. Further, an arrow image 441 indicating enlargement of the size is displayed near each of the terminals TS1 to TS4. It is not limited to this. As another display example, a vector arrow image 442 whose starting point is set to each of the terminals TS1 to TS4 may be displayed. A virtual plane frame image 443 indicating meaning of enlargement may be displayed outside the rectangle. As another display example, a schematic diagram of a state when the space is viewed from the side as illustrated in FIG. 4, a schematic diagram of a state when the space is viewed from the above as illustrated in FIG. 5, or the like may be displayed on the screen 10.

[Virtual Plane Adjustment—Size (2)]

Figure 28:
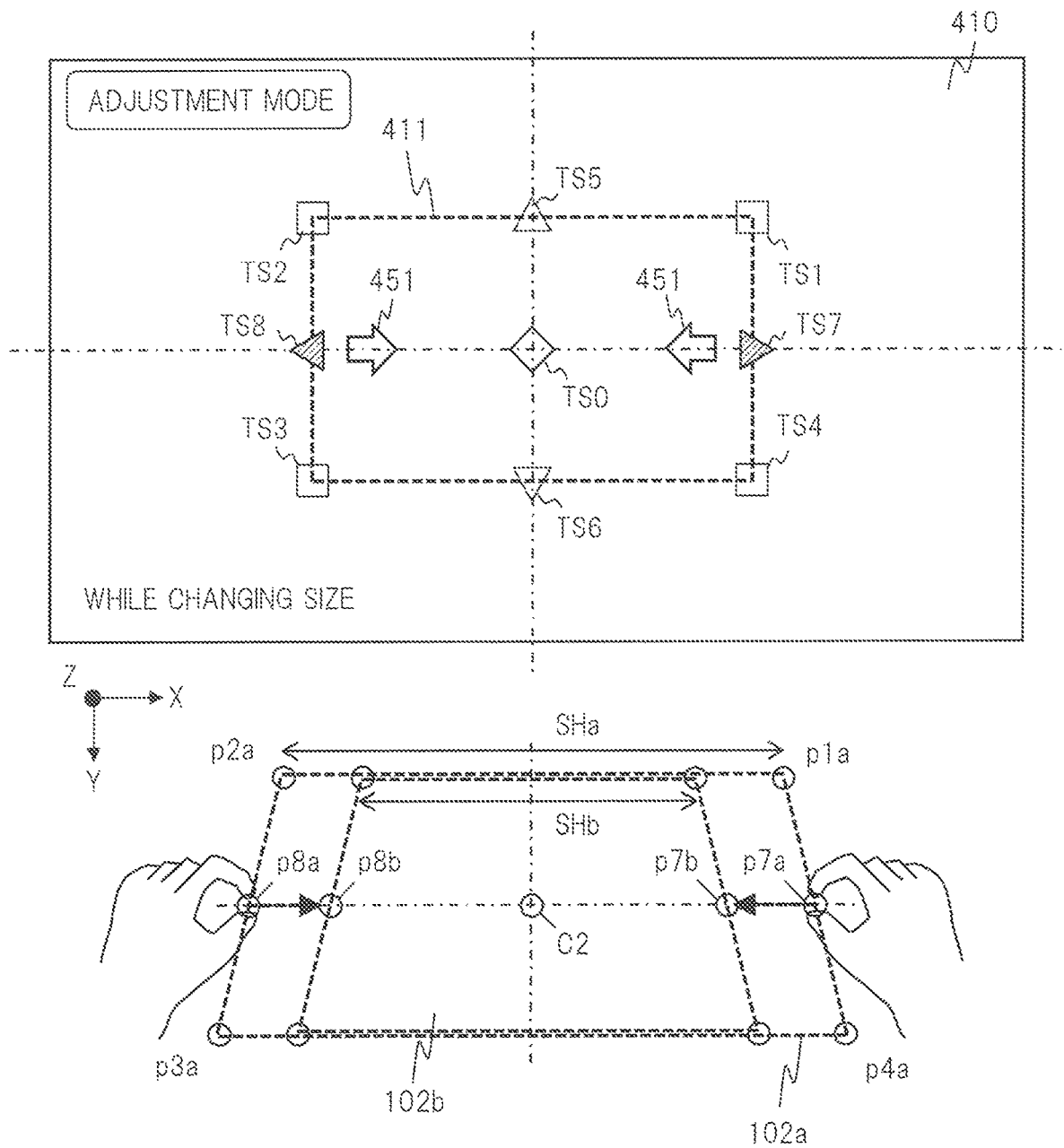
FIG. 28 is a view illustrating another control example of the adjustment of the size of the virtual plane according to the third modification example of the first embodiment.

FIG. 28 illustrates another control example of adjustment of the size of the virtual plane. FIG. 28 illustrates the screen 10 and the second virtual plane 102 by the X-Y plane when the screen 10 and the second virtual plane 102 are viewed from the point of view of the user. FIG. 28 illustrates a state where the user carries out an operation to adjust the size of the second virtual plane 102 that is located forward obliquely downward from the point P0 and a feedback display example at that time. FIG. 28 illustrates a case where a lateral size (the length SH) is reduced from the second virtual plane 102a before change to the second virtual plane 102b after change, whereby the ratio is changed. The adjusting operation is a holding operation or the like against a middle point of a side of the virtual plane. This makes it possible to change a longitudinal or lateral size of the virtual plane. In the present embodiment, by operating two points corresponding to the two terminals TS7 and TS8 on the right and left sides by both hands at the same time, the lateral length SH can be changed. In the present embodiment, a middle point p7a on the right side is moved toward the inside and left by the holding operation of the right hand to become a point p7b. In addition, a middle point p8a on the left side is moved toward the inside and right by the holding operation of the left hand to become a point p8b. Thus, a lateral length Sha of the second virtual plane 102a is changed into a lateral length SHb of the second virtual plane 102b. Therewith, the ratio of the second virtual plane 102b is vertically longer than the ratio of the screen 10. In the adjustment mode screen 410, the operated terminals TS7 and TS8 are set to red, and arrow images 451 indicating change in the lateral length SH are displayed. By operating middle points of the upper and lower sides, a vertical length SV can be changed similarly. A method of maintaining the ratio constant can be executed similarly.

[Virtual Plane Adjustment—Inclination (1)]

(A) of FIG. 29 illustrates a state of adjustment of the inclination of the virtual plane by the Y-Z plane when the space is viewed from the side. In particular, (A) of FIG. 29 illustrates a case where the inclination of the virtual plane is changed so as to incline toward the back side when viewed from the user. They are changed from the first virtual plane 101a and the second virtual plane 102a of the virtual plane space 100a before change into the first virtual plane 101b and the second virtual plane 102b of the virtual plane space 100b after change. The central point of the virtual plane space 100 before or after change is not changed as the point C0. The inclination of the first virtual plane 101 and the point C1, and the inclination of the second virtual plane 102 and the point C2 are changed.

An axis indicating the inclination of the virtual plane space 100 is changed. In the virtual plane space 100a before change, an axis perpendicular to the virtual plane and passing through the point C0 is indicated by an axis J1a, and an axis parallel to the virtual plane and passing through the point C0 is indicated by an axis J2a. The axis J1a corresponds with the reference axis K0. In the virtual plane space 100b after change, an axis perpendicular to the virtual plane and passing through the point C0 is indicated by an axis J1b, and an axis parallel to the virtual plane and passing through the point C0 is indicated by an axis J2b. Before and after change, the inclination of the virtual plane is changed by an amount corresponding to an angle α. For example, an angle between the axis J1a and the axis J1b is the angle α. As the change in the inclination, a case where the axis is rotated around the point C0 is illustrated. However, it is not limited to this. For example, a method of rotating the axis around the point C2 of the second virtual plane 102, or a method of rotating it while fixing one side is available.

The adjusting operation is a holding operation against any point corresponding to each of the terminals TS5 to TS8 in the middle of the respective sides. For example, by a holding operation against a middle point of the upper side of the second virtual plane 102 corresponding to the terminal TS5 in the middle of the upper side, the user moves the finger so as to press the back side. As a result, the inclination of the virtual plane space 100 is changed while maintaining the original position and the original size. Note that in a case where the point is moved so as to be pulled toward the user, the inclination is changed into a reverse direction. Similarly, even against a middle point of the lower side or a middle point of the left side, the inclination corresponding to each middle point can be changed.

(B) of FIG. 29 illustrates a feedback display example at the time of (A). A message "while changing inclination" is displayed on the adjustment mode screen 410. The terminal TS5 on the virtual plane frame image 411 against which the holding operation is carried out is set to red. Further, an arrow image 461 indicating an inclination changing direction is displayed near the terminal TS5. As another display example, a trapezoid or the like may be displayed as an image 462 indicating the virtual plane after the inclination is changed. As still another display example, as illustrated in (A) of FIG. 29, it may be a schematic diagram of a state when the space is viewed from the side or a schematic diagram of a state when the space is viewed from the above.

[Virtual Plane Adjustment—Inclination (2)]

FIG. 30 illustrates another control example to adjust the inclination of the virtual plane. (A) of FIG. 30 illustrates a state of the adjusting operation for the inclination of the second virtual plane 102. FIG. 30 illustrates a case where the user changes two diagonal points of the second virtual plane 102 by the holding operation of both hands so as to incline the inclination of the virtual plane toward the back. FIG. 30 illustrates the second virtual plane 102a before change and the second virtual plane 102b after change. FIG. 30 illustrates a case where the position of the lower side of the second virtual plane 102 is not almost changed during the change, and the upper side is moved obliquely downward. The inclination of the second virtual plane 102b approaches a horizontal plane. In this case, it is easy to operate the virtual plane with feeling of placing the fingers of the user on the horizontal plane.

(B) of FIG. 30 illustrates a feedback display example at the time of (A). A schematic diagram when the space is viewed from the side is displayed on the adjustment mode screen 410. This schematic diagram includes an image 470 indicating the user and the user reference position (the point P0), images 471 and 472 respectively indicating the inclinations of the virtual plane space 100 before and after change, and an image 473 indicating the screen 10, and expresses an outline of a positional relationship thereof. Each of the images 471 and 472 expresses the inclination when the virtual plane space 100 is viewed from the side.

[Feedback Display Example]

Figure 31:
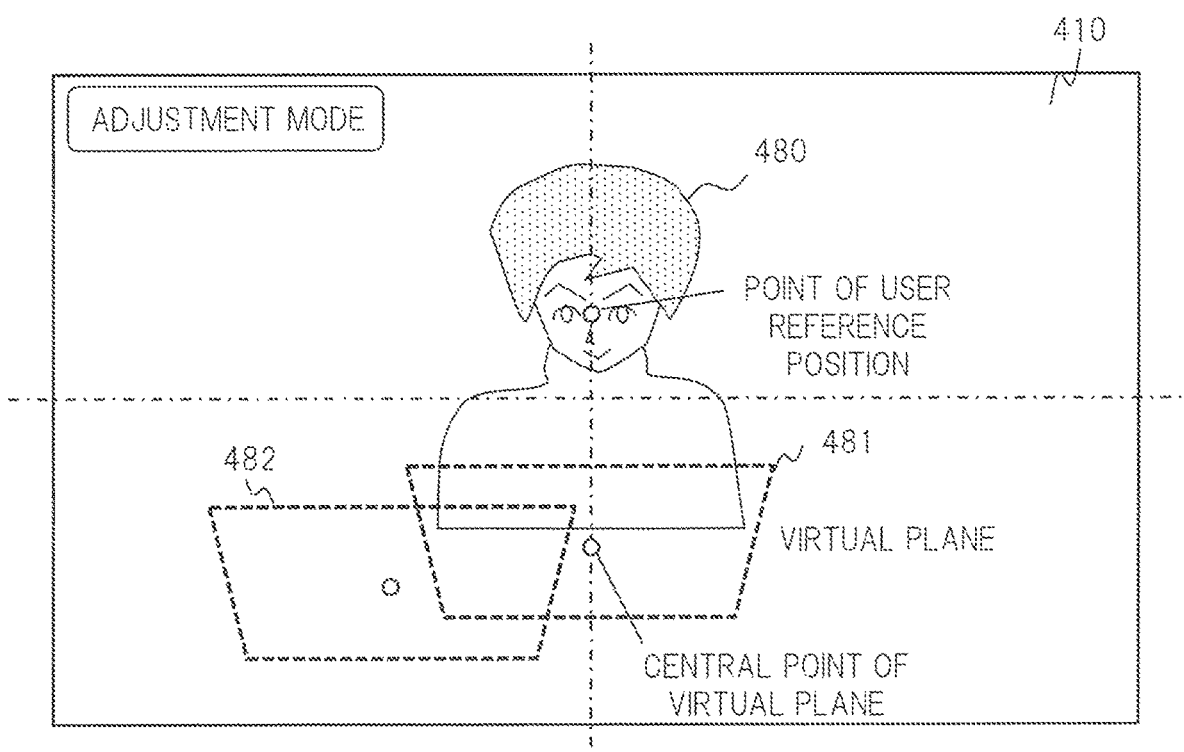
FIG. 31 is a view illustrating a display example of a screen according to the other modification example of the first embodiment.

FIG. 31 illustrates another feedback display example of the screen 10 during the adjustment mode as a modification example according to the first embodiment. In the present embodiment, a schematic front view when the user reference position (the point P0) is viewed from the camera reference position (the point Q0) is displayed on the adjustment mode screen 410. This front view includes an image 480 indicating the user and the user reference position, and a virtual plane frame image 481 indicating the virtual plane space 100 (in particular, the second virtual plane 102). The image 480 of the user may be an image created by using camera images, or may be a schematic image such as an outline or an icon. The image 480 is displayed at a position according to the user reference position (the point P0). The virtual plane frame image 481 is displayed at a position according to the point C0 relatively determined with respect to the point P0. The virtual plane frame image 481 indicates a case of a default position. Further, a virtual plane frame image 482 indicating the virtual plane after change may be displayed in accordance with adjustment. The user can schematically confirm a current state of the position and the like of the virtual plane space 100 by viewing the adjustment mode screen 410.

Modification Example (4)

Figure 32:
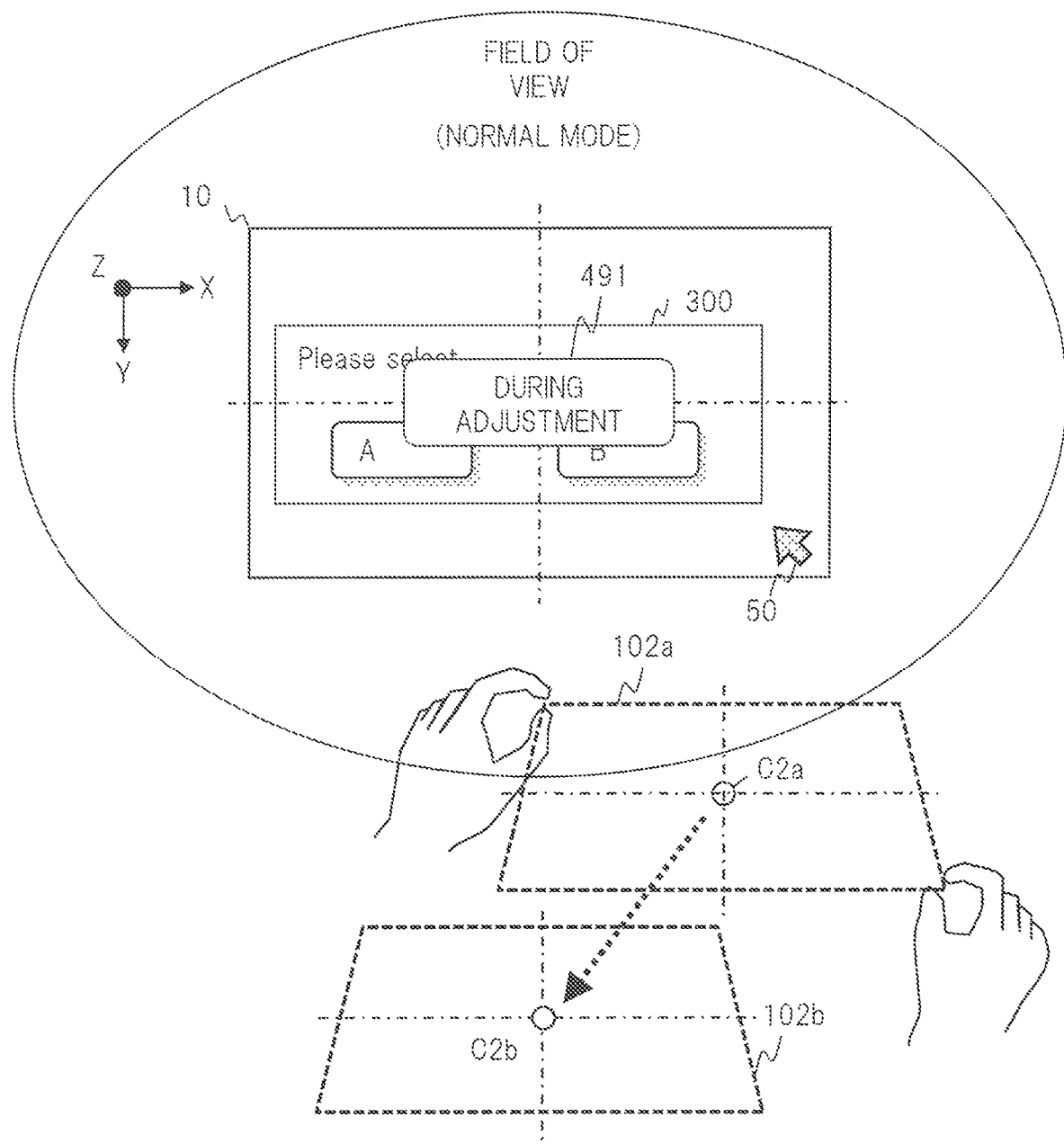
FIG. 32 is a view illustrating adjustment of a virtual plane at the time of a normal mode according to a fourth modification example of the first embodiment.

FIG. 32 illustrates an example of a screen 10 and a second virtual plane 102 in a field of view of a user as an adjustment method according to a fourth modification example. In the fourth modification example, an explicit adjustment mode is not provided for the user, mode switching is not executed, and an adjustment mode screen 410 is not displayed on the screen 10. In other words, the adjustment mode described above is realized as internal processing of a display apparatus 1 (a remote operation control unit 20). In a case where the display apparatus 1 detects a specific adjusting operation at normal use, the display apparatus 1 executes adjustment of a virtual plane in real time to update setting information 203. In the similar manner described above, the adjusting operation is an operation by one finger against an angular point of the virtual plane for a fixed time or longer, or a holding operation. In the present embodiment, a case where the user adjusts a position of the virtual plane by a holding operation against two diagonal angular points of the second virtual plane 102 when an operation menu 300 and a cursor 50 are displayed on the screen 10 is illustrated. A point C2 of a position of the second virtual plane 102 is changed from a point C2*a* to a point C2*b*.

When the adjusting operation is detected, an image indicating the adjusting operation may be displayed on the screen 10 as a feedback display example. In the present embodiment, an image 491 of "during adjustment" is superimposed and displayed on the center of the screen 10. At this time, the cursor 50 is maintained in a display state immediately before transition to the adjusting operation, for example. For example, the user moves a right hand toward a lower right angular point, whereby the cursor 50 is displayed in the vicinity of a lower right corner of the screen 10. As another display example, the cursor 50 may not be displayed in response to the adjusting operation, or a shape of the cursor 50 may not be a normal arrow shape, but may be switched into another type of image indicating during the adjustment.

The user carries out a virtual plane determining operation (for example, the releasing operation described above) at a position of a second virtual plane 102*b* after change. When the display apparatus 1 detects the determining operation, the display apparatus 1 updates the setting information 203 as determination of the virtual plane, and causes a display state of the screen 10 to return to original one. At this time, the cursor 50 is also moved.

In the fourth modification example, since there is no explicit mode switching, the user is required for somewhat habituation to distinguish the adjusting operation from a normal operation. However, if the user is a familiar user, adjustment can quickly be made instead.

Modification Example (5)

Figure 33:
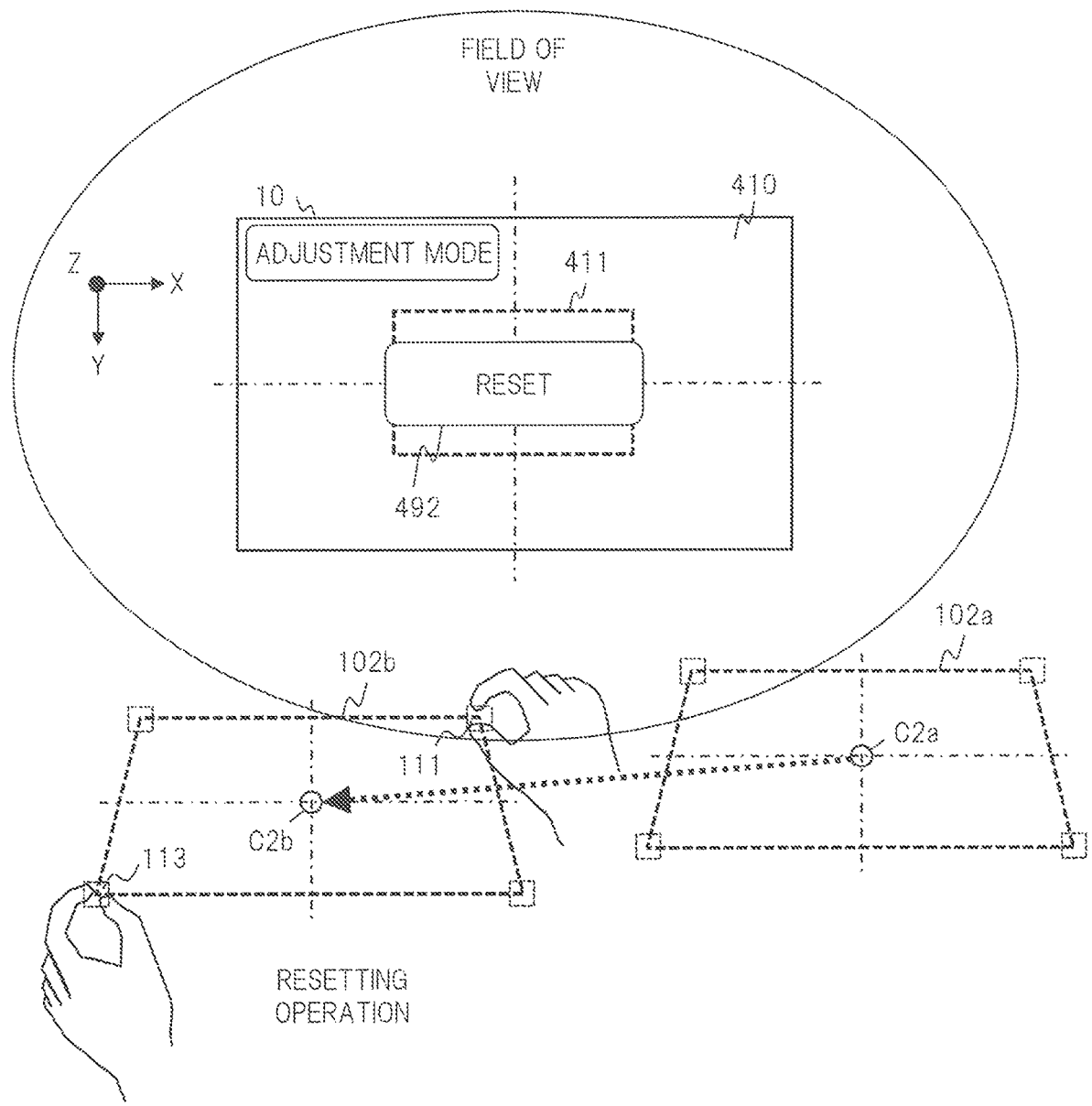
FIG. 33 is a view illustrating a virtual plane resetting function according to a fifth modification example of the first embodiment.

FIG. 33 illustrates a state when a screen 10 and a second virtual plane 102 are viewed by a field of view of a user as an adjustment method according to a fifth modification example. In the fifth modification example, a virtual plane resetting function is further provided. This function is a function to cancel a setting state of a virtual plane space 100 located at a certain position by a specific operation to reset it at a desired position of the user. A second virtual plane 102*a* indicates a current setting state in which the center is a point C2*a* and it is located at a position of a schematically right side when viewed from a user reference position and a position at lower right from the screen 10. In a case where the user forgets or loses this position of the second virtual plane 102*a*, it takes somewhat time for the adjusting operation. Thus, it is possible to use the virtual plane resetting function.

The user causes the screen 10 to enter the adjustment mode by a predetermined operation. An adjustment mode screen 410 is displayed on the screen 10. The user places the finger in a desired position in which the user wants to reset the virtual plane space 100 in a space, and carries out a specific resetting operation. This resetting operation is an operation to hold two diagonal points (for example, angular points 111 and 113) of the second virtual plane 102, and an operation to maintain the holding state for a fixed time or longer, for example. The display apparatus 1 determines and detects the resetting operation on the basis of time determination and the like. A threshold value of the time determination at this time may be set to a relatively longer time. The display apparatus 1 resets a rectangle has the two points for which the resetting operation is detected as a diagonal line as a second virtual plane 102*b* that has a position, a size, and inclination in that state. A central position of the second virtual plane 102*b* is a point C2*b*. The point C2*b* is located at a position of a schematically left side when viewed from the user reference position, and becomes a lower left position from the screen 10.

Further, the display apparatus 1 displays a predetermined image on the screen 10 in order to convey the state to the user in a point of time when the virtual plane space 100 is reset by the resetting operation. In the present embodiment, an image 492 of "reset" is displayed at the center of the screen 10. Similarly, a schematic diagram indicating the reset position of the virtual plane space 100 may be displayed on the screen 10.

In other words, the resetting function is a function that the second virtual plane 102*a* of an original position of the point C2*a* can be moved to a new position of the point C2*b* immediately. As described above, in a case where the user forgets its own position of the virtual plane space 100 or the like, it is possible to set the position to a desired position immediately without necessity to search it by using the resetting function, for example.

Second Embodiment

A display apparatus and a remote operation controlling apparatus according to a second embodiment of the present invention will be described with reference to FIG. 34. A basic configuration according to the second embodiment is similar to that according to the first embodiment. Hereinafter, components according to the second embodiment different from those according to the first embodiment will be described. In the second embodiment, a remote operation controlling apparatus 3 is provided in addition to a display apparatus 1, and the display apparatus 1 and the remote operation controlling apparatus 3 are connected to each other by communication and are operated in cooperation with each other.

Figure 34:
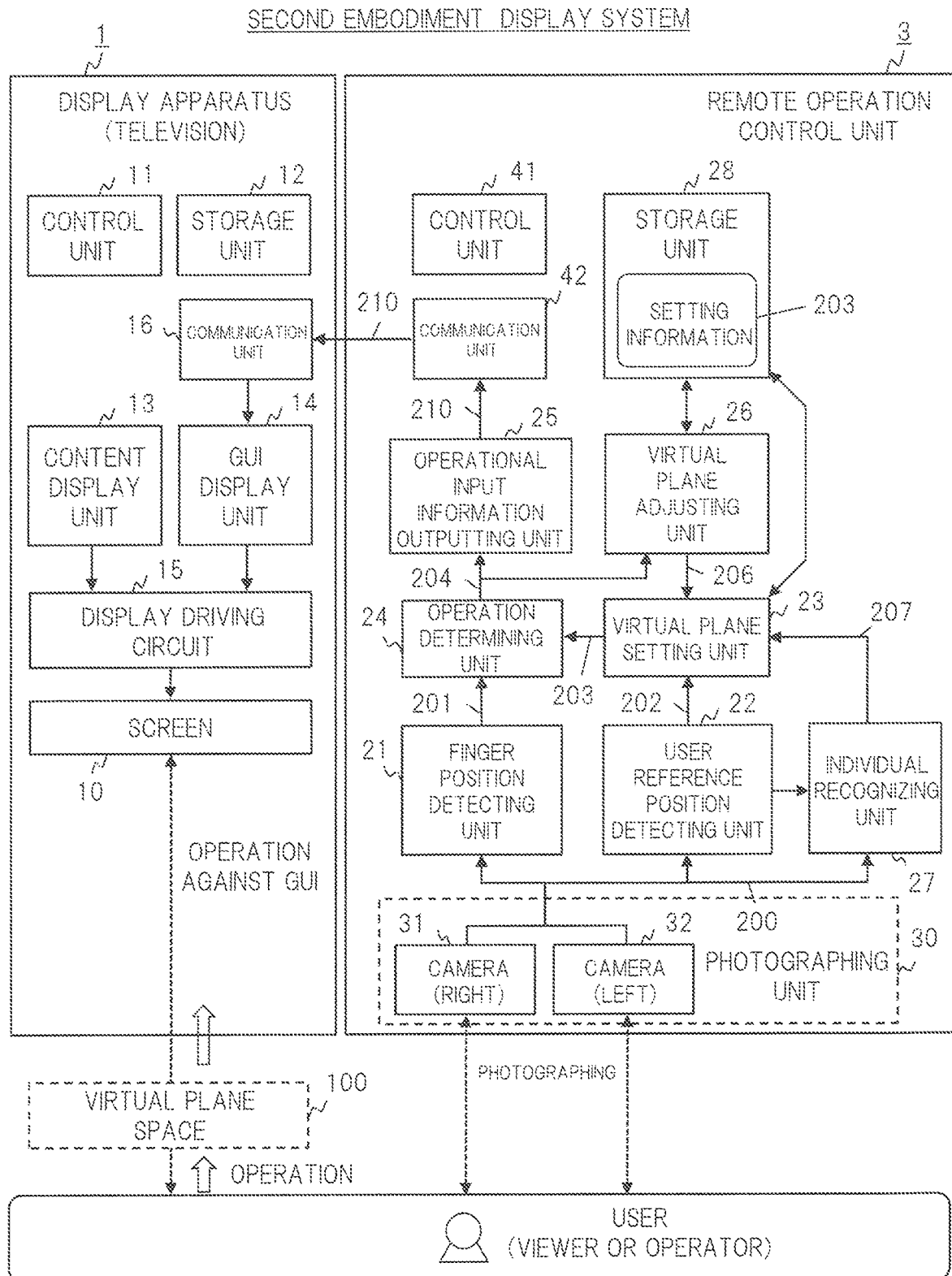
FIG. 34 is a view illustrating a configuration of a display system that includes a display apparatus and a remote operation controlling apparatus according to a second embodiment of the present invention.

FIG. 34 illustrates a functional block configuration of a display system according to the second embodiment. The display system according to the second embodiment is a system in which the display apparatus 1 is connected to the remote operation controlling apparatus 3. The remote operation controlling apparatus 3 that is an independent apparatus other than the display apparatus 1 has the function of the remote operation control unit 20 according to the first embodiment. The remote operation controlling apparatus 3 controls a remote operation of a user against a body of the display apparatus 1 or a GUI of a screen 10. The remote operation controlling apparatus 3 generates operational input information 210 on the remote operation and transmits it to the display apparatus 1. The display apparatus 1 controls an operation of the body and the GUI of the screen 10 on the basis of the operational input information 210 as well as the first embodiment.

The display apparatus 1 includes a communication unit 16 in addition to the control unit 11 and the like similar to the components illustrated in FIG. 2. The communication unit 16 receives the operational input information 210 from a communication unit 42 of the remote operation controlling apparatus 3, and gives it to a GUI display unit 14 and the like. The remote operation controlling apparatus 3 includes the similar component corresponding to the remote operation control unit 20 illustrated in FIG. 2, and also includes a control unit 41, the communication unit 42, and the like. The control unit 41 controls the whole remote operation controlling apparatus 3. The storage unit 28 stores information and data for control therein. The communication unit 42 executes a communicating process with the communication unit 16 of the display apparatus 1. The communication unit 16 and the communication unit 42 are portions each including a communication interface apparatus compatible with a predetermined communication interface. The communication unit 42 transmits the operational input information 210 outputted from the operational input information outputting unit 25 to the communication unit 16 of the display apparatus 1.

Even in the second embodiment, it is possible to realize the remote operation as well as the first embodiment. In the second embodiment, there is no need to implement the remote operation control function on the display apparatus 1, and this makes it possible to apply the remote operation to an existing display apparatus. Each of various kinds of display apparatuses is connected to the remote operation controlling apparatus 3 as needed, whereby the display system can be constituted.

Third Embodiment

A display apparatus according to a third embodiment of the present invention will be described with reference to FIG. 35. In the third embodiment, an absolute system is used as a setting system of a virtual plane space 100.

Figure 35:
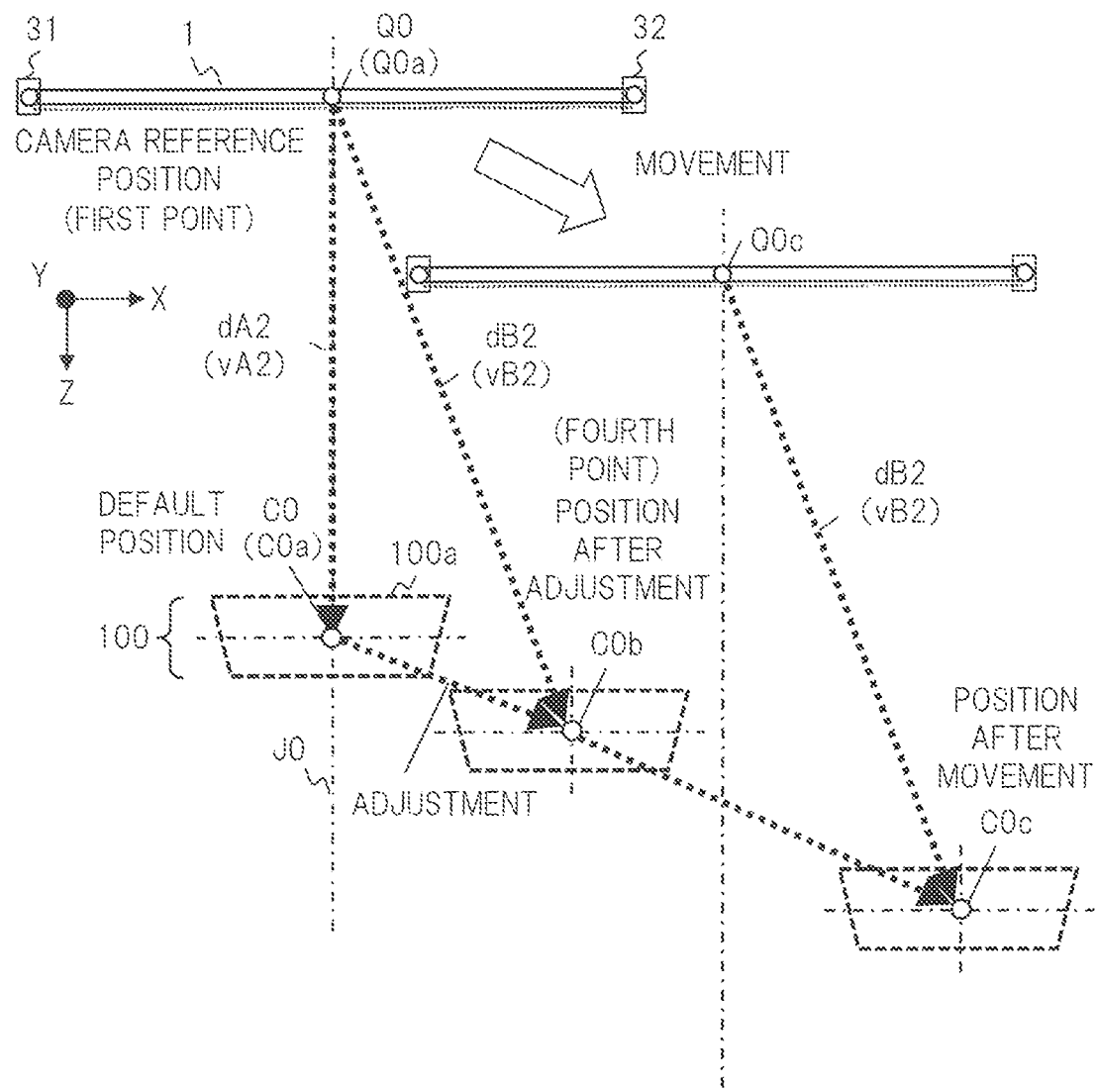
FIG. 35 is a view illustrating an absolute system for setting a virtual plane in a display apparatus according to a third embodiment of the present invention.

FIG. 35 illustrates an absolute system according to the third embodiment. In the absolute system, the virtual plane space 100 is set to an absolute position based on a position of a display apparatus 1 (a screen 10 and cameras 31 and 32) in a space regardless of a user reference position. In the absolute system, the virtual plane space 100 is set to a point C0 of a position determined by a relative vector from the screen 10 and a camera reference position. Details are as follows. The camera reference position of the cameras 31 and 32 corresponds with a point Q0 of the screen 10. A default virtual plane space 100a (whose center is set to a point C0a) is first set to a position of a vector vA2 as the virtual plane space 100. The vector vA2 has a predetermined direction (a Z direction) and a distance dA2 from the point Q0. Moreover, a virtual plane space 100b (whose center is set to a point C0b) is set to a desired position of a user from the virtual plane space 100a by adjustment. A vector vB2 having a direction from the point Q0 to the point C0b and a distance dB2 is illustrated. The vector vB2 is contained in the setting information 203, for example. A size and inclination are similarly set.

In this absolute system, even in a case where the user moves, a position or the like of the virtual plane space 100 does not move. In a case where a position of any of the display apparatus 1 and the cameras 31 and 32 is moved by the user, the position of the virtual plane space 100 is updated so as to follow with it. For example, FIG. 35 illustrates a case where the camera reference position is changed into a position of a point Q0c from the point Q0. As a result, the center of the virtual plane space 100 is moved from the point C0b to the point C0c while maintaining a relative relationship of the original vector vB2 and the like.

Any of a relative system and the absolute system is implemented in the display apparatus 1 in advance as a setting method of the virtual plane space 100. Alternatively, two methods may be implemented, and it may be a form in which selection setting is allowed by user setting. In any method, a schematic diagram indicating a positional relationship among the user, the virtual plane, and the display apparatus 1 (the screen 10 and the cameras 31 and 32) may be displayed on the user setting screen, and these setting states may be conveyed to the user.

Setting values of the vector of the relative system described above or the above absolute system, that is, setting values of the direction and the distance that define the virtual plane space 100 can be changed by the user setting or an adjustment function. Further, in a case where the adjustment function is used as one method of setting the vector and the like, it may be the following method. For example, in an adjustment mode, the user moves a finger in a desired front or back position in a depth direction with respect to the current virtual plane space 100. In response to detection of this operation, the virtual plane space 100 is parallelly displaced in the depth direction, and the above vector and the like are set in accordance with the position after change.

Fourth Embodiment

A display apparatus according to a fourth embodiment of the present invention will be described with reference to FIG. 36. The first embodiment and the like described above have a configuration in which two cameras are disposed. However, the number of cameras is not limited to two, and may be three or more. In the fourth embodiment, three cameras are used. In order to allow calculation of distance measurement by binocular parallax, at least two cameras are used as the number of cameras. In a case where accuracy of the calculation and a processing speed are to be improved, three or more cameras are used.

Figure 36:
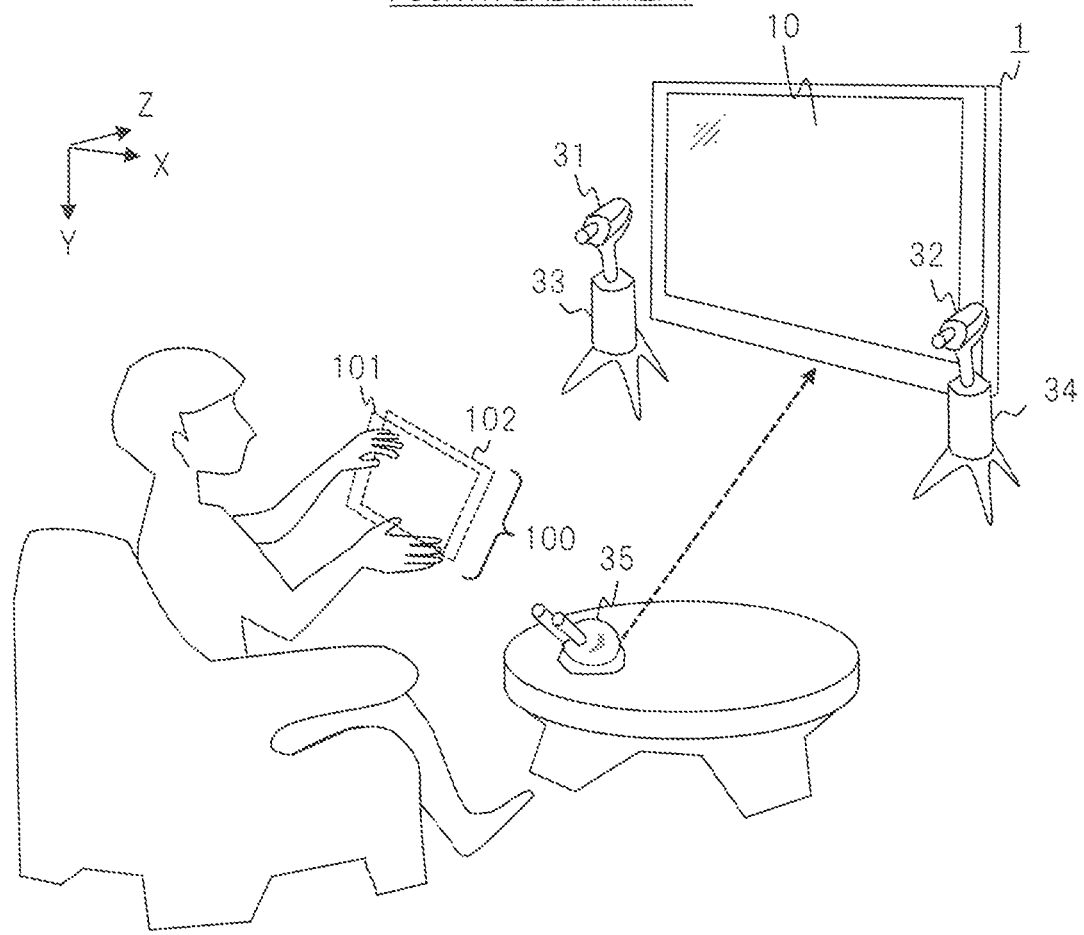
FIG. 36 is a view illustrating a configuration of a display system that includes a display apparatus according to a fourth embodiment of the present invention.

FIG. 36 illustrates a configuration of a display system that includes a display apparatus 1 according to the fourth embodiment. Cameras 31 and 32 at both sides of the display apparatus 1 are the similar components to those according to the first embodiment. In addition to these, a camera 35 is provided. The camera 35 is an additional camera disposed at a position near a hand of a user so as to allow the hand of the user to be photographed with high accuracy, and is a twin-lens camera, for example. In the present embodiment, the camera 35 is disposed on a table at a position near a right hand of the user. The camera 35 photographs a motion of the finger of the user with high resolution from a different direction from those of the cameras 31 and 32 (for example, an X direction to photograph a body side). The camera 35 is connected to the display apparatus 1 via a wireless communication interface, and transmits data of photographed video to a body of the display apparatus 1 by wireless communication. A position and a photographing direction of the camera 35 can be changed by the user.

The display apparatus 1 detects a finger position (a point F0) with high accuracy using respective image signals from the cameras 31 and 32 and the camera 35 by a process of the distance measurement based on the binocular parallax. In the fourth embodiment, the number of camera stands is increased, but it is possible to detect the finger position with higher accuracy. It is possible to realize detection of a predetermined operation and display of a cursor 50 with higher accuracy in accordance with its accuracy. This makes it possible to realize a higher speed operational input. In the fourth embodiment, depending upon a viewing position or a change in posture of the user, for example, even in a standing state or a state of sitting on a floor, it is possible to address them by adjustment of the position or the like of the camera 35, whereby a stable and secure remote operation can be realized.

Fifth Embodiment

A display apparatus according to a fifth embodiment of the present invention will be described with reference to FIG. 37 and FIG. 38. The fifth embodiment illustrates a case where the present invention is applied to a projector as a display apparatus 1. The projector has a function to project and display video onto a screen 10 in a screen 150 on the basis of digital input data and the like. A known technology can be applied to a configuration of hardware and the like of the interior of the projector.

Figure 37:
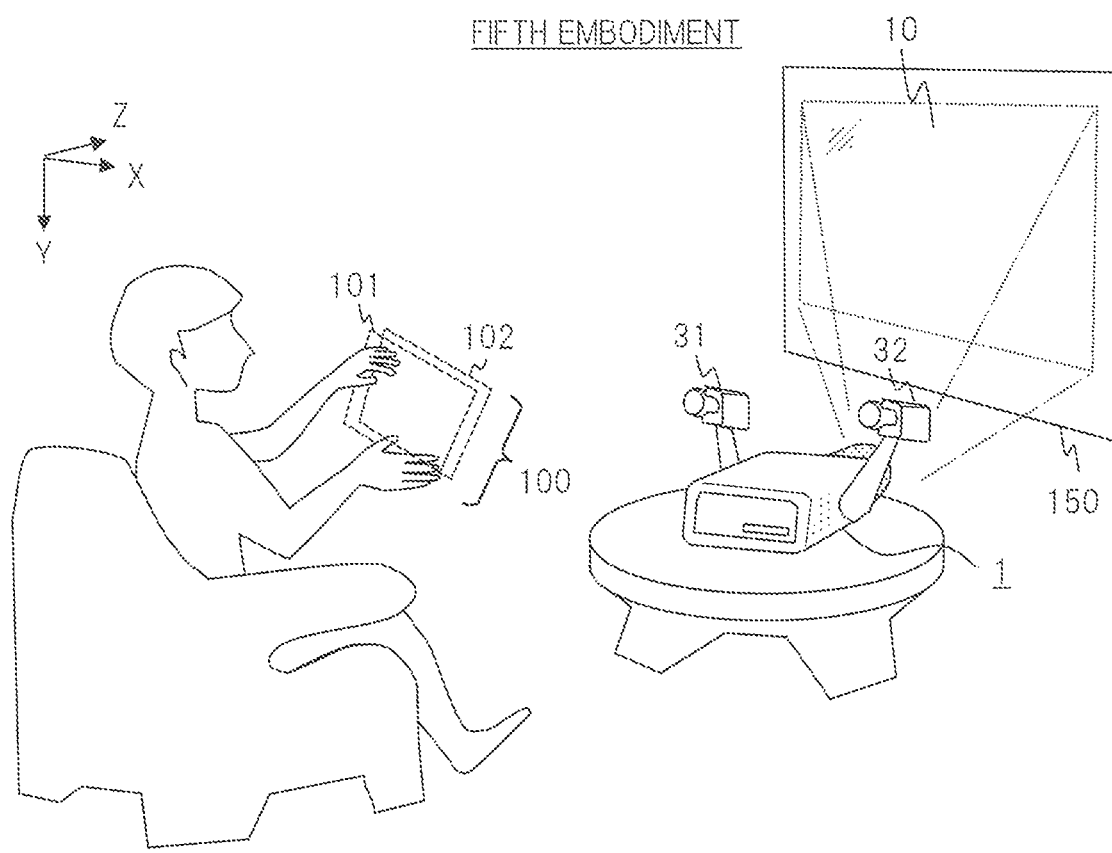
FIG. 37 is a view illustrating a configuration of a display system that includes a display apparatus according to a fifth embodiment of the present invention.

FIG. 37 illustrates a configuration of a display system that includes the display apparatus 1. Video light is projected and displayed from the display apparatus 1, which is the projector, onto the screen 150, whereby the screen 10 is constructed. The display apparatus 1 respectively includes cameras 31 and 32 at both right and left sides of a housing. The display apparatus 1 is disposed on a table between the screen 150 and a chair of a user, for example. The cameras 31 and 32 photograph an area that includes a face and hands of the user.

As a modification example, the cameras 31 and 32 may be a type in which positions of the cameras 31 and 32 can be moved in the similar manner to those described above. A body of the display apparatus 1 may be installed on the table apart from the screen 10, and the cameras 31 and 32 may be installed in the vicinity of the screen 10. The body of the display apparatus 1 may be connected to the cameras 31 and 32 with wired or wireless communication.

Figure 38:
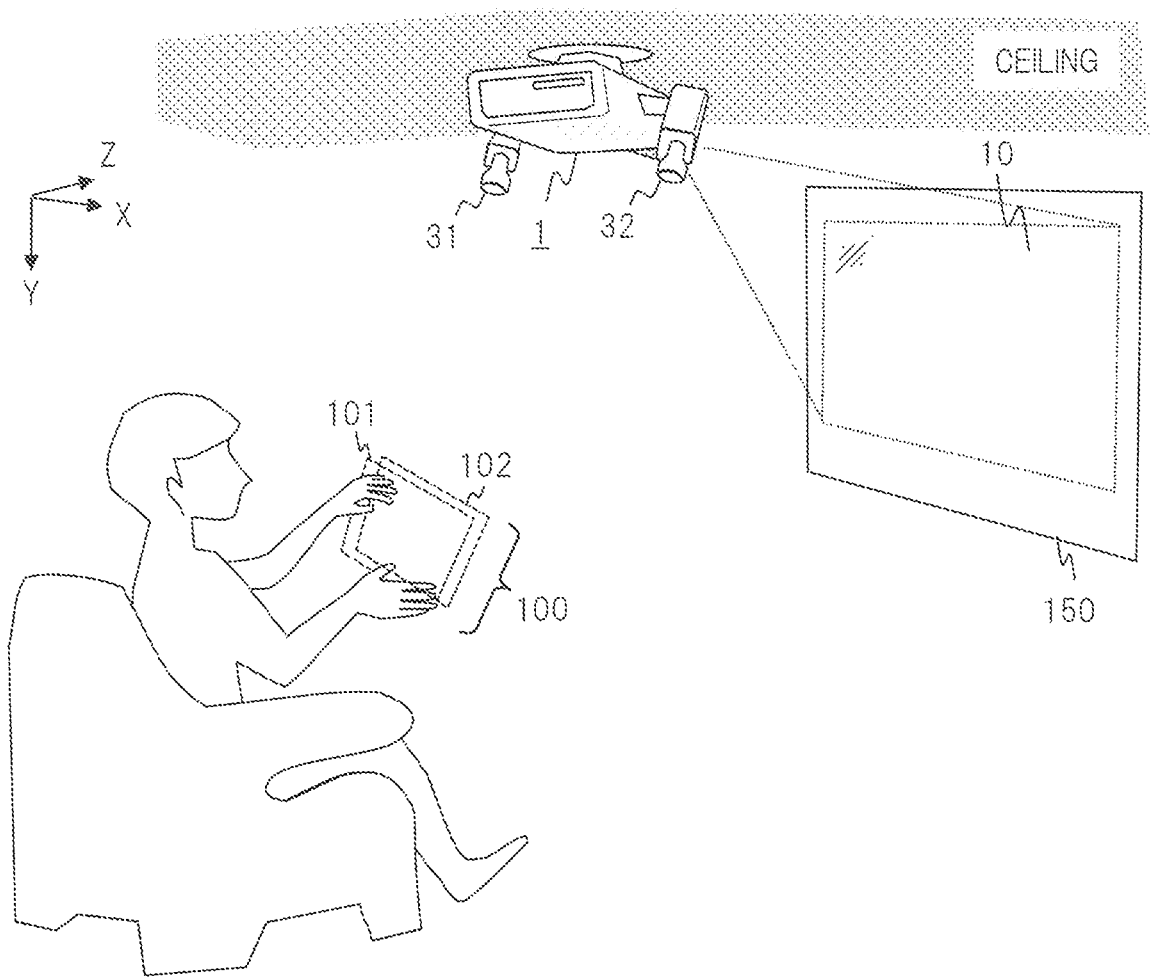
FIG. 38 is a view illustrating a configuration of a display system that includes a display apparatus according to a modification example of the fifth embodiment.

FIG. 38 illustrates a configuration of a display system according to a modification example of the fifth embodiment. In this modification example, the display apparatus 1, which is the projector, is installed on a ceiling via an installation tool. The display apparatus 1 is positioned between a screen 150 and a user. The cameras 31 and 32 respectively provided at both sides of the display apparatus 1 photograph an area, which includes a head and hands of the user, from the above against the user.

Sixth Embodiment

A display apparatus according to a sixth embodiment of the present invention will be described with reference to FIG. 39 to FIG. 42. In the sixth embodiment, the display apparatus has a function to realize power saving by controlling an operation state such as power ON/OFF of a display apparatus 1 using sensors in connection with a remote operation control. For example, only when a user is located near the display apparatus 1, a display function and a remote operation control function of a body of the display apparatus 1 is set to a power ON state.

[Display System]

Figure 39:
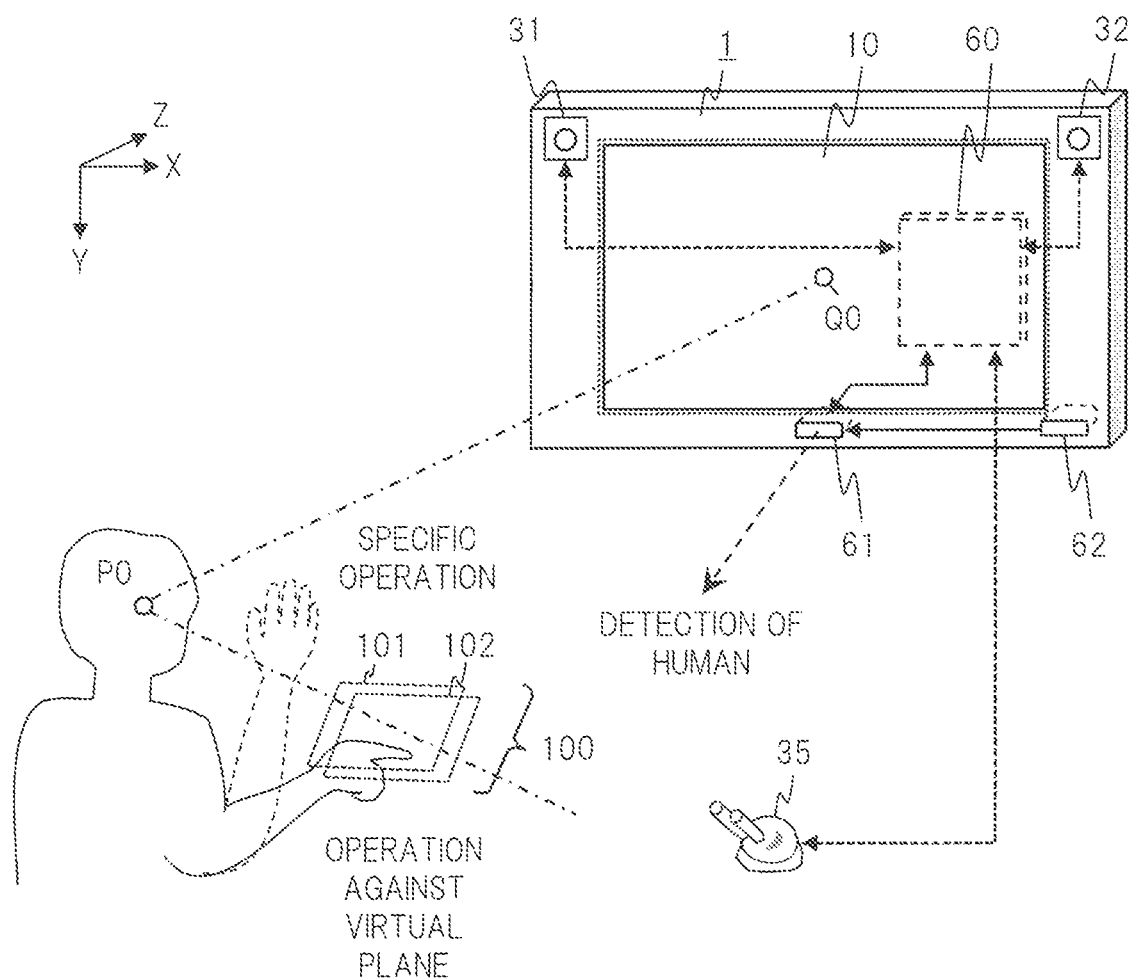
FIG. 39 is a view illustrating a display system that includes a display apparatus according to a sixth embodiment of the present invention.

FIG. 39 illustrates a configuration of a display system that includes the display apparatus 1 according to the sixth embodiment. FIG. 39 illustrates an example in which the display apparatus 1 is a television and cameras 31 and 32 are embedded in a housing. Lens portions of the cameras 31 and 32 are exposed to the outside. A photographing direction and the like of each of the cameras 31 and 32 can be adjusted. Further, a camera 35 is installed near fingers of the user in the similar manner to that according to the fourth embodiment. The camera 35 may be omitted. The display apparatus 1 includes a control board 60, a human-presence sensor 61, a main power supply unit 62, and the like. A processor and the respective elements of FIG. 2 described above are mounted on the control board 60 as electronic circuits. The respective elements are connected to each other by power supply lines and communication lines. The main power supply unit 62 supplies electric power to each unit such as the body of the display apparatus 1 or the cameras 31 and 32.

The human-presence sensor 61 detects presence of a human in a predetermined area such as a periphery of the display apparatus 1 (for example, the inside of a room) by using infrared rays or the like. In a case where the human-presence sensor 61 detects presence of a human, the human-presence sensor 61 sends a detection signal to a control unit of the control board 60.

Figure 40:
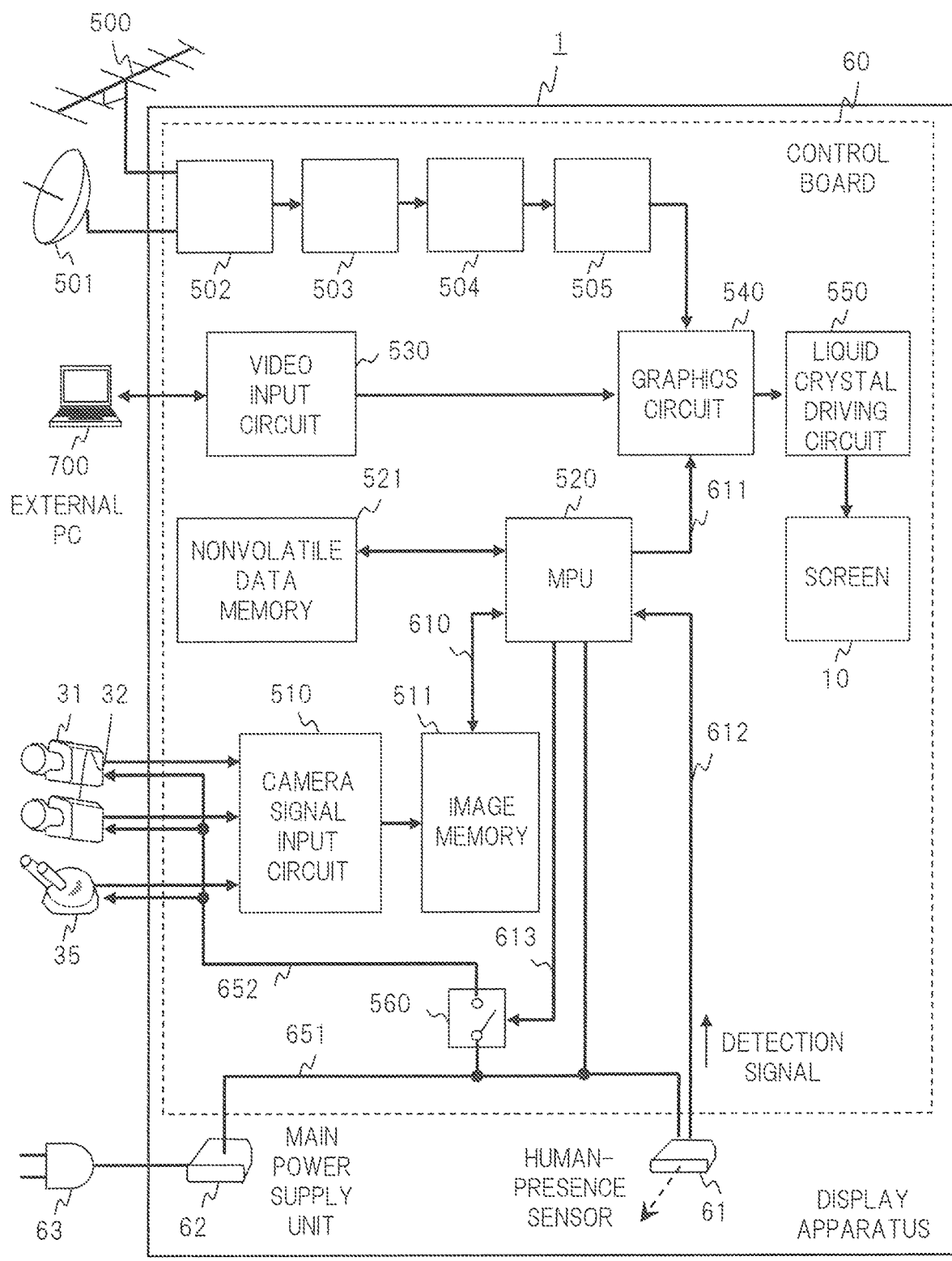
FIG. 40 is a view illustrating a functional block configuration of hardware of the display apparatus according to the sixth embodiment.

FIG. 40 illustrates a functional block configuration of detailed hardware of the display apparatus 1 and the like. The display apparatus 1 includes a first antenna 500, a second antenna 501, a tuner circuit 502, a demodulating circuit 503, a video audio data signal separating circuit 504, a data expanding circuit 505, a camera signal input circuit 510, an image memory 511, an MPU (microprocessor unit) 520, a nonvolatile data memory 521, a video input circuit 530, a graphics circuit 540, a liquid crystal driving circuit 550, a switch 560, a screen 10 of a display panel, the cameras 31, 32, and 35, the human-presence sensor 61, the main power supply unit 62, a plug for power supply 63, and the like. An external PC 700 or the like can be connected to the display apparatus 1.

The MPU 520 is a main control unit that executes control processes of the whole display apparatus 1. The MPU 520 takes charge of various kinds of processes such as the personal recognition described above, the finger position detection, setting of a virtual plane, adjustment, and GUI display control. The MPU 520 controls the graphics circuit 540, the liquid crystal driving circuit 550, and the like on the basis of a signal from the data expanding circuit 505, a video signal from the video input circuit 530, and the like, and causes the screen 10 to display content video and a GUI image. The graphics circuit 540 controls the liquid crystal driving circuit 550 on the basis of the video signal. Video is displayed on the screen 10 by driving from the liquid crystal driving circuit 550.

Data and information for control are stored in the nonvolatile data memory 521. Registered facial image data for the personal recognition, virtual plane setting information for every individual user, and the like are stored in the nonvolatile data memory 521.

The display apparatus 1 includes signal lines and power supply lines, which connect the respective units to each other, therein. A power supply line 651 supplies electric power from the main power supply unit 62 to the electronic circuits such as the MPU 520 in the control board 60 and the human-presence sensor 61. A power supply line 652 supplies electric power from the main power supply unit 62 to the cameras 31, 32, and 35. Note that each of the cameras 31, 32, and 35 may be provided with a power source unit independently. Signals for control are given and received through signal lines 610 to 613.

The display apparatus 1 has a display function similar to that of a general television. The first antenna 500 is a television antenna for terrestrial digital broadcasting. The second antenna 501 is a television antenna for satellite broadcasting. The display apparatus 1 detects a television signal received through the first antenna 500 or the second antenna 501 by the tuner circuit 502, and demodulates it by the demodulating circuit 503. The signal after demodulation is separated into respective signals of video, audio, and data by the video audio data signal separating circuit 504. The data expanding circuit 505 executes an expanding process for a signal with a compression format, and a process to synchronize with a time scale. A video signal transmitted from the external PC 700 or the like is converted into an appropriate format by the video input circuit 530, and is transmitted to the graphics circuit 540.

The camera signal input circuit 510 inputs an image signal of photographed video obtained from each of the cameras 31, 32, and 35; converts each of the image signals into an image signal with a predetermined format by which it is easy to execute image analysis and the like; and stores them in the image memory 511 together. The image signals are supplied from the image memory 511 to the MPU 520 through the signal line 610.

The MPU 520 executes the various kinds of processes described above by using the image signals in the image memory 511. For example, the MPU 520 extracts a feature of a face of a human from the image signals, and also extracts features of an arm or a finger. The MPU 520 executes a personal recognizing process, a distance measuring process based on the binocular parallax, and the like by using the extracted feature data. In the personal recognizing process, the MPU 520 compares and collates the extracted feature data with registered facial feature data stored in the nonvolatile data memory 521, and identifies an individual user. In a case where there is one whose degree of similarity becomes a certain degree or more, the MPU 520 determines that a target person corresponds to the individual user of the registered facial feature data. The MPU 520 reads out the virtual plane setting information (the setting information 203 described above) corresponding to the identified individual user from the nonvolatile data memory 521.

In a case where the human-presence sensor 61 detects that a human enters a predetermined area, the human-presence sensor 61 gives the MPU 520 a detection signal through the signal line 612. In a case where the MPU 520 inputs the detection signal from the human-presence sensor 61, the MPU 520 gives a control signal to the switch 560 through the signal line 613 to switch the switch 560 from an OFF state to an ON state. This causes the electric power to be supplied from the main power supply unit 62 to each of the cameras through the power supply lines 651 and 652, whereby each of the cameras becomes an ON state and photographing is started. In a case where the display function of the body of the display apparatus 1 is set to an ON state, the MPU 520 starts to supply the electric power from a main power supply unit 602 to each unit of the control board 60.

In a case where the human-presence sensor 61 detects that the human goes out from the predetermined area, the detection signal becomes OFF. The MPU 520 starts to count a time by means of an internal timer or the like in response to OFF of the detection signal. In a case where the detection signal does not become ON even after a predetermined time elapses, the MPU 520 sets a power source of the body of the display apparatus 1 to an OFF state. Namely, the display apparatus 1 has a so-called automatic shut-off function.

[First Control Processing Flow]

Figure 41:
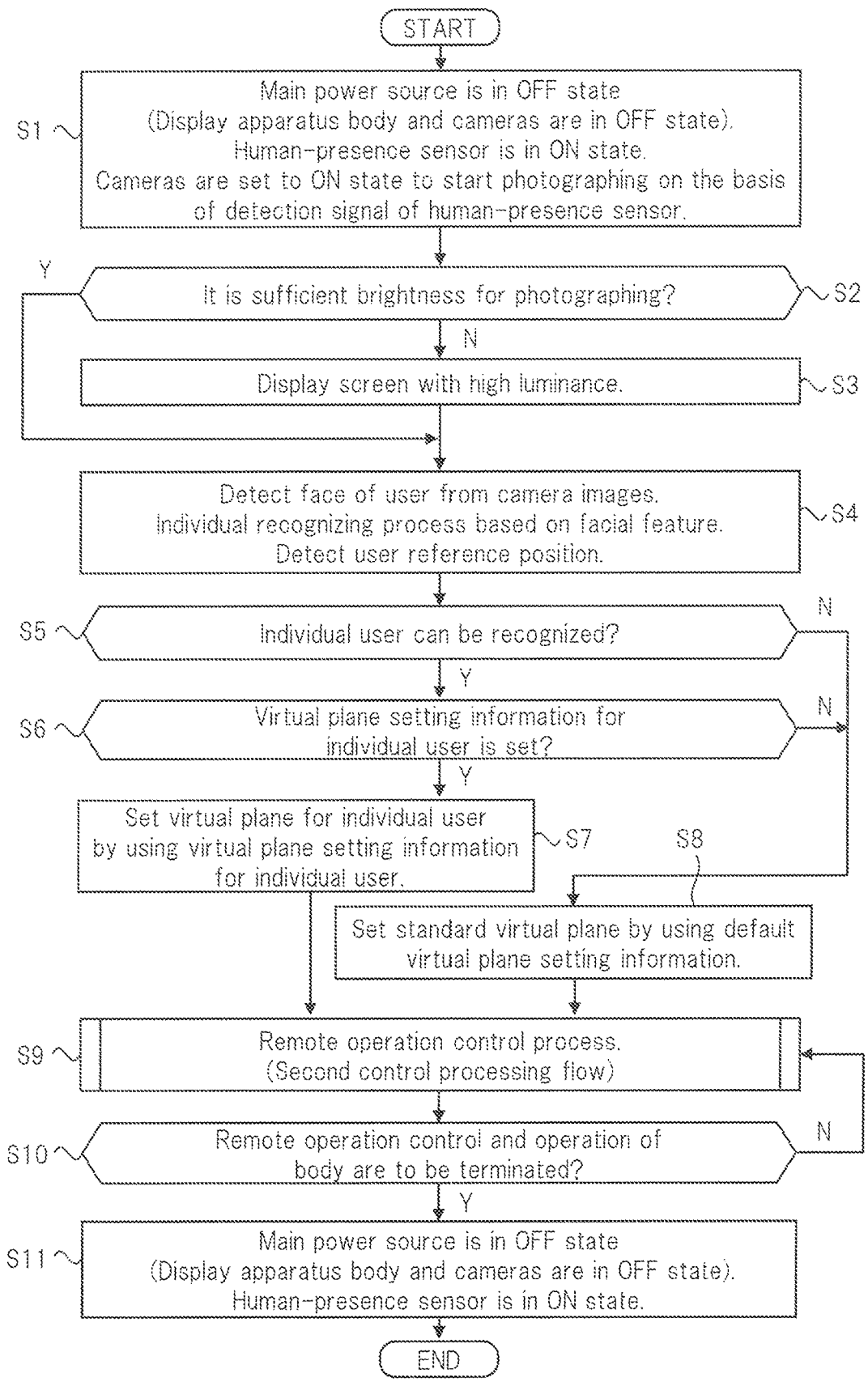
FIG. 41 is a view illustrating a first control processing flow of the display apparatus according to the sixth embodiment.

FIG. 41 illustrates a first control processing flow for the display apparatus 1. The processing illustrated in FIG. 41 is mainly executed by the MPU 520. The first control processing flow illustrated in FIG. 41 includes Steps S1 to S11. Hereinafter, explanation will be made in order of Steps.

(S1) First, a main power source of the main power supply unit 62 is in an OFF state. A body of the display apparatus 1 (display function), the cameras 31 and 32 (that is, a remote operation control unit 20) and the like are set to a power OFF state. The human-presence sensor 61 is set to a power ON state. The MPU 520 receives a detection signal from the human-presence sensor 61, and initiates the present control process. The display apparatus 1 sets each of the cameras 31, 32, and 35 to a power ON state by means of ON of the switch 560 on the basis of an ON state of the detection signal, and causes the cameras 31, 32, and 35 to start photographing.

(S2) The MPU 520 determines whether a room lighting state is sufficient brightness to capture a face or a finger of a user by a camera or not on the basis of an image signal from the image memory 511 (or it may be an illuminance sensor or the like). In a case where the MPU 520 determines that it is sufficient brightness (Y), the processing flow shifts to S4. In a case where the MPU 520 determines that it is insufficient brightness (N), the processing flow shifts to S3.

(S3) The display apparatus 1 sets the display function to an ON state to display video with high luminance on the screen 10. The video with high luminance is an image in which a background is set to high luminance, and is an image for assisting the photographing. For example, the MPU 520 reads out an image signal with high luminance from the nonvolatile data memory 521, and controls the graphics circuit 540 and the like. Alternatively, the display apparatus 1 may display the video on the screen 10 while superimposing a message to encourage the user to light up the room.

(S4) The display apparatus 1 detects a feature of the face of the user from camera images, compares and collates the feature with the registered facial feature data, and executes the personal recognizing process for the user. Further, the display apparatus 1 detects a point P0 indicating a user reference position in a space (for example, a center of both eyes of the face).

(S5) The display apparatus 1 confirms whether an individual user can be identified or not. In a case where the individual user can be identified (Y), the processing flow shifts to S6. In a case where the individual user cannot be identified (N), the processing flow shifts to S8.

(S6) The display apparatus 1 confirms whether there is virtual plane setting information corresponding to the identified individual user or not. In a case where there is the virtual plane setting information (Y), the processing flow shifts to S7. In a case where there is not the virtual plane setting information (N), the processing flow shifts to S8. In a case where the virtual plane setting information has already been set, the virtual plane setting information for the individual user is stored in the nonvolatile data memory 521.

(S7) The display apparatus 1 reads out the virtual plane setting information for the individual user from the nonvolatile data memory 521, and sets the virtual plane space 100 for the individual user in the space. Namely, as described above, a point C0 and the like of the virtual plane space 100 are set to a position defined by a predetermined distance and a predetermined direction (for example, a reference axis K0) from the point P0 of the user reference position, and a size and inclination thereof are also set.

(S8) The display apparatus 1 reads out default virtual plane setting information from the nonvolatile data memory 521, and sets a standard virtual plane in the space. Namely, as described above, the point C0 and the like of the virtual plane space 100 are set to a position defined by a predetermined distance and a predetermined direction (for example, a reference axis J0) from the point P0 of the user reference position.

(S9) The display apparatus 1 executes a remote operation control process by using the camera images and the set virtual plane space 100. This control process is next illustrated in FIG. 42.

(S10) The display apparatus 1 executes predetermined determination of whether the remote operation control and/or the operation of the body is to be terminated or not. For example, in a case where the user inputs a termination operation, in a case where the display apparatus 1 detects absence of the user from the camera images, or in a case where the human-presence sensor 61 detects absence of a human, then the display apparatus 1 determines that it is to be terminated, and the processing flow shifts to S11. In particular, in a case where the detection signal of the human-presence sensor 61 is changed from the ON state to the OFF state, the MPU 520 counts up a time by the internal timer. In a case where the detection signal does not become the OFF state again after a predetermined time elapses, the MPU 520 determines that the user goes out from the room, and terminates the remote operation control and/or the operation of the body. In a case where the remote operation control and/or the operation of the body is not to be terminated, the process at S9 is repeated.

(S11) The MPU 520 controls the switch 560 to set the power source from the main power supply unit 62 to the OFF state, and to set the display function of the body of the display apparatus 1 and the cameras 31, 32, and 35 to the power OFF state. Namely, the display apparatus 1 enters a stand-by state by the automatic shut-off function.

In a case of cleaning or maintenance of the display apparatus 1, or in a case where the display apparatus 1 is not used for a long time, the whole display system including the human-presence sensor 61 and the cameras 31, 32, and 35 is completely shifted to the power OFF state by the main power supply unit 62. For example, the power source OFF is controlled by a manual operation of a hardware switch of the main power supply unit 62 by the user.

[Second Control Processing Flow]

Figure 42:
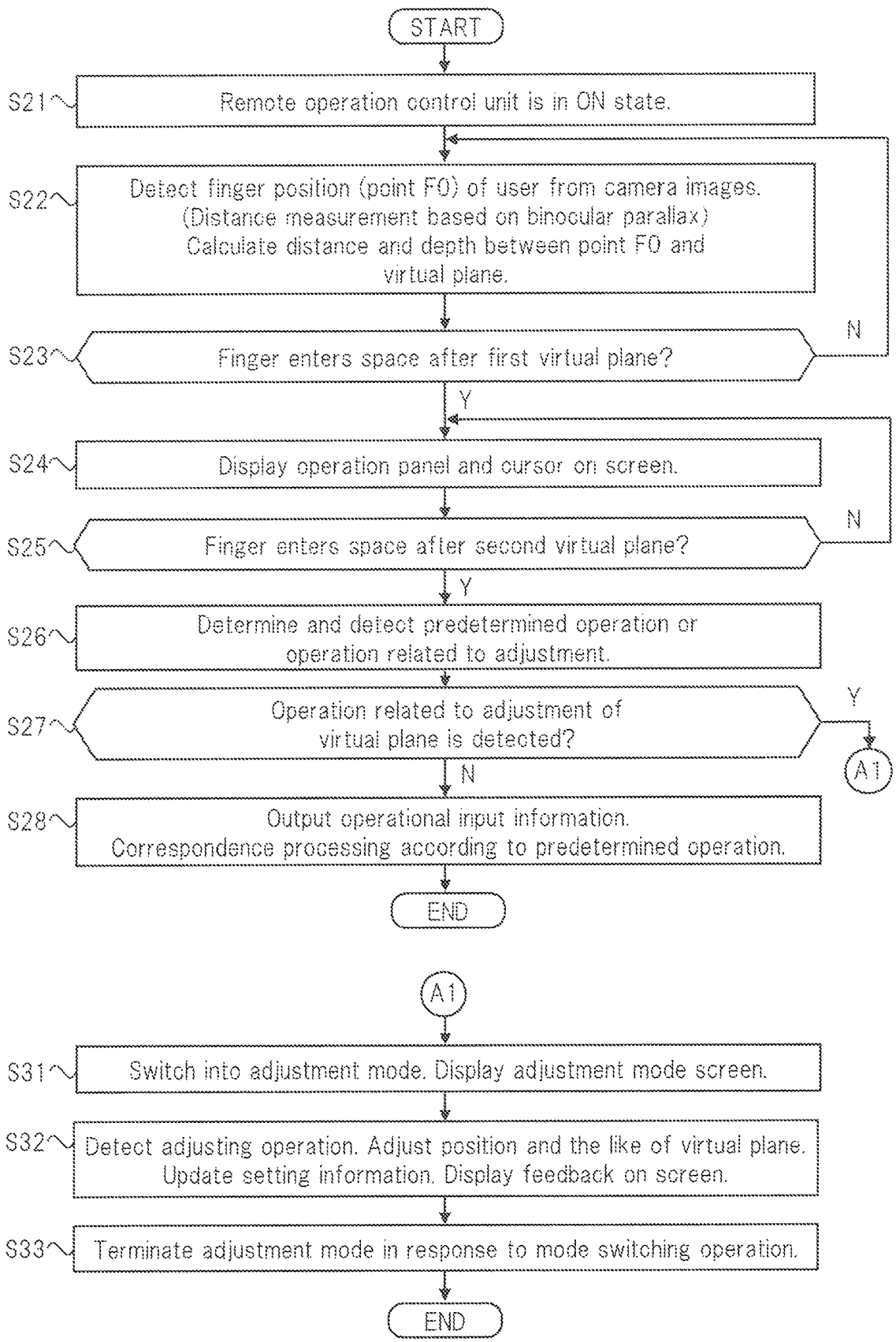
FIG. 42 is a view illustrating a second control processing flow of the display apparatus according to the sixth embodiment.

FIG. 42 illustrates a second control processing flow for the display apparatus 1, which corresponds to the processing content of S9 in FIG. 41. The processing illustrated in FIG. 42 is mainly executed by the MPU 520, and particularly includes processes corresponding to the processes of the remote operation control unit 20 illustrated in FIG. 2. The second control processing flow illustrated in FIG. 42 includes Steps S21 to S33. Hereinafter, explanation will be made in order of Steps.

(S21) The display apparatus 1 sets the remote operation control function by the remote operation control unit 20 to ON state.

(S22) The remote operation control unit 20 detects a point F0 of a finger position from inputted camera images by means of a distance measuring process based on the binocular parallax described above. Further, the remote operation control unit 20 calculates a distance DST between the point F0 of the finger position described above and the virtual plane, and grasps a depth and the like based on the distance DST.

(S23) The remote operation control unit 20 first determines and detects whether the finger enters a second space after a first virtual plane 101 or not on the basis of the finger position, the distance DST, and the depth. In a case where the finger enters the second space (Y), the processing flow shifts to S24. In a case where the finger does not enter the second space (N), the processing flow returns to S22.

(S24) The display apparatus 1 displays the operation panel 402 described above on the screen 10, and displays a cursor 50 in the screen 10 so as to be associated with the finger position and the distance DST. At that time, the remote operation control unit 20 gives operational input information 210 containing display control information for that to the GUI display unit 14. The GUI display unit 14 displays the operation panel 402 and the cursor 50 on the basis of the operational input information 210.

(S25) The remote operation control unit 20 of the display apparatus 1 determines whether the finger position enters a third space after a second virtual plane 102 or not. In a case where the finger position enters the third space (Y), the processing flow shifts to S26. In a case where the finger position does not enter the third space (N), the processing flow returns to S24.

(S26) The remote operation control unit 20 of the display apparatus 1 determines and detects a predetermined operation against the virtual plane space 100 or an operation related to adjustment on the basis of the finger position, the distance DST, and the depth. The remote operation control unit 20 determines and detects an operation such as touch or swipe as the predetermined operation. The remote operation control unit 20 detects a mode switching operation for switching into an adjustment mode (or an adjustment mode switching operation) or the like as the operation related to the adjustment.

(S27) In a case where the display apparatus 1 detects the operation related to the adjustment of the virtual plane described above (Y), the processing flow shifts to A1.

(S28) The remote operation control unit 20 outputs the operational input information 210 containing operation information that indicates a predetermined operation. The GUI display unit 14 executes a correspondence process associated with the predetermined operation in accordance with the operational input information 210. In a case where the adjustment button 409 is pressed at S28, the processing flow similarly shifts to A1. Ina case where the processes in FIG. 42 are terminated after S28, S10 follows S9 in FIG. 41, and the processing flow returns to S9 from S10, then the processes in FIG. 42 are similarly executed repeatedly from the beginning.

(S31) In a case where the processing flow shifts to A1, the remote operation control unit 20 first switches from the normal mode to the adjustment mode, and the display apparatus 1 displays the adjustment mode screen 410 on the screen 10.

(S32) The remote operation control unit 20 detects an adjusting operation against the virtual plane space 100 by the finger (for example, an operation of one finger or a holding operation described above, a virtual plane determining operation, or the like); adjusts a position, a size, or inclination of the virtual plane in response to the adjusting operation; and updates the virtual plane setting information. Further, the remote operation control unit 20 outputs the operational input information 210 containing the display control information so as to display an image of feedback to the screen 10 in response to the adjusting operation.

(S33) In a case where the remote operation control unit 20 detects a mode switching operation (or the normal mode switching operation) indicating that the adjustment mode is terminated, the remote operation control unit 20 switches from the adjustment mode to the normal mode and returns to an original display state of the screen 10. In a case where S10 follows S9 in FIG. 41 after S33 by termination of the process at A1 in FIG. 42, and the processing flow returns to S9 from S10, then the processes in FIG. 42 are similarly executed repeatedly from the beginning.

As described above, according to the sixth embodiment, it is possible to realize the remote operation without using a remote controlling device, and it is also possible to realize power saving. In a case where the human-presence sensor 61 does not detect presence of a user, consumption of electric power is suppressed. Even in a case where the human-presence sensor 61 detects presence of the user, the user can continue normal viewing of television or the other work unless the user carries out an operation against the virtual plane space 100.

Modification Example

As a modification example of the sixth embodiment, a method of controlling a power source state by using camera images may be implemented in addition to a method of controlling a power source state by using a human-presence sensor 61. At a normal time, cameras 31 and 32 or a camera 35 are/is set to a power ON state. The display apparatus 1 detects a specific operation by a user within a photographing range of the camera. This specific operation indicates an intention of an instruction to turn a power source ON of a display function or a remote operation control function, for example, and is a simple operation to hold a palm toward a screen 10 or the camera for a fixed time. This specific operation is different from a virtual plane operation. The display apparatus 1 associates the specific operation with a power source ON instruction of the display function or the remote operation control function, and sets a body of the display apparatus 1 and the remote operation control function to an ON state. Similarly, the display apparatus 1 may detect a specific operation by the user within the photographing range of the camera, and the specific operation may be associated with a power source OFF instruction of the display function or the remote operation control function.

In a state where the specific operation is not detected, the user can continue work or the like other than viewing of a television. When the specific operation is detected, the television is turned ON, content video or the like is displayed on the screen 10, and the remote operation control function becomes an effective state. Moreover, when the user causes a finger to approach a virtual plane space 100, an operation panel or a cursor is displayed as described above. In a case where a remote operation is to be terminated, the user keeps the finger away from the virtual plane space 100.

As another modification example, during the first control process illustrated in FIG. 41, for example, the following process may be executed additionally after sufficient brightness is confirmed at S2. The display apparatus 1 confirms whether a basic distance between the cameras 31 and 32 (FIG. 19) and a camera reference position have already been obtained or not. In a case where positions of the cameras 31 and 32 are fixed and the distance and the camera reference position have already been set, the display apparatus 1 omits the subsequent processes. In a case where the positions of the cameras 31 and 32 can be changed and the distance and the camera reference position are not obtained, the display apparatus 1 automatically measures the distance between the cameras 31 and 32 by the method described above illustrated in FIG. 22, for example, and calculates the camera reference position from the distance to set it.

Seventh Embodiment

A display apparatus according to a seventh embodiment of the present invention will be described with reference to FIG. 43. In the seventh embodiment, a function to control a display apparatus 1 so that a plurality of users can utilize a remote operation control function of the display apparatus 1 at the same time. The display apparatus 1 executes a control to give operation authority of a virtual plane space 100 to a predetermined user among a plurality of users who are positioned near the display apparatus 1. This function is useful in a scene in which a conference or the like is carried out by a plurality of users while sharing and viewing video of material displayed on a screen 10 of one display apparatus 1 by the plurality of users, for example.

[Display System]

FIG. 43 illustrates a configuration of a display system that includes the display apparatus 1 according to the seventh embodiment. In the present embodiment, a case where the display system is applied to a conference system is illustrated. In the present embodiment, there are five users A to E who carry out a conference while utilizing video of the screen 10. The users A to E are positioned within a photographing range of cameras 31 and 32. The display apparatus 1 distinguishes and detects each of the users A to E from camera images as an individual. The display apparatus 1 sets a dedicated virtual plane space 100 to each of the users A to E. For example, a virtual plane 102B indicates a second virtual plane 102 set to the user B. A virtual plane 102C is a second virtual plane 102 set to the user C.

In a case where the users A to E carry out an operation to his or her own virtual plane at the same time, there is a possibility to confuse the conference system by reflecting the operations of the multiple users to the screen 10 at the same time. Thus, in a case where the operations of the multiple users are not to be reflected to the screen 10 at the same time, as described below, a method of controlling the conference system so as to reflect an operation of only a single user to the screen 10 is utilized. Each of the users in turn carries out a remote operation based on a utilizing method in a coordinated manner.

The display apparatus 1 is controlled so as to give authority as a representative operator to only one user of the plurality of users, who first causes the finger to enter the virtual plane space 100. Namely, the operation authority is given by a first-come-first-served method. For example, in a case where the need arises that the user B points to and explains one location of the material of the screen 10 during a conference, the user B causes the finger to enter his or her own virtual plane 102B. At this time, the user B first operates the virtual plane 102B, and the other users do not cause their finger to enter the virtual plane space 100. Herewith, the operation authority is given to the user B, and a cursor 50 is displayed at a point EB of a position on the screen 10 corresponding to a finger position of the user B.

Further, when the representative operator carries out an operation against the virtual plane, the display apparatus 1 displays an image 493 indicating a current representative operator at one location on the screen 10 (for example, upper right). This makes it possible for all the users to identify the current representative operator in common. This image 493 may be created by using the camera images, or may be information on a facial image registered in advance, any other icon, or any other mark.

Next, the user C causes the finger to enter his or her own virtual plane 102C. At this time, since the user B is operating the virtual plane 102B, any operation authority is not given to the user C. Nothing is displayed at a point EC of a position on the screen 10 corresponding to a finger position of the user C. Next, the user B terminates the explanation and causes the finger to return to the front of the virtual plane 102B. Herewith, the operation authority of the user B is released. Next, the user C causes the finger to enter the virtual plane 102C. Herewith, the operation authority is given to the user C. The cursor 50 is displayed at the point EC of the position on the screen 10 corresponding to the finger position of the user C, and the image 493 is changed into an image indicating the user C.

As described above, according to the seventh embodiment, even in a case where the remote operation using the virtual plane is utilized under environment that the plurality of user exists, the number of false detections is small, and it is possible to realize the environment with good usability without confusion. In a conventional technique, in a case where a plurality of persons is taken in camera images, it is difficult to distinguish a user who carries out a remote operation from the other persons. For example, motions of a child in a room and a passing person act as disturbance, it is hardly to detect gesture of the user, and there is a possibility that false detection occurs. In the conventional technique, even in a case of the conference or the like, it is not considered how to control remote operations of plural users at the same time to successfully realize them. According to the seventh embodiment, even in a case where the multiple users utilizes the remote operations at the same time, it is possible to smoothly realize the remote operations.

The control for the operation authority described above can similarly be applied to the operation panel 402. Further, as a modification example, the number of users to which the operation authority described above is given is not limited to one, and the operation authority may be given to each of the predetermined number of users. In that case, a plurality of cursors 50 for the predetermined number of users is displayed on the screen 10, whereby each of the users who have the operation authority can carry out the remote operations at the same time. The cursors 50 are assigned so that a cursor 50 with a different image is displayed for each of the users. In a case of an application or the like in which the multiple users carryout collaborative work, such a control is useful. Further, as a modification example, predetermined priority may be set to each of the plurality of users. In a case where the plurality of users causes their fingers to enter the corresponding virtual planes at almost the same time, operation authority is given in accordance with the priority. For example, in a case where the user C with higher priority causes the finger to enter the virtual plane while the user B with lower priority is operating, it may be controlled so that the operation authority is moved from the user B to the user C.

[Determination of Body Continuity]

There is the following as supplement as each of the embodiments. When a portion of a face and a head or a portion of a finger and an arm of the user is detected, the display apparatus 1 determines continuity or identity of the body of the individual user on the basis of analysis of the camera images. For example, in a case of usage of the multiple users at the same time like the seventh embodiment, there is a possibility that a face in the camera images and a finger near the face are not included in the same user. For example, the user A may stretch his or her arm from the side of the user B to cause the finger to enter the virtual plane of the user B. In view of such a possibility, the display apparatus 1 determines continuity and identity of the body of the individual user when the camera images are analyzed. The display apparatus 1 determines whether an area of the arm or the finger is continuously connected to a facial area in the image or not, for example. In a case where they are continuously connected to each other, the display apparatus 1 determines that they are included in the same user. In a case where the display apparatus 1 determines that the face and the finger in the image are respectively contained in different users, the remote operation is set to be ineffective.

[Case of Holding Object by Hand]

During the remote operation, the user can basically carry out the virtual plane operation in a state where nothing is held by the hand. It is not limited to this. The user can also carry out the virtual plane operation in a state where an object such as a pointer is held by the hand. In this case, the display apparatus 1 detects the object such as a predetermined pointer from the camera images on the basis of user setting and the like. The display apparatus 1 also determines continuity between the finger and the object. The display apparatus 1 detects a point indicating a position of a tip of the object as the point F0. The display apparatus 1 may register an image of the object such as the pointer in advance. At the time of detection from the camera images, color and a shape of the object may be detected, and detected ones may be utilized for the control.

As described above, the present invention has been explained concretely on the basis of the embodiments. However, the present invention is not limited to the embodiments described above, and can be modified into various forms of applications without departing from the substance of the invention. The components of each of the embodiments can be added or deleted, separated or merged, replaced, or combined. The numeral values and the like of the concrete example in each of the embodiments are one example. A part or all of the functions of each of the embodiments may be realized by hardware such as an integrated circuit, or may be realized by software program processing. The software constituting the functions of each apparatus may be stored in the corresponding apparatus in advance at the time of shipment of a product, or may be obtained from an external apparatus via communication after shipment of the product. The present invention is not limited to the display apparatus such as a television, and can be applied to an operational input of any of various kinds of electronic devices and systems (for example, a conference system, a digital signage, and the like).

REFERENCE SIGNS LIST

1 . . . display apparatus, 10 . . . screen, 31, 32 . . . camera, 100 . . . virtual plane space, 101 . . . first virtual plane, 102 . . . second virtual plane, J0, K0 . . . reference axis, P0, Q0 to Q8, F0, C0 . . . point.

The invention claimed is:

1. A display apparatus with a function to control an operational input against a screen by a remote operation of a user, the display apparatus comprising:
 a photographing unit including at least two cameras configured to photograph an area, the area including the user who views the screen, wherein
 a second point and a third point with respect to a first point are detected by analysis of photographed video of the photographing unit, the first point indicating a reference position of the two cameras, the second point indicating a user reference position associated with a part of a body of the user, the third point indicating a position of a finger of the user,
 a virtual plane space including at least one virtual plane is set to a fourth point in a space, the fourth point being positioned apart from the second point by a predetermined length in a first direction, a degree of entrance of the finger with respect to the virtual plane space is calculated, the degree of entrance including a distance between the third point and the virtual plane space, a predetermined operation of the finger against the virtual plane space is determined on a basis of the degree of entrance, operational input information is generated, the operational input information containing a position coordinate of the third point or a position coordinate of a fifth point associated with the third point in the screen, the operational input information further containing operation information that indicates the predetermined operation, an operation including a display control for the screen of the display apparatus is controlled on a basis of the operational input information, and each of a first operation, a second operation, and a third operation is distinguished and detected as the predetermined operation, the third point entering a back of the virtual plane in the first operation, the third point returning to a front of the virtual plane after entering the back of the virtual plane in the second operation, and the third point moving in an in-plane direction after entering the back of the virtual plane in the third operation.

2. The display apparatus according to claim 1, wherein setting information indicating the virtual plane space is stored, the setting information containing the first direction and the predetermined length, and wherein an adjusting operation against the virtual plane space by the finger of the user is determined, and at least one of a position, a size, or inclination of the virtual plane space is changed in response to the adjusting operation in real time to update the setting information.

3. The display apparatus according to claim 2, wherein image information containing a virtual plane frame image is displayed on the screen during the adjusting operation, the virtual plane frame image being used to convey a state of the adjusting operation against the virtual plane space to the user.

4. The display apparatus according to claim 2, wherein image information containing a schematic diagram is displayed on the screen during the adjusting operation, the schematic diagram being used to convey a state of a space to the user, the space including a positional relationship between the user reference position and the virtual plane space.

5. The display apparatus according to claim 2, wherein the adjusting operation includes an operation to move predetermined two points of the virtual plane space in a desired direction by the finger, and wherein the position, the size, and the inclination of the virtual plane space are allowed to be changed at the same time in response to the adjusting operation.

6. The display apparatus according to claim 2, wherein the adjusting operation includes a holding operation to pick up a predetermined point of the virtual plane space by two fingers of a hand or enclose and move the predetermined point, and wherein at least one of the position, the size, or the inclination of the virtual plane space is allowed to be changed in response to the holding operation.

7. The display apparatus according to claim 2, wherein the adjusting operation includes a position adjusting operation, a size adjusting operation, and an inclination adjusting operation, a point for adjusting the position of the virtual plane space being moved in a desired direction by the finger in the position adjusting operation, a point for adjusting the size of the virtual plane space being moved in a desired direction by the finger in the size adjusting operation, a point for adjusting the inclination of the virtual plane space is moved in a desired direction by the finger in the inclination adjusting operation, wherein only the position of the virtual plane space is allowed to be changed in response to the position adjusting operation, wherein only the size of the virtual plane space is allowed to be changed in response to the size adjusting operation, wherein only the inclination of the virtual plane space is allowed to be changed in response to the inclination adjusting operation, and wherein image information for conveying, to the user, the point for adjusting the position of the virtual plane space, the point for adjusting the size of the virtual plane space, and the point for adjusting the inclination of the virtual plane space is displayed on the screen.

8. The display apparatus according to claim 2, wherein a normal mode and an adjustment mode are provided, wherein at a time of the normal mode, the predetermined operation against the virtual plane space by the user and the adjustment mode switching operation are received, and the normal mode is switched into the adjustment mode in a case where the adjustment mode switching operation is detected, and wherein at a time of the adjustment mode, the adjusting operation and the normal mode switching operation are received, adjustment of the virtual plane space is executed in a case where the adjusting operation is detected, and the adjustment mode is switched into the normal mode in a case where the normal mode switching operation is detected.

9. The display apparatus according to claim 2, wherein a resetting operation is determined, the fingers of the user pointing to positions of two points in the space in the resetting operation, and wherein in a case where the resetting operation is detected, the virtual plane space is reset to a virtual plane with a rectangle and the setting information is updated, the rectangle having a diagonal configured by the positions of the two points.

10. The display apparatus according to claim 2, wherein the virtual plane space is set to the fourth point positioned apart from the first point of the reference position of the two cameras or a central point of the screen by a predetermined length in a second direction without depending on the user reference position, and wherein the setting information of the virtual plane space is stored so as to contain the second direction and the predetermined length.

11. The display apparatus according to claim 1, wherein the display apparatus is controlled to display a pointer image at the fifth point in the screen in accordance with the position coordinate of the third point and the degree of entrance, the pointer image indicating existence and the position of the finger.

12. The display apparatus according to claim 11, wherein the virtual plane space includes a first virtual plane and a second virtual plane, the first virtual plane being set at a position apart from the second point by a first length, the second virtual plane being set at a position apart from the second point by a second length that is longer than the first length, and wherein in a case where the third point enters a back of the first virtual plane, the display apparatus displays the pointer image at a position of the fifth point in the screen.

13. The display apparatus according to claim 12, wherein the display apparatus is controlled to display the pointer image in accordance with a distance between the third point and the second virtual plane so as to change a size, color, or a shape type of the pointer image.

14. The display apparatus according to claim 1, wherein when the photographed video is analyzed, the position coordinate of the third point is detected by using distance measurement based on binocular parallax of the two cameras.

15. A display apparatus with a function to control an operational input against a screen by a remote operation of a user, the display apparatus comprising:

a photographing unit including at least two cameras configured to photograph an area, the area including the user who views the screen, wherein a second point and a third point with respect to a first point are detected by analysis of photographed video of the photographing unit, the first point indicating a reference position of the two cameras, the second point indicating a user reference position associated with a part of a body of the user, the third point indicating a position of a finger of the user, a virtual plane space including at least one virtual plane is set to a fourth point in a space, the fourth point being positioned apart from the second point by a predetermined length in a first direction, a degree of entrance of the finger with respect to the virtual plane space is calculated, the degree of entrance including a distance between the third point and the virtual plane space, a predetermined operation of the finger against the virtual plane space is determined on a basis of the degree of entrance, operational input information is generated, the operational input information containing a position coordinate of the third point or a position coordinate of a fifth point associated with the third point in the screen, the operational input information further containing operation information that indicates the predetermined operation, an operation including a display control for the screen of the display apparatus is controlled on a basis of the operational input information, a position of the fourth point of the virtual plane space is allowed to be set to a position on a first reference axis or a position on a second reference axis, the first reference axis connecting the second point to the screen, and the second reference axis having an angle with respect to the first reference axis, a longitudinal or lateral size of the virtual plane space is allowed to be set so as to be equal to or different from a longitudinal or lateral size of the screen, and an inclination of the virtual plane space is allowed to be set so as to be equal to or different from inclination of the screen.

16. The display apparatus according to claim 15, wherein setting information indicating the virtual plane space is stored, the setting information containing the first direction and the predetermined length, and wherein an adjusting operation against the virtual plane space by the finger of the user is determined, and at least one of a position, a size, or inclination of the virtual plane space is changed in response to the adjusting operation in real time to update the setting information.

17. The display apparatus according to claim 15, wherein the display apparatus is controlled to display a pointer image at the fifth point in the screen in accordance with the position coordinate of the third point and the degree of entrance, the pointer image indicating existence and the position of the finger.

18. A display apparatus with a function to control an operational input against a screen by a remote operation of a user, the display apparatus comprising:

a photographing unit including at least two cameras configured to photograph an area, the area including the user who views the screen, wherein a second point and a third point with respect to a first point are detected by analysis of photographed video of the photographing unit, the first point indicating a reference position of the two cameras, the second point indicating a user reference position associated with a part of a body of the user, the third point indicating a position of a finger of the user, a virtual plane space including at least one virtual plane is set to a fourth point in a space, the fourth point being positioned apart from the second point by a predetermined length in a first direction, a degree of entrance of the finger with respect to the virtual plane space is calculated, the degree of entrance including a distance between the third point and the virtual plane space, a predetermined operation of the finger against the virtual plane space is determined on a basis of the degree of entrance, operational input information is generated, the operational input information containing a position coordinate of the third point or a position coordinate of a fifth point associated with the third point in the screen, the operational input information further containing operation information that indicates the predetermined operation, an operation including a display control for the screen of the display apparatus is controlled on a basis of the operational input information, the virtual plane space is set so that a position of a point is associated with a whole area or a partial area of the screen, and in a case where an operation panel for controlling the operation of the display apparatus is displayed on the screen, the predetermined operation against a position in the virtual plane space is associated with an operational input against a position in the operation panel.

19. The display apparatus according to claim 18, wherein setting information indicating the virtual plane space is stored, the setting information containing the first direction and the predetermined length, and wherein an adjusting operation against the virtual plane space by the finger of the user is determined, and at least one of a position, a size, or inclination of the virtual plane space is changed in response to the adjusting operation in real time to update the setting information.

20. The display apparatus according to claim 18, wherein the display apparatus is controlled to display a pointer image at the fifth point in the screen in accordance with the position coordinate of the third point and the degree of entrance, the pointer image indicating existence and the position of the finger.

* * * * *